US012646860B2

(12) United States Patent
Massman et al.

(10) Patent No.: US 12,646,860 B2
(45) Date of Patent: Jun. 2, 2026

(54) UWB VIVALDI ARRAY ANTENNA

(71) Applicant: Government of the United States, as represented by the Secretary of the Air Force, Wright-Patterson AFB, OH (US)

(72) Inventors: Jeffrey P. Massman, Centerville, OH (US); Carl Pfeiffer, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 240 days.

(21) Appl. No.: 18/319,415

(22) Filed: May 17, 2023

(65) Prior Publication Data

US 2023/0378662 A1 Nov. 23, 2023

Related U.S. Application Data

(60) Provisional application No. 63/343,128, filed on May 18, 2022, provisional application No. 63/342,833, filed on May 17, 2022.

(51) Int. Cl.
*H01Q 21/20* (2006.01)
*H01Q 1/36* (2006.01)
(Continued)

(52) U.S. Cl.
CPC ............... *H01Q 21/20* (2013.01); *H01Q 1/36* (2013.01); *H01Q 5/25* (2015.01); *H01Q 13/10* (2013.01)

(58) Field of Classification Search
CPC ............ H01Q 21/20; H01Q 5/25; H01Q 1/36; H01Q 13/10; H01Q 13/085
See application file for complete search history.

(56) References Cited

U.S. PATENT DOCUMENTS 5,557,291 A 9/1996 Chu
9,614,290 B1 * 4/2017 Remski .................. H01Q 13/10
(Continued)

OTHER PUBLICATIONS

Pasternack. (2014). SMP Male Smooth Bore Connector Solder Attachment Thread-In Mount Pin Terminal Catchers Mitt Design Pre-Tinned Pin Technical Data Sheet (Year: 2014).
(Continued)

*Primary Examiner* — Dameon E Levi
*Assistant Examiner* — Anna N Hamadyk
(74) *Attorney, Agent, or Firm* — AFMCLO/JAZ; John T. Addicks

(57) ABSTRACT

Various embodiments are directed to systems, apparatus and methods providing an ultra-wide band (UWB) antenna configured to conform to a doubly curved surface and having an operating wavelength λ, the UWB antenna comprising: an array of electrically cooperating antennas emanating outward from a base region to respective locations of an outer surface region conforming to the doubly curved surface, the area of the outer surface region being divided in accordance with a mesh of unit cells defining thereby a plurality of edges, each of the unit cells having a unit cell minimum area selected in accordance with a desired array gain; wherein for each antenna the respective location of the outer surface region to which the antenna extends is associated with a respective one of the plurality of edges defined by the mesh of unit cells.

12 Claims, 47 Drawing Sheets

(51) Int. Cl.
*H01Q 5/25* (2015.01)
*H01Q 13/10* (2006.01)

(56) References Cited

U.S. PATENT DOCUMENTS

| | | | | |
|---|---|---|---|---|
| 2017/0125918 | A1* | 5/2017 | Howard | H01Q 21/06 |
| 2018/0262264 | A1* | 9/2018 | Alexander | H04B 7/18504 |
| 2020/0358206 | A1 | 11/2020 | Stumme et al. | |
| 2021/0050674 | A1 | 2/2021 | Chang | |
| 2021/0376463 | A1 | 12/2021 | Massman | |

OTHER PUBLICATIONS

D. Cavallo, W. H. Syed and A. Neto, "Connected-slot array with artificial dielectrics: A 6 to 15 GHz dual-pol wide-scan prototype," IEEE Trans. Antennas Propag., vol. 66, No. 6, pp. 3201-3206, 2018.
R. W. Kindt and W. R. Pickles, "Ultrawideband all-metal flared-notch array radiator," IEEE Trans. Antennas Propag., vol. 58, p. 3568, 2010.
R. W. Kindt and J. T. Logan, "Dual-polarized metal-flare sliced notch antenna array," IEEE Trans. Antennas Propag., vol. 68, p. 2666, 2020.
J. T. Logan, R. W. Kindt and M. N. Vouvakis, "A 1.2-12 GHz sliced notch antenna array," IEEE Trans. Antennas Propag., vol. 66, No. 4, pp. 1818-1826, 2018.
M. W. Elsallal and J. C. Mather, "An ultra-thin, decade (10 : 1) bandwidth, modular "BAVA" array with low cross-polarization," in IEEE International Symposium on Antennas and Propagation (APSURSI), Spokane, WA, 2011.
S. S. Holland and M. N. Vouvakis, "The planar ultrawideband modular antenna (PUMA) array," IEEE Transactions on Antennas and Propagation, vol. 60, pp. 130-140, 2012.
R. W. Kindt and B. T. Binder, "Dual-polarized Vivaldi array on a triangular lattice," IEEE Trans. Antennas Propag., vol. 69, No. 4, pp. 2083-2091, 2021.
R. W. Kindt, "Dual-Polarized Planar-Printed Ultrawideband Antenna Array on a Triangular Grid," IEEE Trans. Antennas Propag., vol. 68, No. 8, pp. 6136-6144, 2020.
R. W. Kindt and J. T. Logan, "Benchmarking ultrawideband phased antenna arrays: Striving for clearer and more informative reporting practices," IEEE Antennas Propag. Mag., vol. 60, p. 34, 2018.
C. Pfeiffer, J. Massman and T. Steffen, "3D printed metallic dual-polarized Vivaldi arrays on square and triangular lattices," IEEE Trans. Antennas Propag., vol. Early Access, 2021.
V. Semkin, F. Ferrero, A. Bisognin, J. Ala-Laurinaho, C. Luxy, F. Devillers and A. V. Raisanen, "Beam switching conformal antenna array for mm-wave communications," IEEE Antennas Wireless Propag. Lett., vol. 15, pp. 28-31, 2016.
Z. Wang, P. S. Hall, J. R. Kelly and P. Gardner, "Wideband frequency-domain and space-domain pattern reconfigurable circular antenna array," IEEE Trans. Antennas Propag., vol. 65, No. 10, pp. 5179-5189, 2017.
Y. Xia, B. Muneer and Q. Zhu, "Design of a full solid angle scanning cylindrical-and-conical phased array antennas," IEEE Trans. Antennas Propag., vol. 65, No. 9, pp. 4645-4655, 2017.
C. Kumar, B. P. Kumar, V. S. Kumar and V. V. Srinivasan, "Dual cicularly polarized spherical phased-array antenna for spacecraft application," IEEE Trans. Antennas Propag., vol. 61, No. 2, pp. 598-605, 2013.
B. P. Kumar, C. Kumar, V. S. Kumar and V. V. Srinivasan, "Active spherical phased array design for satellite payload data transmission," IEEE Trans. Antennas Propag., vol. 63, No. 11, pp. 4783-4791, 2015.
J. O. Nielsen, J. B. Andersen, G. F. Pedersen and M. Pelosi, "On polarization and frequency dependence of diffuse indoor propagation," in IEEE Vehicular Technology Conference, San Francisco, 2011.
V. M. Radivojevic, S. Rupcic, N. Nesic and G. Bensic, "Radiation pattern of the spherical antenna array based on archimedean sprial," in International Conference on Smart Systems and Technologies, Osijek, 2018.
K. A. Yinusa, E. P. Marcos and S. Caizzone, "Robust satellite navigation by means of a spherical cap conformal antenna array," in International Symposium on Antenna Technology and Applied Electromagnetics (ANTEM), Waterloo, 2018.
P. Knott, "Design and experimental results of a spherical antenna array for a conformal array demonstrator," in International ITG Conference on Antennas, Munich, 2007.
H. S. Lin, Y. J. Cheng, Y. F. Wu and Y. Fan, "Height reduced concave sector-cut spherical conformal phased array antenna based on distributed aperture synthesis," IEEE Trans. Antennas Propag., 2021.
R. L. Haupt and Y. Rahmat-Samii, "Antenna array developments: a perspective on the past, present and future," IEEE Antennas Propag. Mag., vol. 57, p. 86, 2015.
B. I. Wu and I. Ehrenberg, "Ultra conformal patch antenna array on a doubly curved surface," in IEEE International Symposium on Phased Array Systems and Technology, Waltham, 2013.
G. Cung, T. Spence and P. Borodulin, "Enabling broadband, highly integrated phased array radiating elements through additive manufacturing," in IEEE International Symposium on Phased Array Systems and Technology (PAST), Waltham, MA, 2016.
T. G. Spence and R. Rodriguez, "Additively manufactured ultrawideband, wide scan, monolithic Vivaldi arrays," in IEEE International Symposium on Antennas and Propagation (APS-URSI), San Diego, CA, 2017.
J. Massman, G. Simpson and T. Steffen, "Low cost additively manufactured antenna array modules," in IEEE International Symposium on Phased Array System & Technology (PAST), Waltham, MA, 2019.
R. Sorrentino and O. A. Peverini, "Additive manufacturing: a key enabling technology for next-generation microwave and millimeter-wave systems," Proc. IEEE, vol. 104, p. 1362, 2016.
H. Kahkonen, J. A .- Laurinaho and V. Viikari, "Dual-polarized Ka-band Vivaldi antenna array," IEEE Trans. Antennas Propag., vol. 68, p. 2675, 2020.
R. W. Kindt, J. T. Logan and M. W. Elsallal, "Machined metal Fuse array apertures," in IEEE International Symposium on Phased Array Systems and Technology, Waltham, 2019.
A. Ludwig, "The definition of cross polarization," IEEE Transactions on Antennas and Propagation, vol. 21, pp. 116-119, 1973.
S. Henault, S. K. Podilchak, S. M. Mikki and Y. M. M. Antar, "A methodology for mutual coupling estimation and compensation in antennas," IEEE Trans. on Antennas and Propagation, vol. 61, No. 3, p. 1119, 2013.
J. Zhong, A. Johnson, E. A. Alwan and J. L. Volakis, "Dual-linear polarized phased array with 9:1 bandwidth and 60° scanning off broadside," IEEE Trans. Antennas Propag., vol. 67, No. 3, pp. 1996-2001, 2019.
S. S. Holland, D. H. Schaubert and M. N. Vouvakis, "A 7-21 GHz dual-polarized planar ultrawideband modular antenna (PUMA) array," IEEE Trans. Antennas Propag., vol. 60, No. 10, p. 4589, 2012.
C. Pfeiffer, T. Steffen, G. Phillips and B. Tomasic, "High power AESAs for 20-60 GHz with linear and circular polarizations," in IEEE International Symposium on Phased Array System & Technology (PAST), Waltham, MA, 2019.
O. Franek and G. F. Pedersen, "Spherical horn array for wideband propagation measurements," IEEE Trans. Antenn. Propag., vol. 59, No. 7, pp. 2654-2660, 2011.
C. Pfeiffer, J. Massman and T. Steffen, "3D printed metallic dual-polarized Vivaldi arrays on square and triangular lattices," IEEE Trans. Antennas Propag., vol. 69, No. 12, pp. 8325-8334, 2021.

* cited by examiner

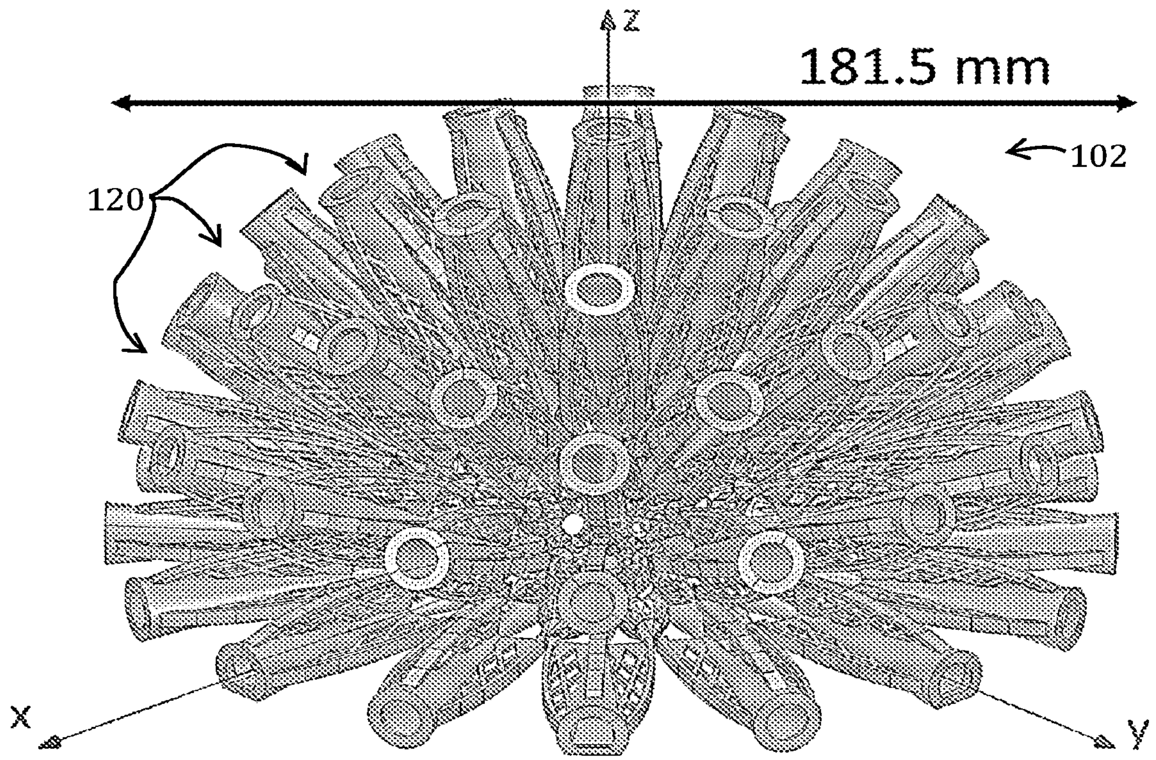
FIG. 2
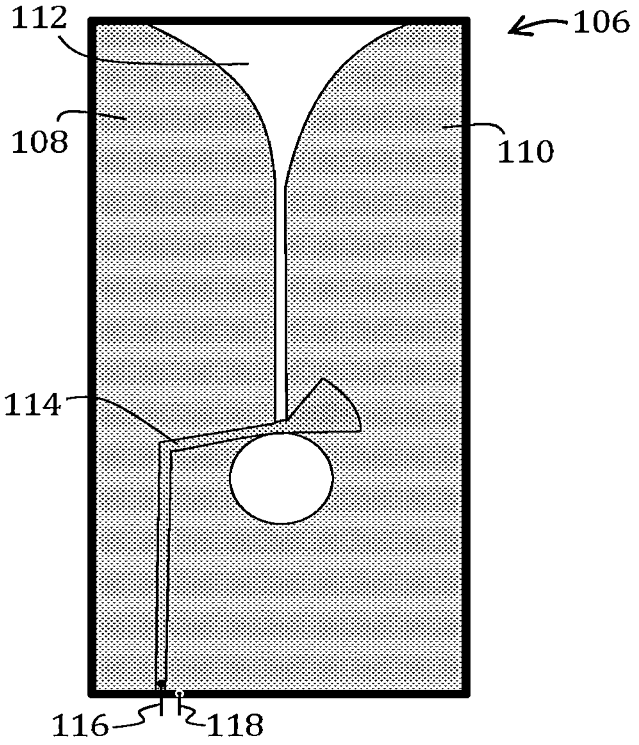
FIG. 3 – Prior Art

UWB VIVALDI ARRAY ANTENNA

CROSS REFERENCE TO RELATED APPLICATION

Pursuant to 37 C.F.R. § 1.78(a)(4), this application claims the benefit of provisional patent Application Ser. No. 63/342,833, filed on May 17, 2022, and entitled UWB HEMISPHERICAL VIVALDI ARRAY, and Application Ser. No. 63/343,128, filed May 18, 2022, and entitled TECHNIQUE FOR BUILDING UWB CONFORMAL ARRAYS USING A QUADRILATERAL MESH AND MODIFIED ANTENNA ELEMENTS. The contents of these provisional patent applications are incorporated herein by reference, each in its entirety.

GOVERNMENT INTEREST

The invention described herein may be manufactured and used by or for the Government of the United States for all governmental purposes without the payment of any royalty.

FIELD OF THE INVENTION

The present disclosure relates generally to methods and apparatuses for providing antennas conforming to three-dimensional surfaces.

BACKGROUND OF THE INVENTION

Significant research and development have been invested in the development of high performance, dual-polarized planar arrays that realize ultra-wide bandwidths (UWB), low cross-polarization, wide-angle scanning, low profile, and optimal element spacing. These arrays employ tightly coupled elements arranged in a uniform lattice to realize a small active reflection coefficient over a wide operational bandwidth. The Vivaldi array is a notable, conventional design for an UWB planar array that has been extensively utilized due to its simple operation and ability to cover greater than one decade of bandwidth. Planar arrays are attractive because they maximize antenna gain for a given number of elements; however, planar arrays suffer from a limited field-of-view since projected area falls off as cos(θ), wherein θ is the angle from a broadside of the array. The field-of-view can be extended using a gimbal; however, use of gimbals is less desired because the mechanical systems are slow, bulky, and wear out over time. Some examples include tightly coupled dipole and slot arrays, Planar Ultra-wideband Modular Antenna (PUMA) arrays, Balanced Antipodal Vivaldi Antenna (BAVA) arrays, and Frequency-scaled Ultra-wide Spectrum Element (FUSE) arrays. These arrays are generally optimized to maximize radiation efficiency and impedance bandwidth across wide scan angles while simultaneously minimizing thickness and cross-polarization.

Various arrays on singly curved surfaces (such as a cylinder or a cone) have been developed to enable wider fields-of-view. One notable example includes three separate, narrowband cylindrical or conical arrays combined to provide a directivity greater than 17 dB over a 4π steradian field-of-view. Because it is conceptually straightforward to wrap an UWB planar array around a singly curved surface (e.g., a cylinder), placing arrays on singly curved surfaces leads to an easier design and build the placing of arrays on doubly curved surfaces. For example, a cylindrical array is periodic such that an infinite array, that accounts for mutual coupling between neighboring elements, can be exactly simulated with periodic boundary conditions. Therefore, array performance can be optimized through computationally inexpensive unit cell simulations. By contrast, it is unclear how to rigorously simulate periodic tiling a doubly curved surface and to account for mutual coupling between adjacent elements. It is this aperiodicity and mutual coupling between antennas to achieve a good active impedance match that renders UWB array design particularly problematic.

Conformal arrays employ narrowband elements with less than one octave of bandwidth. Narrowband radiators can be designed to have low mutual coupling and such that the aperture shape has minimal impact on element performance. Yet, most conformal arrays also have relatively large inter-element spacing between antennas (more than 0.75λ). This large inter-element spacing results in low aperture efficiency since grating lobes or sidelobes carry substantial power. One particular attempt included hemispherical arrays may include 64 circularly polarized helix or waveguide antennas designed to operate from 8 GHz to 8.4 GHz with roughly 0.75λ element spacing. These arrays were fed with 16 T/R modules and 4:1 power splitters for efficient utilization of resources. The aperture efficiency was roughly 30% but could likely be increased if more T/R modules are employed. Another example is the use of large inter-element spacing is the UWB array of quad-ridge horn antennas pointing spherically outwards.

Spherical arrays of patch antennas have also been demonstrated. Some of these arrays have relatively wideband microstrip patches with 25% bandwidth distributed along the surface of a sphere. The minimum spacing between elements was 1.5λ, so grating lobes and low aperture efficiencies was as expected. A spherical patch antenna array with reduced height has also been used; however, the aperture efficiency was still only 25% due to large inter-element spacing.

An alternative approach to realizing a wide field-of-view has been to fabricate planar subarrays integrated into a three-dimensional frame; however, the seams between the planar subarrays limited the performance.

A common challenge for developing conformal antenna arrays has been fabrication. Conventionally, every element is individually fabricated and then combined, which requires a fair amount of undesirable touch labor. Some automated techniques for fabricating conformal antennas by selectively patterning metal on curved surfaces have been developed; however, these fabrication capabilities are best suited for building narrowband antenna arrays. One particularly promising process for fabricating conformal antenna arrays has been 3D printing because it has enabled printing of complicated UWB antenna geometries both quickly and cheaply.

Thus, there remains a need for improved antenna array designs, and methods of fabricating the same, that are suitable for curved platforms with UWB radiating elements that maximize available gain and field-of-view at all frequencies of interest.

SUMMARY OF THE INVENTION

The present invention overcomes the foregoing problems and other shortcomings, drawbacks, and challenges of designing and fabricating suitable antenna arrays. While the invention will be described in connection with certain embodiments, it will be understood that the invention is not limited to these embodiments. To the contrary, this invention includes all alternatives, modifications, and equivalents as may be included within the spirit and scope of the present invention.

Various deficiencies in the prior art are addressed below by the disclosed systems, methods and apparatus providing an ultra-wide band (UWB) antenna configured to conform to a doubly curved surface and having an operating wavelength λ, the UWB antenna comprising: an array of electrically cooperating antennas emanating outward from a base region to respective locations of an outer surface region conforming to the doubly curved surface, the area of the outer surface region being divided in accordance with a mesh of unit cells defining thereby a plurality of edges and vertices, each of the unit cells having a unit cell minimum area selected in accordance with a desired array gain; wherein for each antenna the respective location of the outer surface region to which the antenna extends is associated with a respective one of the plurality of edges defined by the mesh of unit cells.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 2 is a side elevational view of a UWB Vivaldi Array Antenna according to an embodiment of the present invention.

FIG. 3 is a top view of a conventional, coplanar Vivaldi antenna according to the Prior Art.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions.

Various embodiments provide an ultra-wide band (UWB) antenna configured to conform to a doubly curved surface and having an operating wavelength λ, the UWB antenna comprising: an array of electrically cooperating antennas emanating outward from a base region to respective locations of an outer surface region conforming to the doubly curved surface, the area of the outer surface region being divided in accordance with a mesh of unit cells defining thereby a plurality of edges and vertices, each of the unit cells having a unit cell minimum area selected in accordance with a desired array gain; wherein for each antenna the respective location of the outer surface region to which the antenna extends is associated with a respective one of the plurality of edges defined by the mesh of unit cells.

Various embodiments provide a conformal ultra-wide band (UWB) array on a doubly curved surface configured for wide angle electronic scanning. A quadrilateral mesh or other mesh structure used as a basis for systematically arraying UWB radiators on arbitrary surfaces.

C. PFEIFFER et al., "An UWB Hemispherical Vivaldi Array," IEEE Transactions on Antennas and Propagation, Vol 70/10 (2022) 9214-9224 and C. PFEIFFER et al., "A UWB low-profile hemispherical array for wide angle scanning," IEEE Transaction on Antennas and Propagation," Vol. 71/1 (2022) 508-517 are both incorporated herein by reference, each in its entirety.

Figure 1:
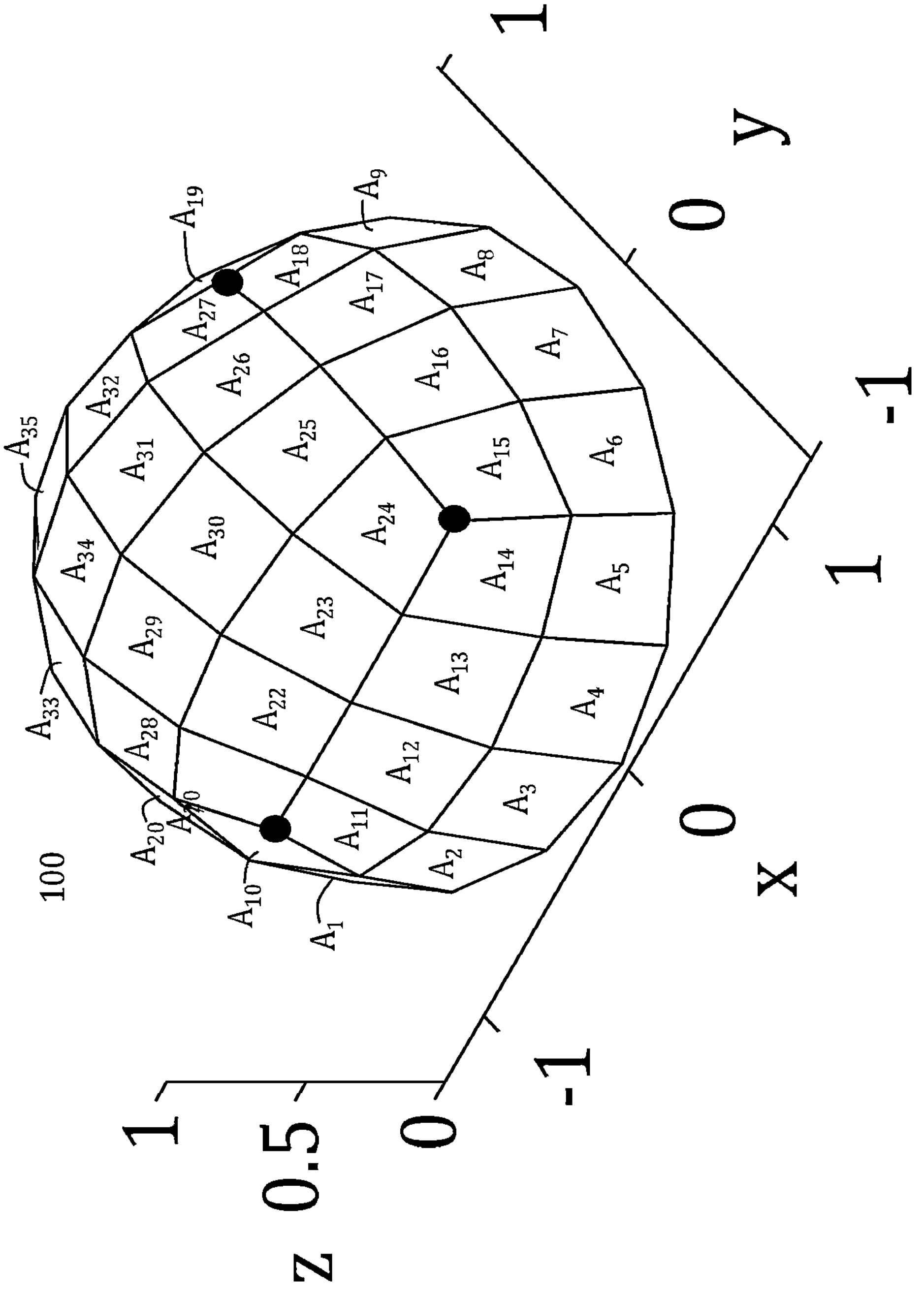
FIG. 1 is a graphical illustration of a quadrilateral model serving the basis of antenna element placement on a hemispherical array according to another embodiment of the present invention.

Referring now to the figures, and in particular to FIG. 1, a quadrilateral mesh model 100 for antenna element placement on a hemispherical array is shown. The model 100 includes 104 edges corresponding to 52 dual-polarized antenna elements (illustrated as Δn, wherein the subscript n is an element number); however, the skilled artisan would readily appreciate that a model having any number of elements could likewise be generated. The election of a 52 dual-polarized antenna element model 100 represented a compromise between prototype size and performance. The selected array size was sufficiently small to minimize costs for fabrication and measurements relatively low while sufficiently large that finite array edge effects were not too significant. Furthermore, the spacing between antenna elements $A_n$ effects the operating frequency since grating lobes start to appear when wavelength is less than twice the antenna spacing. The mesh was generally uniform such that every radiating element $A_n$ should behave similarly. Only four vertices (three of which are illustrated with dots) are slightly irregular where three edges (as opposed to four) are connected.

While not wishing to be bound by theory, the hemispherical model 100 was selected from other arrangements for various reasons. Comparing the model 100 having a radius, r, to a planar array on a circular disk of the same radius, both oriented such that the z-axis is the symmetrical axis of revolution, it may be assumed that the array is large enough such that the gain is proportional to the projected area. It is well known that the projected area of the planar array pointing in a direction, $\theta_0$, from normal is given by:

$$\pi r^2 \cos(\theta_0) \quad \text{Equation 1}$$

It is easy to then show that the projected area of a hemispherical array is given by:

$$\pi r^2\left(\frac{1}{2}+\frac{\cos(\theta_0)}{2}\right) \quad \text{Equation 2}$$

where $\theta_0$ is the angle between the scan direction and the z-axis. The field-of-view, FOV, is the solid angle at which the projected area is above some threshold, and is given by:

$$FOV=2\pi(1-\cos(\theta_{max})) \quad \text{Equation 3}$$

for azimuthally symmetric antennas, such as the planar disc and hemisphere. Here, $\theta_{max}$ is the maximum scan angle at which the projected area is equal to some threshold (e.g., 3 dB below the peak). By setting the projected areas to be equal for the planar and hemispherical cases, it is straightforward to show that:

$$FOV_{hemisphere}=2FOV_{planar} \quad \text{Equation 4}$$

In other words, if the required gain is to be above an arbitrary threshold, then the field-of-view of the hemispherical array will always be twice as large as the field-of-view of the planar array with the same radius. However, the surface area of the hemispherical array is also twice as large. Therefore, for a given number of radiating elements, a planar array will offer twice the gain but half the field-of-view as a hemisphere.

The peak gain of a hemispherical array is a function of the radius and number of antenna elements $A_n$. The hemispherical array with 100% aperture efficiency has gain equal to:

$$\frac{4\pi^2 r^2}{\lambda^2} \quad \text{Equation 5}$$

where λ is the operating wavelength. A maximum array gain occurs when the unit cell area is $\lambda^2/4$ for square lattice arrays. Reducing the wavelength further creates grating lobes such that the gain remains constant. The minimum wavelength for grating lobe free operation is, therefore:

$$\lambda_{min}=r\sqrt{8\pi/N} \quad \text{Equation 6}$$

g where N is the number of dual-polarized elements (i.e., $A_n$) covering a hemisphere with surface area of $2\pi r^2$. Thus, a hemispherical array with 100% aperture efficiency operating at $\lambda_{min}$ will have a maximum gain $$(G_{hemisphere}^{max})$$

equal to:

$$G_{hemisphere}^{max} = N\pi/2 = G_{planar}^{max}/2 \quad \text{Equation 7}$$

where $$(G_{planar}^{max})$$

is the gain of a planar array with N elements.

In considering distribution of the antenna elements $A_n$ of the hemispherical surface, one conceptual design was to evenly distribute the antenna elements $A_n$ in elevation (θ) and azimuth (ϕ) according to a spherical coordinate system. According to this conceptual design, the antenna elements $A_n$ are relatively uniform near θ=90°, but as θ approaches the poles (0° and 180°), the spacing between elements approaches 0, which is not practical. An alternative conceptual design was to evenly distribute the antennas along elevation. A unique azimuth spacing may be chose for each elevation angle to help make element spacing more uniform.

Given the quadrilateral mesh model 100 of FIG. 1, a first embodiment of the present invention may be inferred. The illustrated apparatus 102 of FIG. 2, according to an embodiment of the present invention, utilizes Vivaldi antennae 102 (due to their robust operation) placed along the mesh edges. FIG. 3 illustrates the details of a conventional, coplanar Vivaldi antenna 106 with more detail. Generally speaking, Vivaldi antennae includes two radiator planes 108, 110 are on the same side of a dielectric material 112, a conductor 114, and two leads 116, 118. Vivaldi elements are travelling wave structures that employ a balun and a gradual impedance taper from 50Ω to a free space wave impedance (377Ω). These arrays can easily generate multiple octaves of bandwidth with very little optimization and are therefore, quite robust to geometrical variations.

In use, and with reference now to FIGS. 2 and 4A-4C, the Vivaldi antenna 102 includes a plurality of Vivaldi elements 120, wherein each element 120 is a hemispherical single-pol Vivaldi antenna. Each element 120 includes an SMP (sub miniature push-on) connector 122 coupled to two shorting posts 124, 126. Each shorting post 124, 126 has a conical vertex 128, 130, and each vertex includes a radiating arm 132, 134. While dimensions are provided in FIGS. 4A and 4B, these are merely exemplary (details of prototype are provided below in the examples) and should not be considered to be limiting and, as would be understood by the skilled artisan, the exact dimensions of the element changes depending upon its location in the array. An increase in width (illustrated as an increase from 14 mm at the SMP connector to 34.6 mm at an external apex 136, 138 of each radiating arm 132, 134); however, was necessary to maintain electrical connectivity to neighboring elements along the entire length for this hemispherical lattice.

Figure 4A:
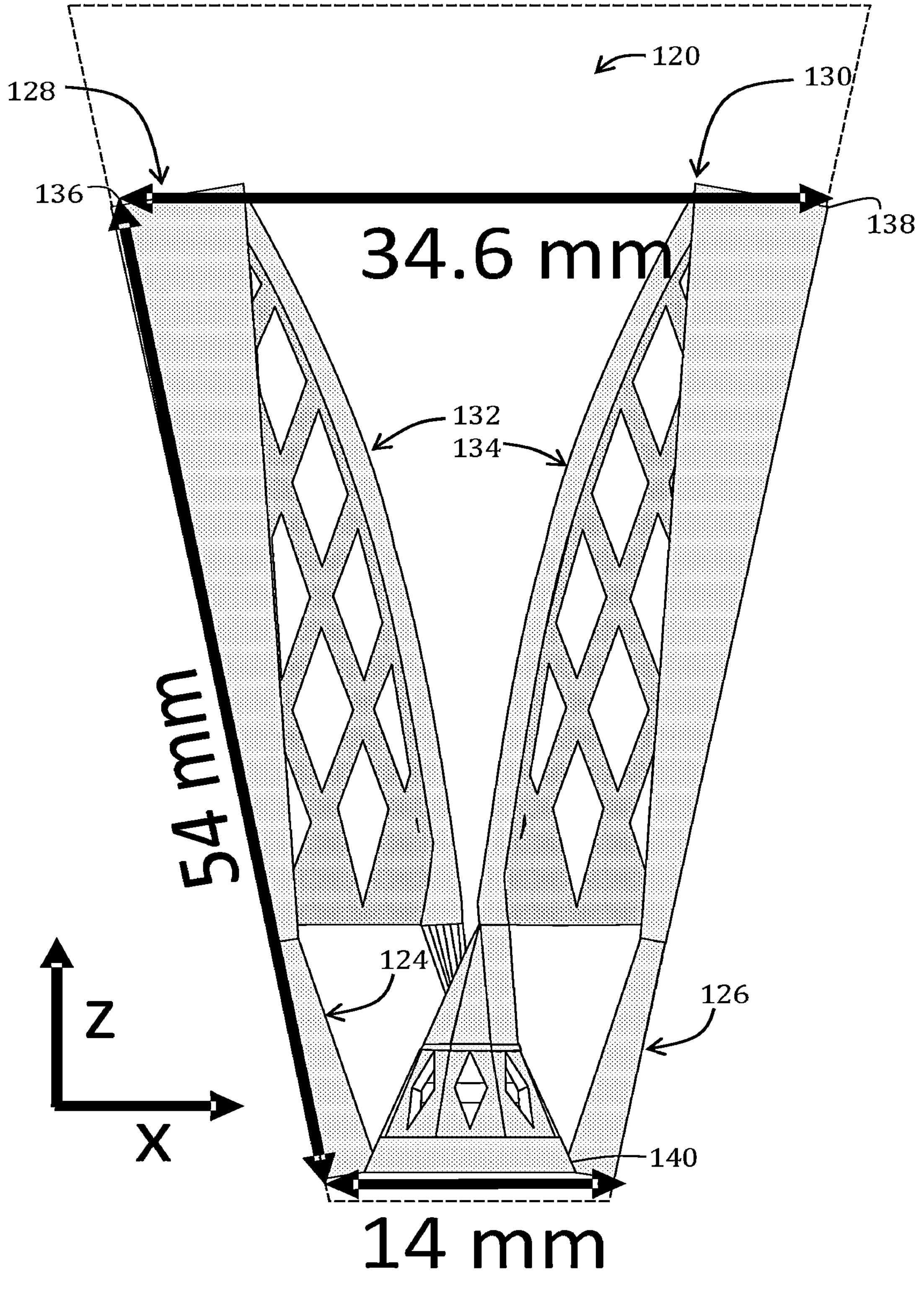
FIG. 4A is a side elevational view of one of the plurality of hemispherical single-pol Vivaldi elements of the antenna of FIG. 2.
Figure 4C:
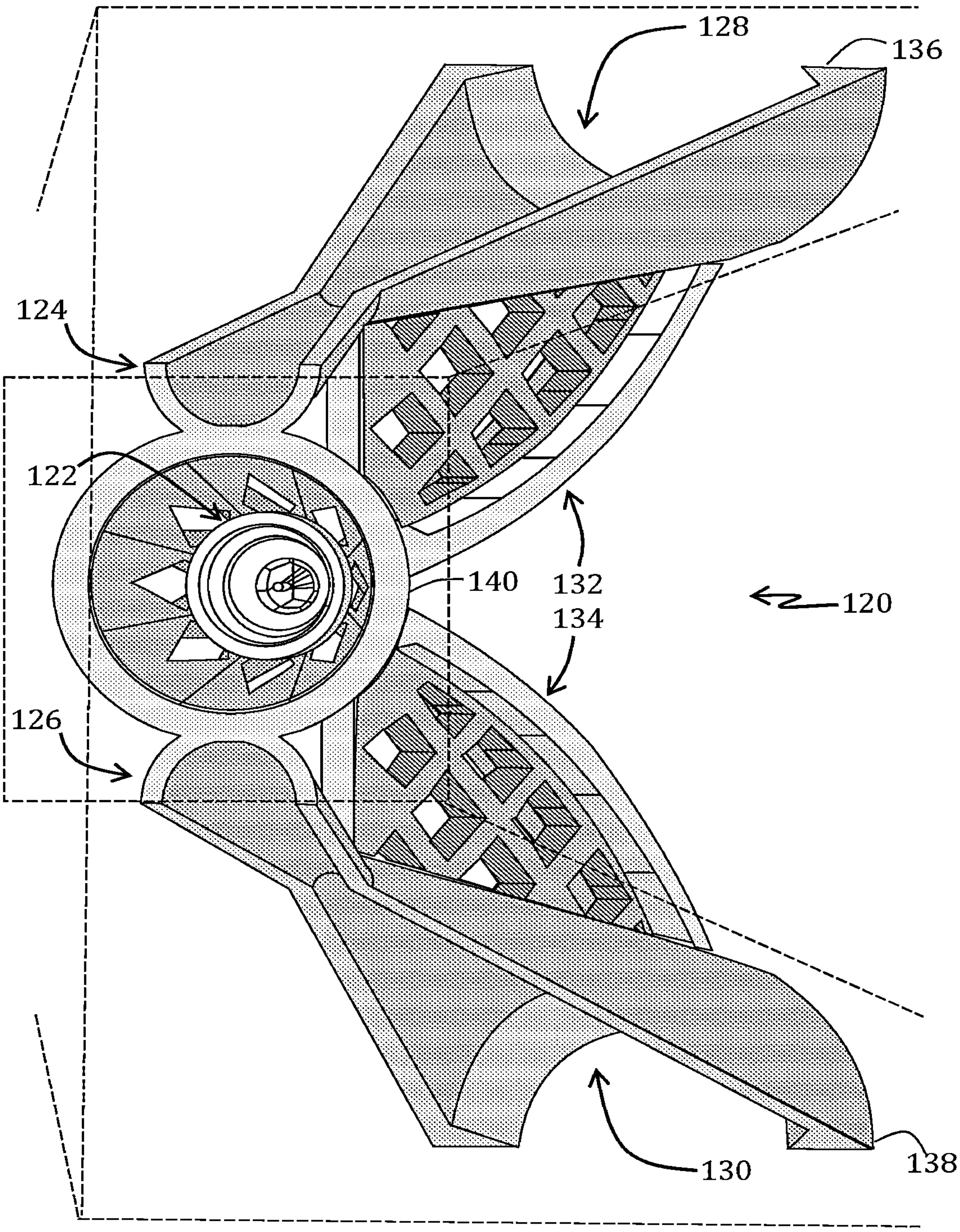
FIG. 4C is a bottom side angle view of the Vivaldi element of FIG. 4A.
Figure 5:
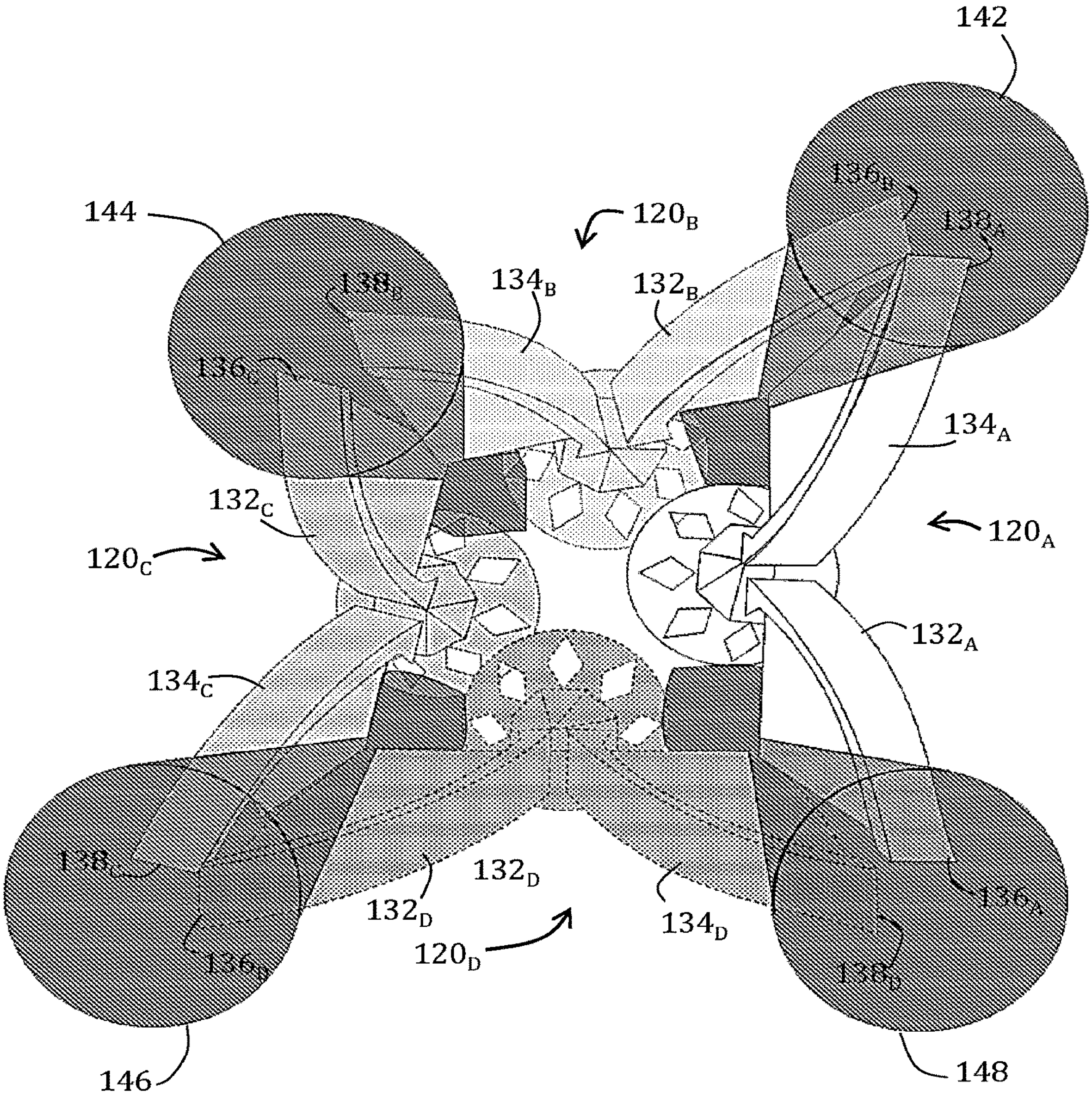
FIG. 5 is a top, side elevation view of four Vivaldi elements.

FIG. 5 is particular illustrative of one manner in which a size of each element (four elements 120$_A$, 120$_B$, 120$_C$, 120$_D$ are shown) may be varied to accommodate the antenna design of FIG. 2 in view of the model 100 of FIG. 1. More particularly, grey cones 142, 144, 146, 148 are positioned at a respective quadrilateral vertex, and the radiating arms (for each respective element 120$_A$, 120$_B$, 120$_C$, 120$_D$) arranged such that the Vivaldi element 120$_A$, 120$_B$, 120$_C$, 120$_D$ is placed at each edge of the quadrilateral mesh. A diameter of a base 140, proximate the SMP connector 122 (FIG. 4C), may all be similarly sized while a diameter at the external apexes 136, 138 changes to fill a space between adjacent elements 120. In general, the dimensions of the Vivaldi element at the external apex (for each respective element 120$_A$, 120$_B$, 120$_C$, 120$_D$) has minimal effect on performance because the wave is loosely bound to the surface. Overlapping the Vivaldi elements 120$_A$, 120$_B$, 120$_C$, 120$_D$ and the conical vertices 128, 130 (FIG. 4A) ensures smooth connection between adjacent elements 120$_A$, 120$_B$, 120$_C$, 120$_D$ and 3D printing accuracy (described below).

Each element 120 may be fabricated using metal 3D printing processes. While fabrication as a unitary structure may be desired, printing with a modular design may be beneficial. According to one embodiment, the radiating arms 132, 134 may be separately printed, coupled to a bottom ground plane with the shorting posts 124, 126, so that each module comes out as a single part.

Finally, the conical vertices are hollowed out to reduce weight. FIG. 2D depicts a view of a Vivaldi element modified to conform to a doubly curved surface. FIG. 2D corresponds to one of the most distorted quadrants in the mesh because it contains an irregular vertex that is only connected to 3 Vivaldi antennas.

The SMP connector 122 feeds the radiating arms 132, 134 using a self-supporting tapered transmission line balun in contrast to a traditional Marchand balun. As shown, each radiating arm 128, 130 may be gridded to reduce weight and cost; however, this is not required nor is the particular gridded pattern illustrated herein required.

A detent in the connector helps ensure a good connection is maintained if there is some vibration or stress on the input cables. Three-dimensional printing of RF push-on-connectors may be in accordance with known methods and procedures.

While Vivaldi antennae provide good solution to the problem addressed, there still remain certain deficiencies. For instance, Vivaldi antennae are significantly longer than recently reported low profile UWB antenna designs, which impacts a minimum radius of curvature on conformal arrays. Vivaldi antennae also have notoriously high cross-polarization when scanning in the diagonal plane. Vivaldi antenna arrays do optimize modularity since every element is electrically connected to its neighbor. Combining multiple subarrays together typically requires hand soldering or placement of conductive grease and epoxy, which many be expensive and labor intensive. Furthermore, the Vivaldi antenna elements do not have an optimized impedance match at different scan angles across the operating bandwidth.

Therefore, and expanding Equation 7, the theoretical gain limit ($G_{max}$) of a hemispherical array based on projected area and number of elements equals:

$$G_{max} = \min\left(\frac{4\pi A}{\lambda^2}\right), N\pi/2 \quad \text{Equation 8}$$

where $$A = \pi r_0^2\left(\frac{1}{2} + \frac{\cos(\theta)}{2}\right) \quad \text{Equation 9}$$

is the projected area for a given scan direction (θ), $r_0$ is the array radius, and N is the number of dual-polarized antenna elements. The maximum gain of Nπ/2 occurs when the average inter-element spacing equals λ/2. At smaller wavelengths, the array is sparsely sampled and sidelobes contain a larger percentage of radiated power such that the gain is roughly constant.

While square and triangular lattices are commonplace for planar arrays, there are no periodic methods for covering a doubly curved surface such as a hemisphere with antennas. The conceptually simplest approach is to evenly distribute the elements in elevation (θ) and azimuth (ϕ) in the spherical coordinate system. However, the spacing between antenna elements approaches 0 at the poles, which is impractical.

Figure 18:
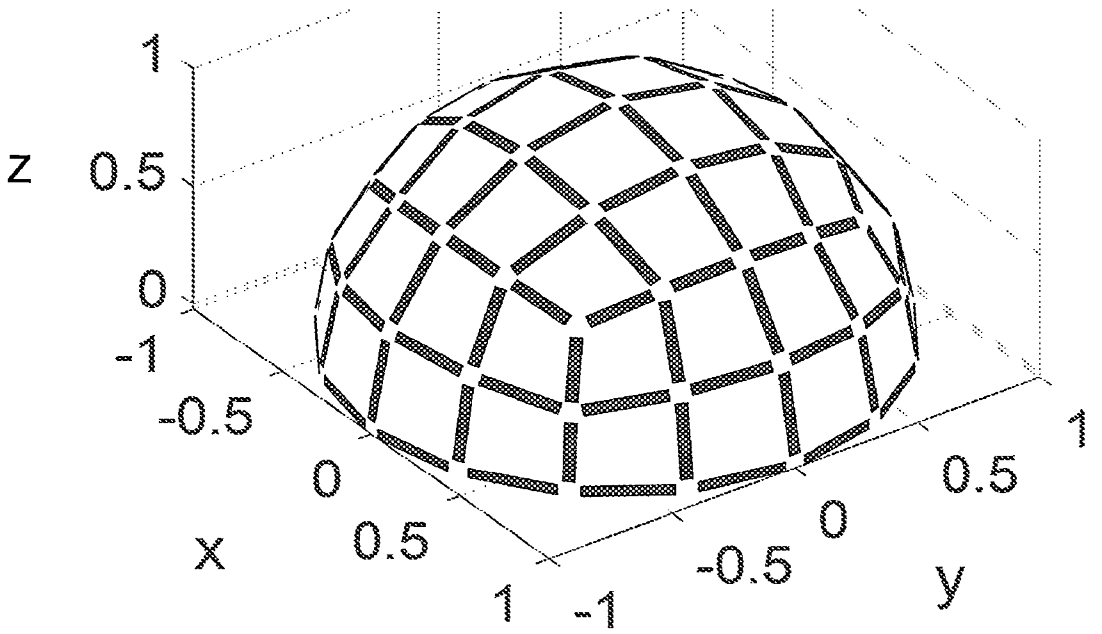
FIG. 18 is a graphical illustration of a quadrilateral model serving the basis of antenna element placement on a hemispherical array according to another embodiment of the present invention.

Leveraging quadrilateral meshing tools, an array lattice on an arbitrary contoured surface is shown in FIG. 18 according to an embodiment of the present invention. A linearly polarized antenna along each mesh edge. The illustrate embodiment includes 104 linearly polarized antenna elements (i.e., 52 dual-polarized elements); however, the number of elements and respective sizes is controllable. The illustrated embodiment including 52 dual-polarized antenna elements is a compromise between prototype size and performance. The dual-polarized antenna elements support arbitrary radiated polarizations; however, radiate right-handed circular polarization here because circular polarization has a particularly intuitive definition over a very wide field of view.

Figure 19A:
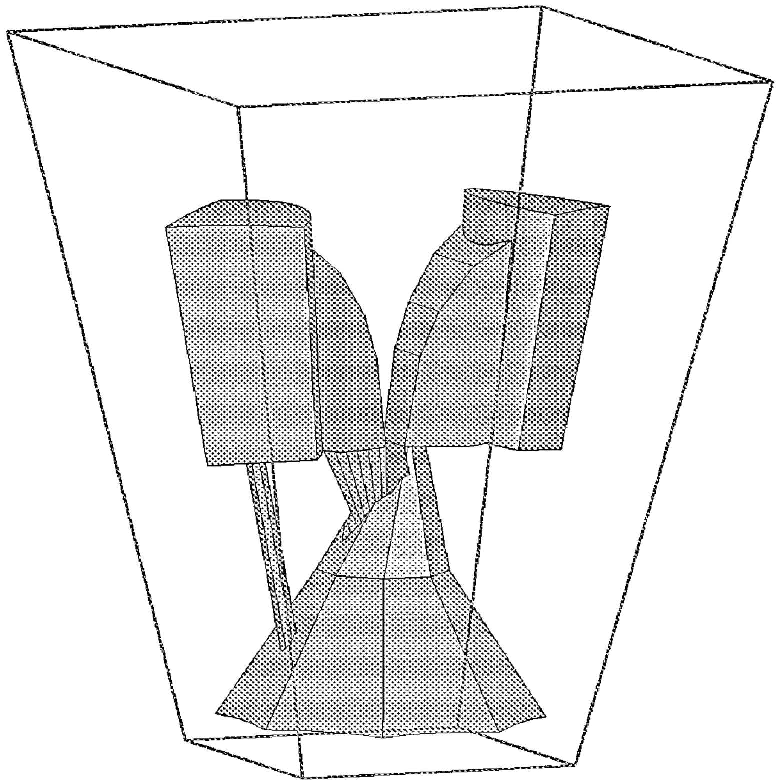
FIGS. 19A and 19B are a side elevation view and a bottom side angle view of a BAVA element for the antenna of FIG. 18.
Figure 19B:
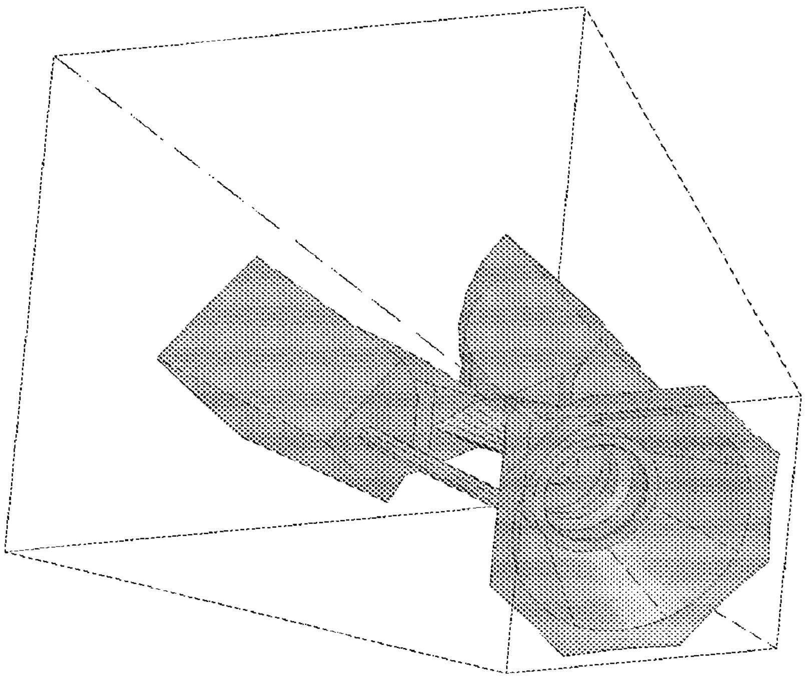

FIGS. 19A and 19B illustrate a BAVA element according to an embodiment of the present invention and for use with the array of FIG. 18. The BAVA element includes a segmented cylinder, a shorting post, and a ground plane skirt, which may incorporate an SMP connector as described previously. BAVA elements are generally known, and typically have a 4:1 bandwidth ratio, but some optimized versions have demonstrated good impedance match over a decade bandwidth. A characteristic feature of the BAVA is the use of a tapered transmission line balun to feed symmetric flared dipole arms. Each antenna is capacitively coupled to the neighboring element, similar to most other low profile UWB arrays. A desirable feature of the BAVA array is the modularity since every element is mechanically separate from the neighboring elements. Thus, antenna modules can be fabricated independently and then combined without having to use solder, conductive epoxy, or conductive grease.

The BAVA element may be fabricated using a 3D printing process, such as by direct metal laser sintering (DMLS). Some geometrical features are specifically implemented to be compatible with the fabrication process. All features have a swept angle less than 50° from normal so that the part is self-supporting. Therefore, rather than a traditional ground plane, we use a ground plane skirt. In addition, we add shorting posts to the dipole arms that are connected to the coax center conductor to ensure the antenna comes out of the printer as a single part. The segmented cylinders attached to the dipole ends help ensure uniformity of the capacitance between adjacent antenna elements in the hemispherical array. This is important because antennas on doubly curved surfaces all have distorted geometries.

Figure 20A:
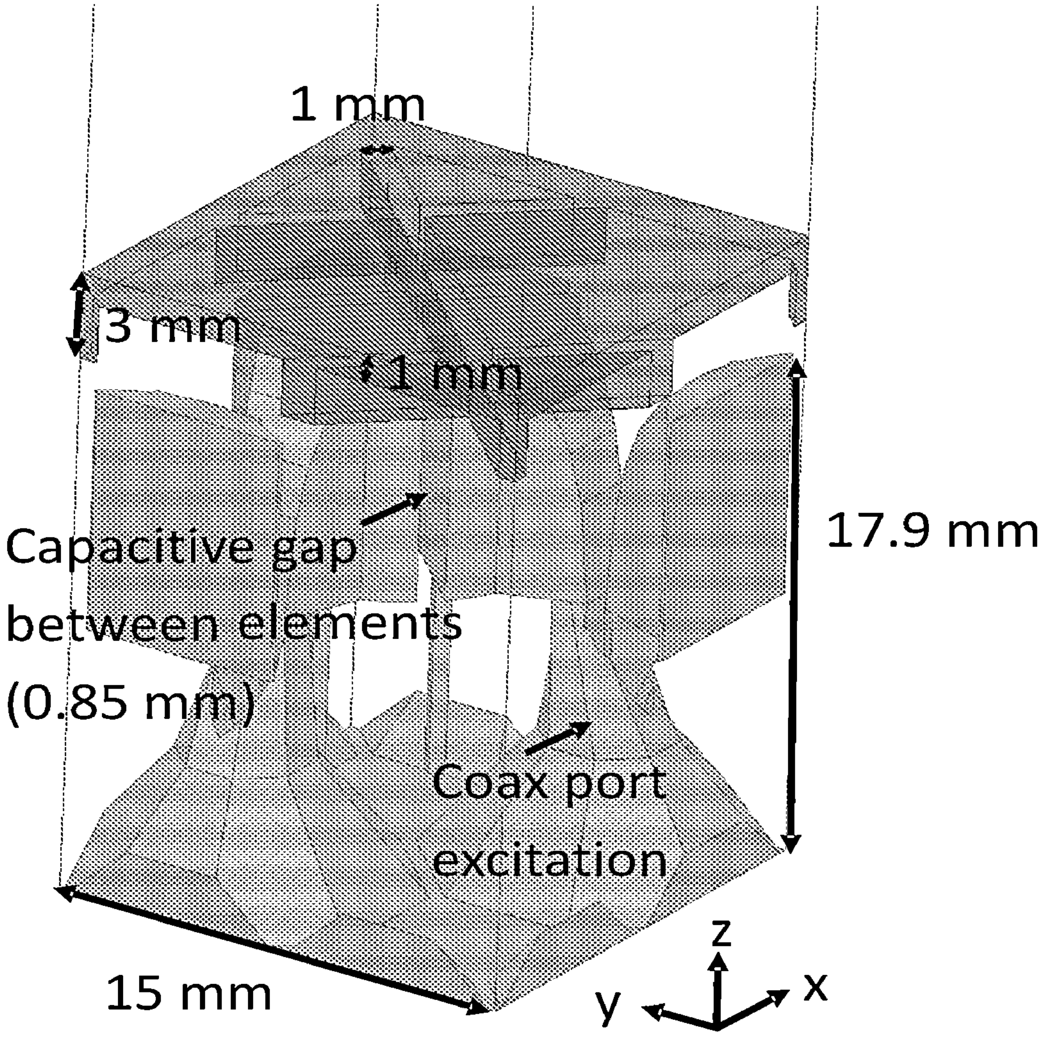
FIGS. 20A and 20B are two side elevational views of optimized BAVA unit cells according to an embodiment of the present invention.

The aperiodicity of conformal arrays leads to variation in the size and shape of each antenna element. An approximation that the radius of curvature is made sufficiently large such that the hemispherical BAVA array may be modelled as an infinite planar array. An optimized planar array unit cell is shown in FIG. 20A. The cell size is 15 mm×15 mm, which implies a maximum operating frequency of 10 GHz with grating lobe free operation. The antenna thickness is 17.9 mm which corresponds to λ/1.7 at 10 GHz. This electrical thickness is relatively standard for state-of-the-art low-profile arrays with multi-octave bandwidths.

A ridged radome atop the antenna. The radome consists of a thin 1 mm thick ULTEM sheet that is supported by 0.8 mm wide and 2 mm tall quadrilateral ridges. From an RF perspective, the radome perturbs the antenna performance. Therefore, the radome is included in design/simulations to realize an optimized performance. However, it is thin enough such that its presence does not significantly impact the main design principles of the BAVA element.

Methods for designing or defining an UWB antenna configured to conform to a doubly curved surface and having an operating wavelength A may include defining a planar mesh comprising a plurality unit cells, each unit cell having a minimum area between approximately $\lambda^2/4$ and approximately $\lambda^2/2$. The planar mesh is then conformed to the doubly curved surface to represent thereby a conformed mesh of unit cells having edges therebetween. The number of antennae, N, for use in an array of electrically cooperating antennas, wherein each antenna emanates outward from a base region of the UWB antenna to a respective planar mesh edge may then be determined. The number, N, may be an integer less than a total number of edges in the conformed planar mesh representation of the doubly curved surface. The antennae may be Vivaldi, BAVA or other radiator types, or combinations thereof, having a proximal portion and a distal portion separated by a respective length, l, the proximal portion configured to include a balun enabling electrical cooperation with adjacent Vivaldi radiators in the array of antennas, the respective length, l, being selected to cause the respective distal portion to extend from the base region of the UWB antenna to the respective planar mesh edge.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1—Unit Cell Model Simulation

Figure 4B:
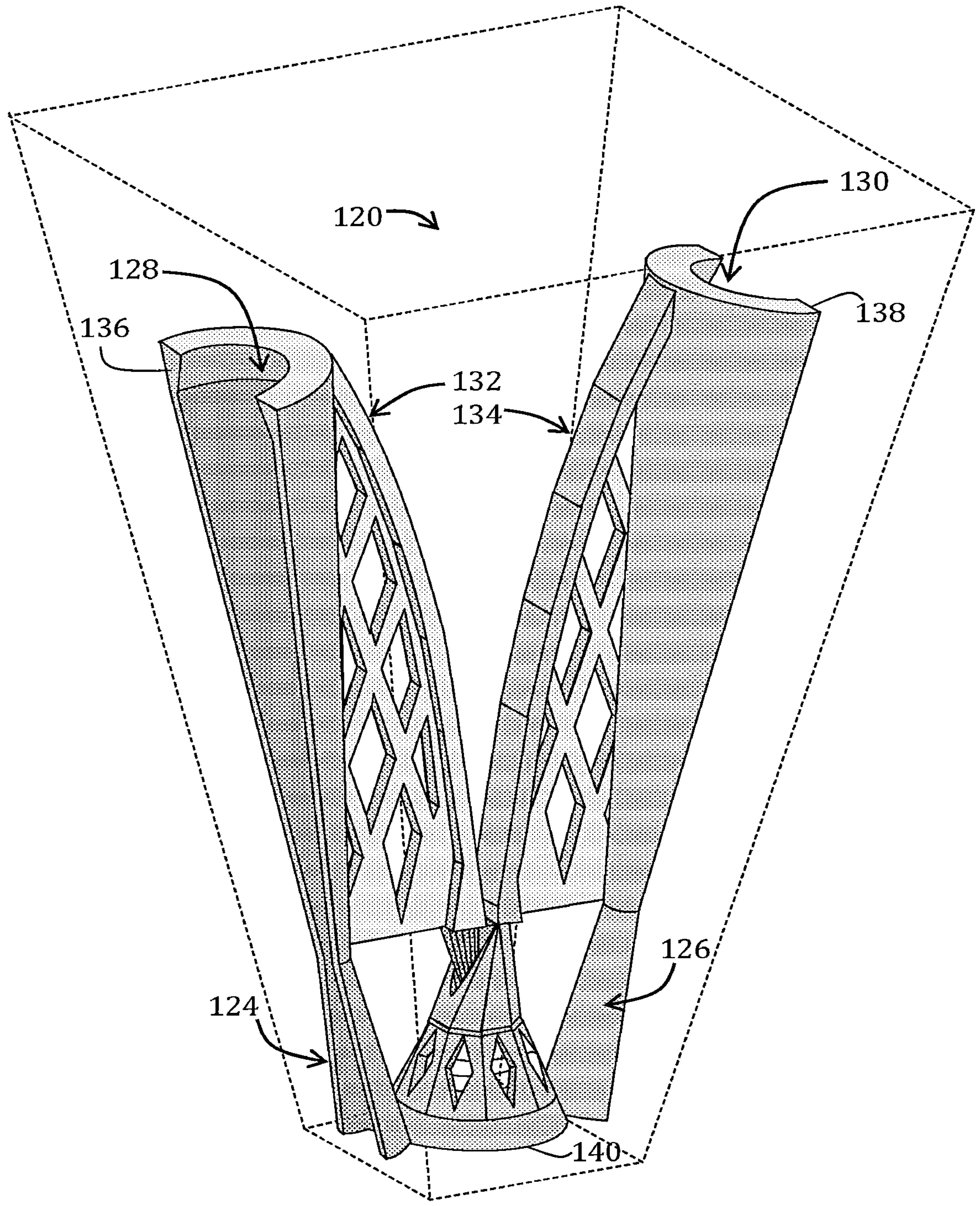
FIG. 4B is a perspective view of the Vivaldi element of FIG. 4A.

The antenna illustrated in FIGS. 4A-4C was simulated as a unit cell of the dual-polarized antenna element in a quasi-infinite array environment. Four sides of the unit cell were angled such that they approximate a radius of curvature of the doubly curved antenna geometry. Edges of the simulation domain have periodic boundary conditions with 0° phase delay between opposite sides to approximate the case where every element is excited in phase. While this does not correspond to the excitation that will be used an actual array, it does provide a qualitative estimate for the array performance that accounts for mutual coupling.

The array had 104 ports corresponding to 52 dual polarized antenna elements, 181.5 mm in diameter corresponding to a minimum wavelength of $\lambda_{min}$=126 mm (4.75 GHz). The calculated maximum gain was found to be 19.1 dB.

Figure 6:
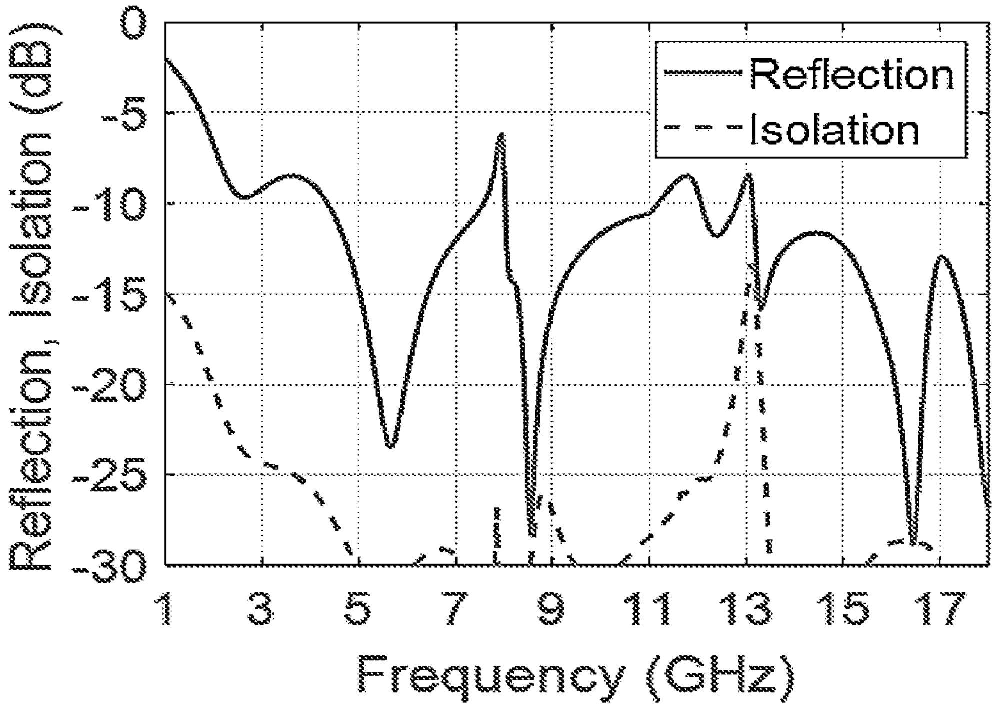
FIG. 6 graphically illustrates the active reflection coefficient and orthogonal port isolation of the unite cells of FIG. 4A.

The active reflection coefficient and orthogonal port isolation are graphically shown in FIG. 6. The active reflection for the x- and y-polarized ports are identical due to the unit cell symmetry. Orthogonal port isolation was defined as the transmission coefficient between the x- and y-directed Vivaldi antenna ports. Within the limit of the radius of curvature approaching infinity, the unit cell simulates an infinite planar array pointing towards broadside. The antenna has a decent active impedance match above 2 GHz with reflection below −8 dB for most frequencies. The orthogonal port isolation was quite low (less than −20 dB for most frequencies). There are narrow resonances near 8 GHz and 13 GHz, which are likely due to surface waves; however, the impact of these surface waves is often reduced when the array is finite and not periodic.

The unit cell of FIGS. 4A-4C is not optimized for a low reflection coefficient since the simulation only provides a qualitative performance estimate of the hemispherical array. Instead, we simply rely on the fact that Vivaldi radiators generally have a good impedance match when the antenna height is greater than λ/2.

The simulated radiation efficiency was found to be greater than 95% across the band (1 GHz to 21 GHz) even though the metal conductivity was 30 times lower than that of copper. The Vivaldi antenna has a high radiation efficiency because it is not resonant, has low peak current density, and a moderate electrical length of $3.8\lambda_H$ at the maximum operating frequency.

Example 2—Hemispherical Array Model Simulation

Figure 7:
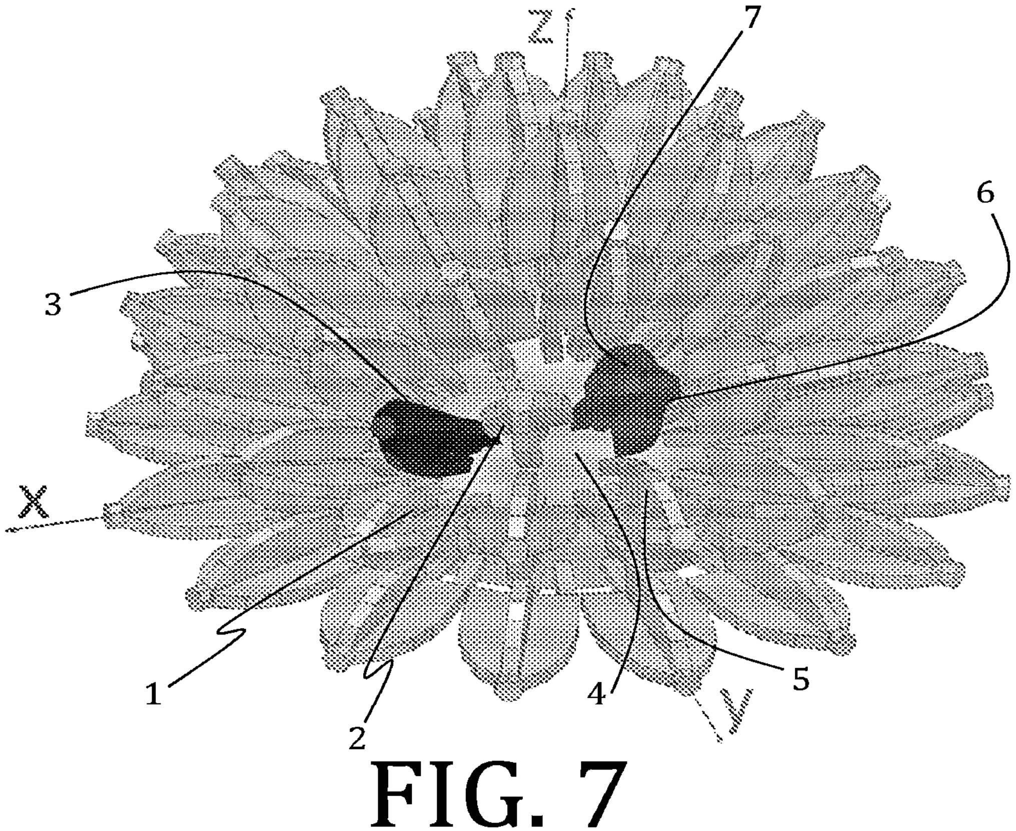
FIG. 7 is a schematic of model UWB Vivaldi Array Antenna for use in computer simulations.

FIG. 7 illustrates a simplified array model according to the embodiment of FIG. 2. The model consisted of a 52 element, dual-polarized Vivaldi array arranged over a 181 mm diameter hemisphere. While a hemispherical array is not truly periodic, it was important to analyze the patterns at various pointing angles on the finite array to evaluate the antenna performance. Therefore, the full hemispherical geometry was not simulated. The simplified model of FIG. 7 removes most of the subwavelength features of the actual design of FIG. 2 in order to reduce the simulation mesh. For example, the tapered transmission line balun is replaced with an ideal lumped port that feeds the symmetric Vivaldi arms. Nevertheless, the model of FIG. 7 it is still useful for estimating many aspects of the array performance.

Figure 8A:
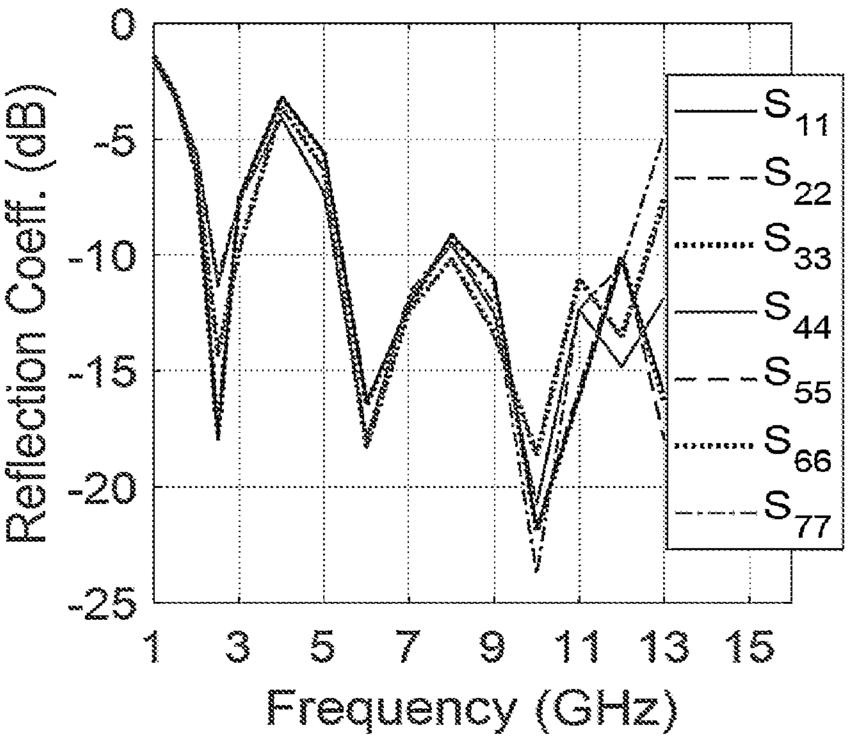
FIGS. 8A and 8B graphically illustrate simulated reflection and transmission coefficients, respectively, calculated using the model of FIG. 7.
Figure 8B:
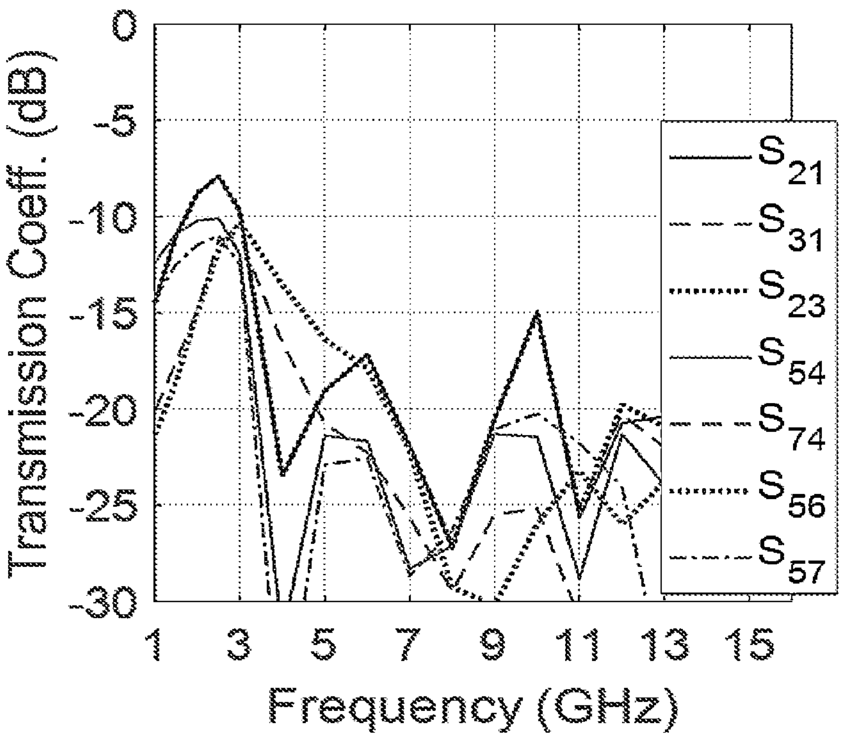
Figure 9A:
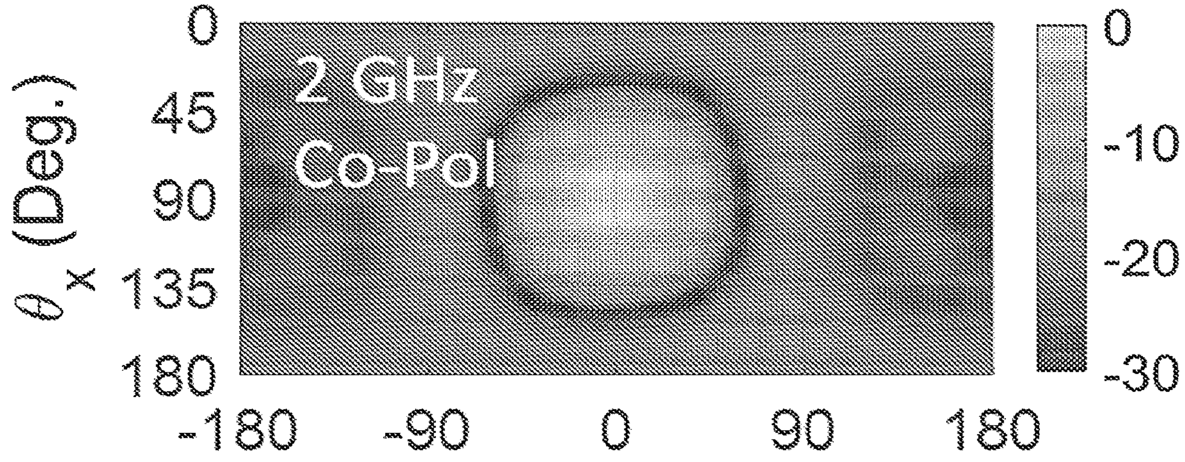
FIGS. 9A-9F graphically plot simulated radiation patterns at 2 GHz (FIGS. 9A and 9B), 5 GHz (FIGS. 9C and 9D), and 10 GHz (FIGS. 9E and 9F) when the array points toward θ=0° using the model of FIG. 7.
Figure 9B:
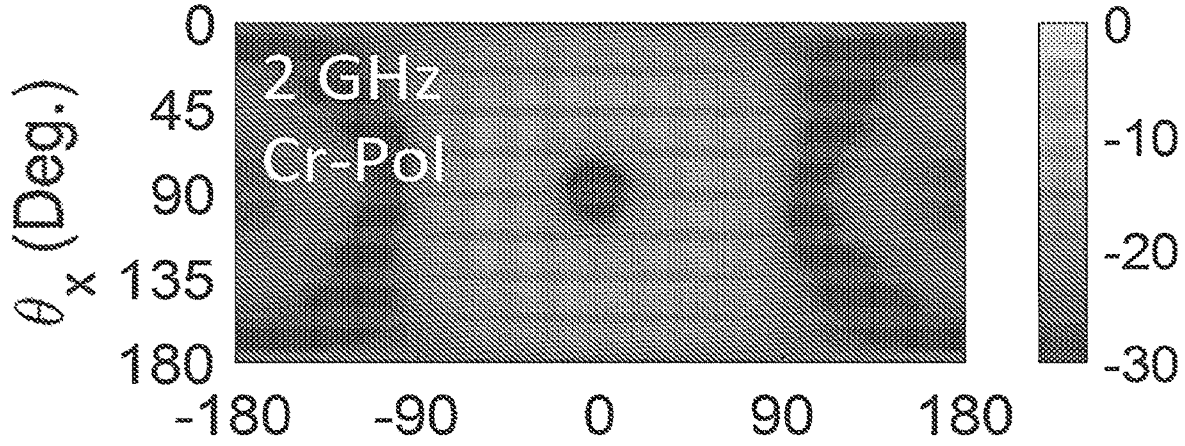
Figure 9C:
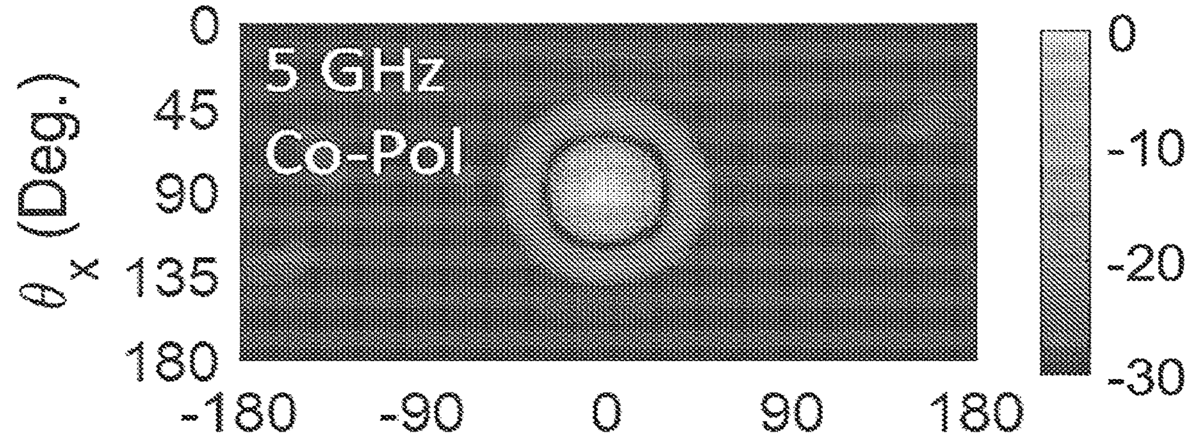
Figure 9D:
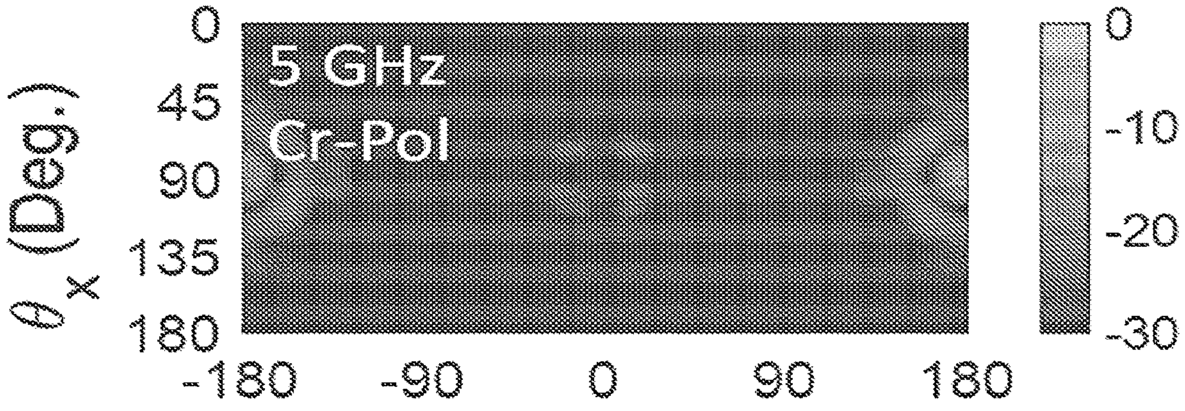
Figure 9E:
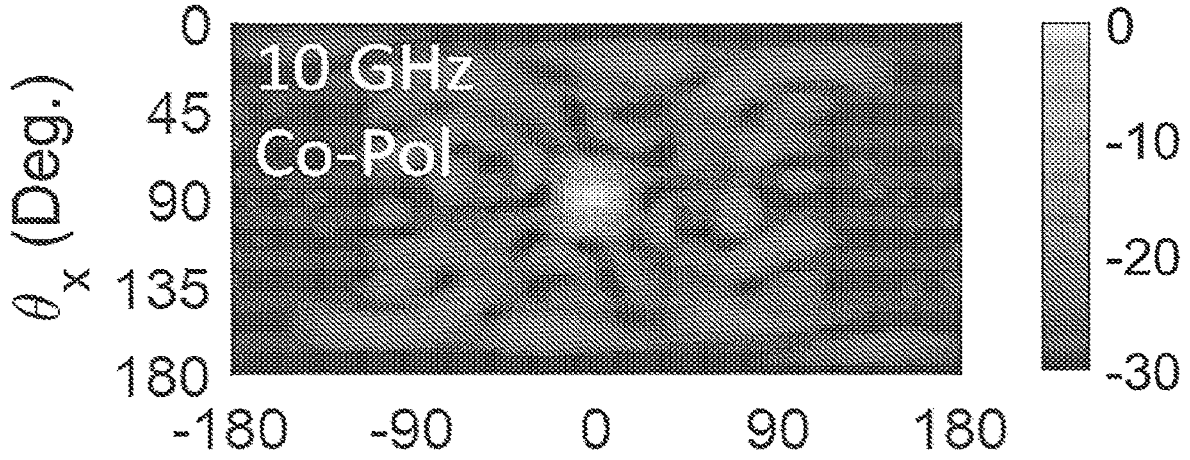
Figure 9F:
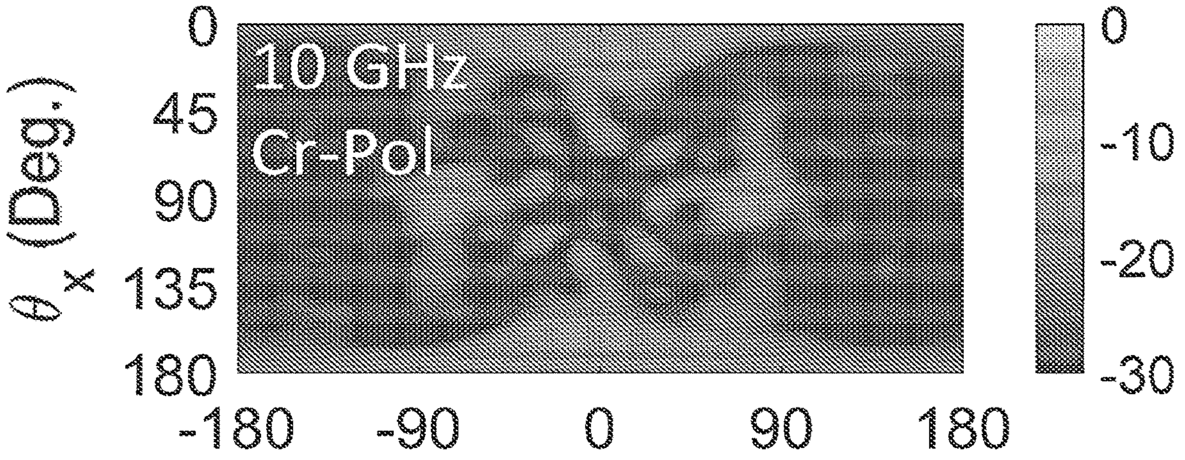
Figure 10A:
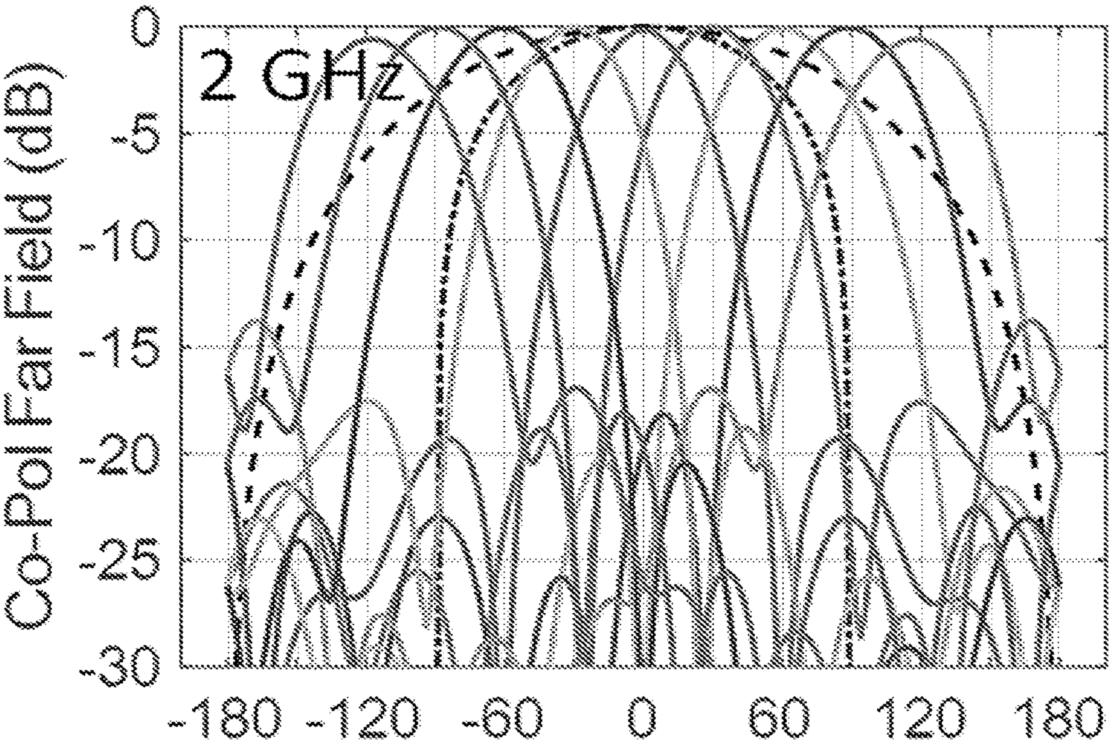
FIGS. 10A-10F graphically plot radiation patterns across a field of view at 2 GHz (FIGS. 10A and 10B), 5 GHz (FIGS. 10C and 10D), and 10 GHz (FIGS. 10E and 10F) using the model of FIG. 7.
Figure 10B:
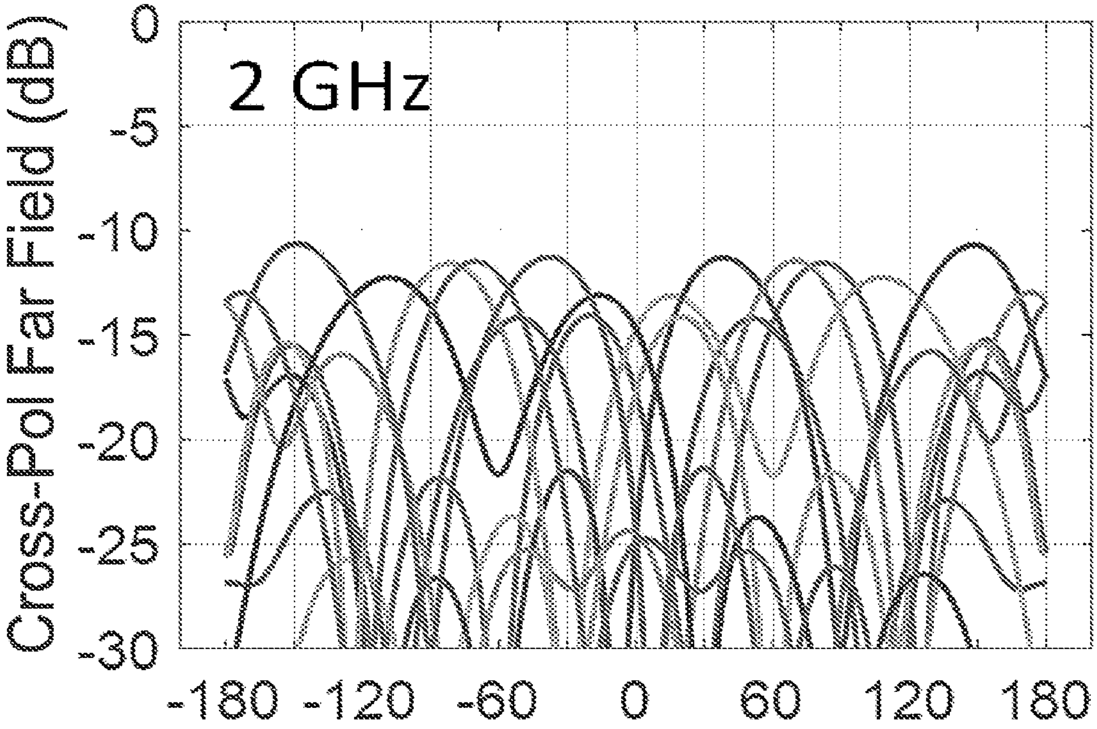
Figure 10C:
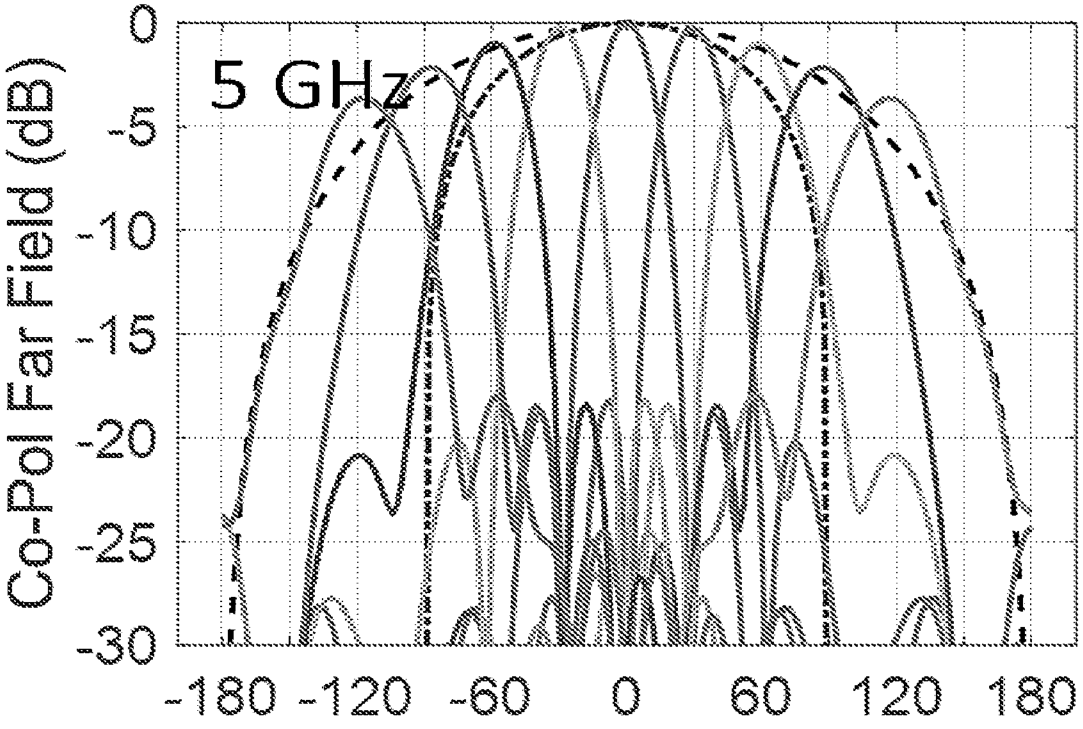
Figure 10D:
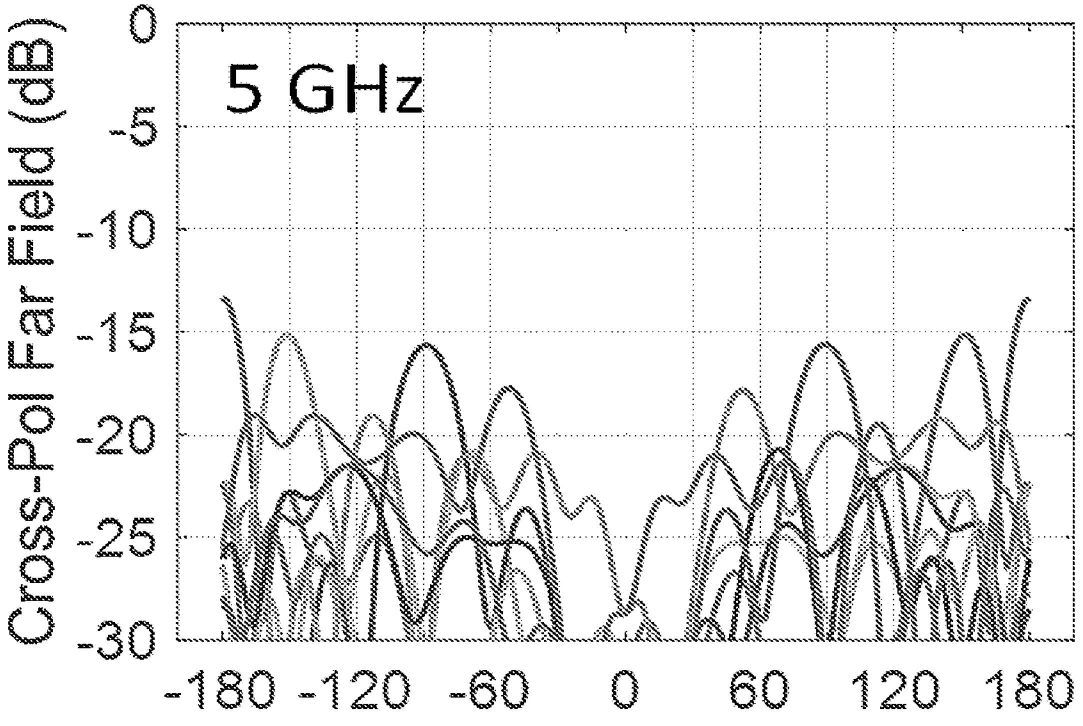
Figure 10E:
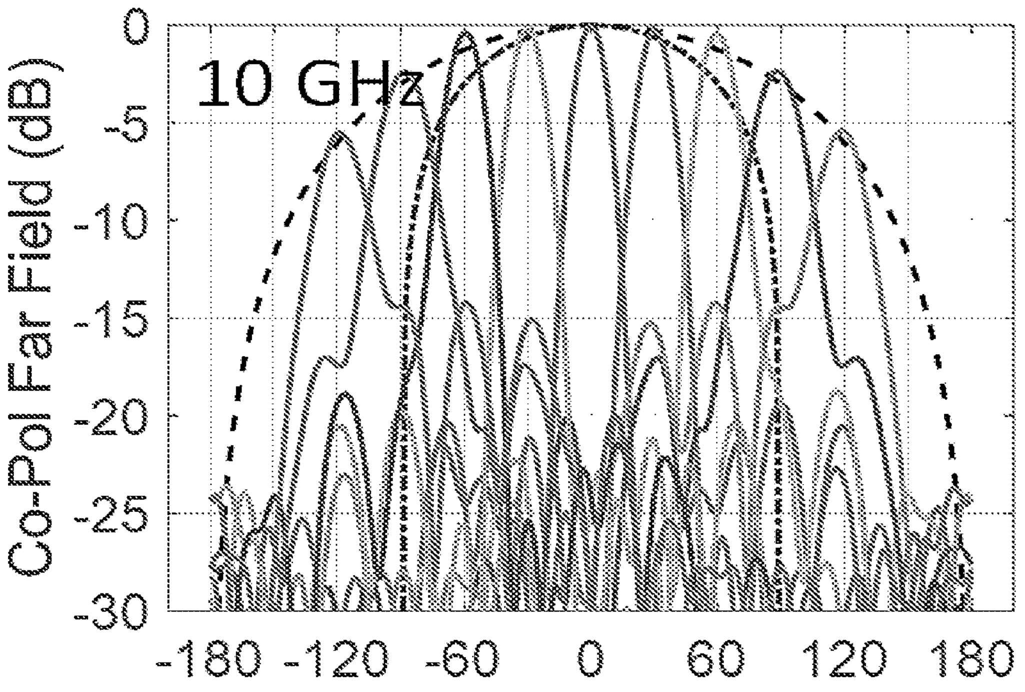
Figure 10F:
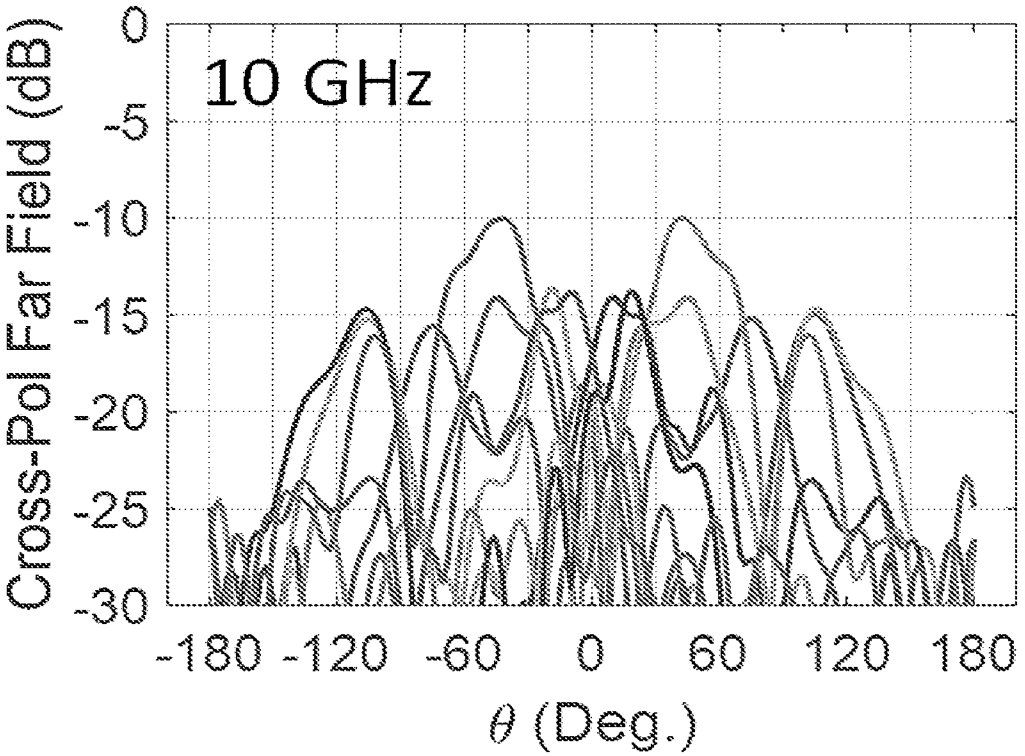

The reflection and transmission coefficients (FIGS. 8A and 8B, respectively) of various antenna elements 1, 2, 3, 4, 5 were simulated. The most distorted elements 1, 2, 3 were those connected to the blue irregular vertex; the more regular elements were connected to the red vertex 4, 5, 6. The reflection coefficient of a single port was found to be higher than an active reflection coefficient, as is typical for UWB arrays. In general, there is close agreement between the input impedance and coupling, for all ports, which suggest that distorting the antennas to conform to the doubly curved surface had a minimal impact on performance.

To evaluate radiation patterns, the array was excited to generate a right-handed circularly polarized beam. The weights feeding each port were calculated by illuminating the array with an incident right-handed circularly polarized plane wave and noting the received complex voltage at each element.

The array was excited with a complex conjugate of the received voltages, and the resulting the radiation patterns were calculated. The array may also radiate linear polarization, but circular was chosen it has a more intuitive definition when scanning over a very wide field of view. Other beamforming approaches applicable to conformal arrays may also be utilized but were not specifically simulated here.

FIGS. 8A-8F graphically plot (x-axis is $\phi_x$, measured in degrees) the simulated radiation patterns at 2 GHz, 5 GHz, and 10 GHz when the array points toward θ=0°. The radiation pattern was plotted on a modified coordinate system labelled $\theta_x$ and $\phi_x$, which had the x-axis pointing in the same direction as the main beam. This modified coordinate system provided a more intuitive visual representation of the beam because the main beam is circular when it is located at $\theta_x$=90°, $\theta_x$=0°. The irregular sidelobes at 10 GHz were expected since the array is under-sampled at frequencies above 4.75 GHz. Excellent cross-pol levels away from the scan direction were not expected because Vivaldi radiators have notoriously high cross-polarized radiation in the D-plane.

FIGS. 10A-10F plot the radiation pattern across the field of view at 2 GHz, 5 GHz, and 10 GHz. The beam was scanned between θ=−120° and θ=+120° at every 30° in the ϕ=0° plane. For reference, dashed lines correspond to a theoretical gain of hemispherical, (½+cos(θ)/2), and planar arrays, (cos(θ)). The array generated well-formed beams at the various frequencies and scan angles. Sidelobe and cross-pol levels were commensurate with planar arrays. The gain vs. scan angle generally followed the theoretical value of a hemispherical array. The gain at wide scan angles at 2 GHz was significantly larger than the theoretical value based on projected area because theory assumes the array is electrically large (r>>λ), but this assumption is not valid at low frequencies such as 2 GHz (r=λ/1.7).

Figure 11A:
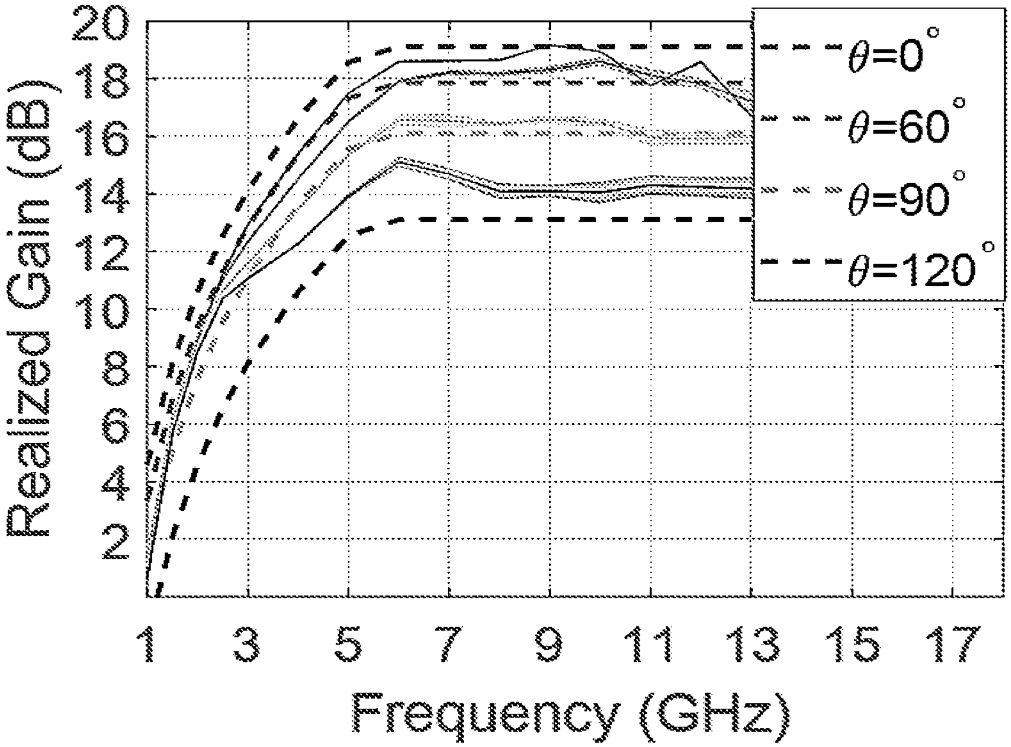
FIGS. 11A-11D graphically plot gain, loss, cross-pol, and peak reflection versus frequency at different elevation scan angles using the model of FIG. 7.

FIGS. 11A-11D plot simulated gain (FIG. 11A), loss (FIG. 11B), cross-pol (FIG. 11C), and peak reflection (FIG. 11D) vs. frequency at different elevation scan angles. The realized gain is the product of the antenna gain and mismatch loss. For each elevation angle, θ, the array is scanned over all azimuth, ϕ, angles. The linewidth of the curves in FIGS. 11A-11C correspond to ±1 standard deviation across azimuth. In general, the linewidth is less than 0.5 dB in FIG. 11A, which suggests the gain was relatively independent of azimuth scan angle, as expected. Dashed lines in FIG. 11A plot the gain of a theoretical hemispherical antenna with a 100% aperture efficiency and the same 181.5 mm diameter. Simulations data (now presented here) show the array achieves close to optimal performance. As mentioned earlier, the theoretical gain is constant above 4.75 GHz because the array was undersampled at these frequencies. Again, theory assumes a large projected area ($A_p>>\lambda^2$) which is less valid at lower frequencies and wider scan angles. Therefore, more discrepancy may be observed between theory and simulation in such regimes.

Figure 11B:
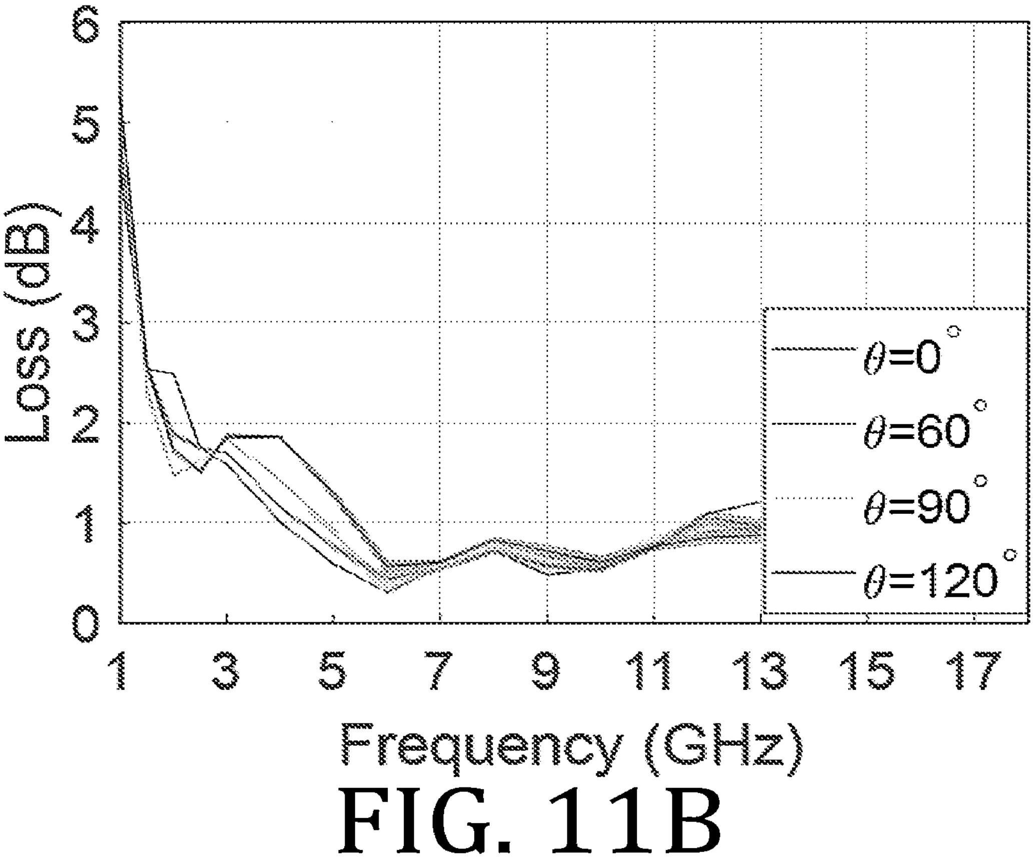
Figure 11C:
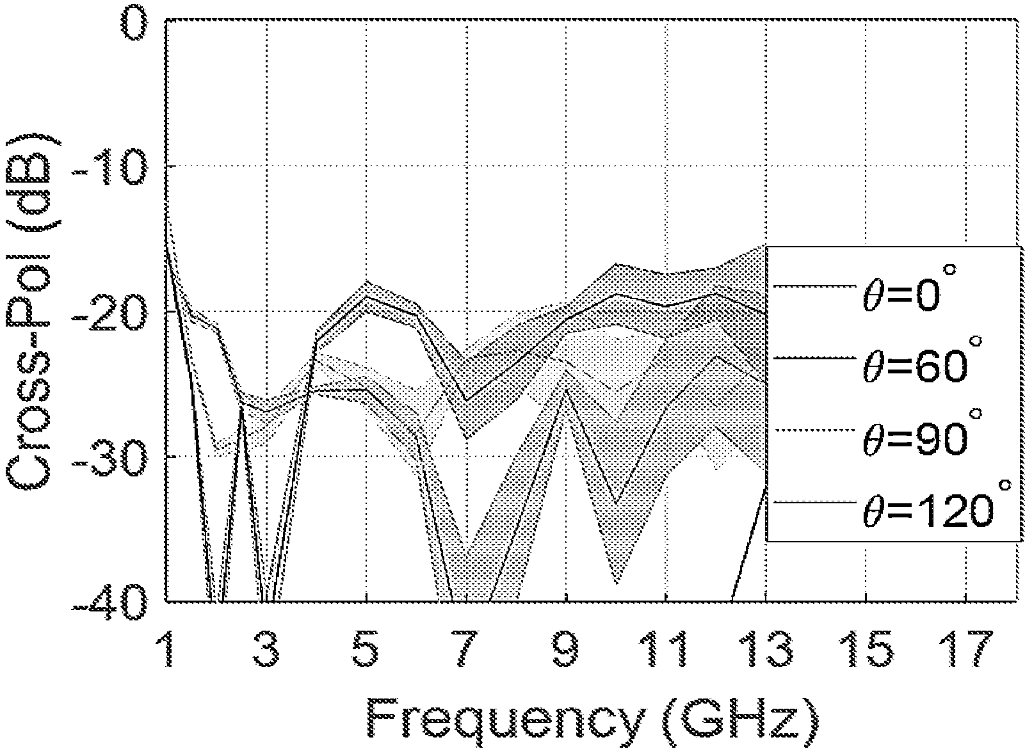

The loss in FIG. 11B corresponded to the ratio of realized gain to directivity, which was identical to a product of the mismatch loss and radiation efficiency. The loss was dominated by the mismatch loss because each element achieves more than 95% radiation efficiency. The mismatch loss was around 2 dB in the frequency range of 1.5 GHz to 5 GHz, which was significant but expected. The mismatch loss may be improved in array embodiments that optimize the element impedance match. The mismatch loss was less than 1.3 dB above 5 GHz and scan angles less than 120°. The cross-pol of FIG. 11C corresponded to the ratio of left-handed circular polarization to right-handed circular polarization in the scan direction. In general, the cross-pol is relatively low (less than −20 dB), even at wide scan angles.

Figure 11D:
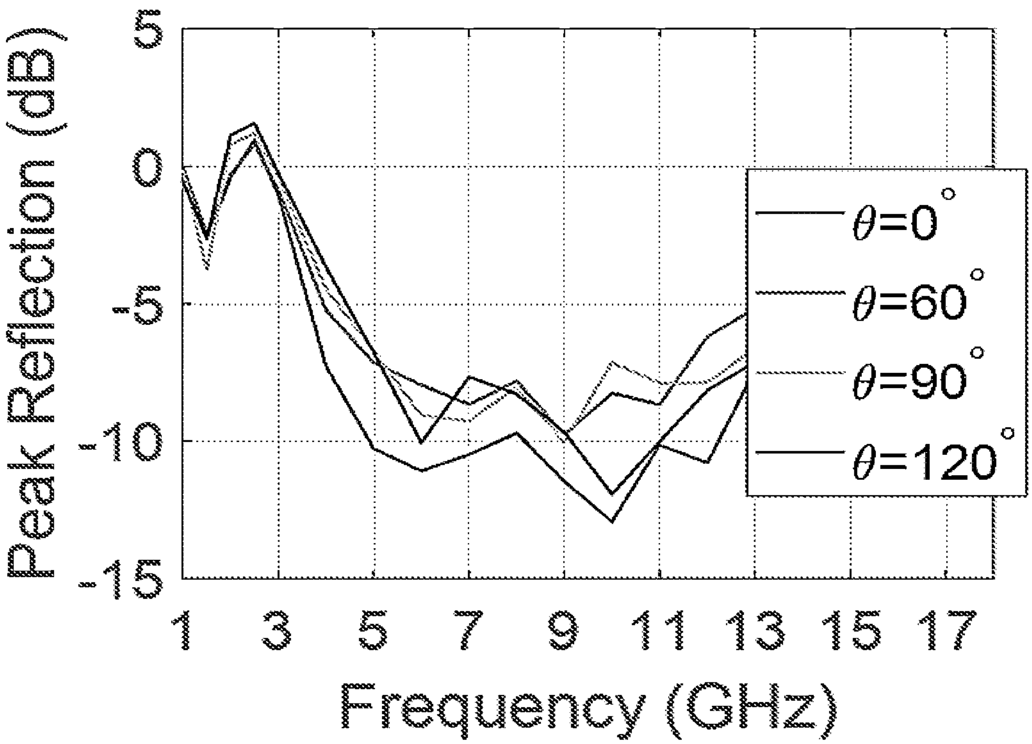

FIG. 11D plots a worst-case active reflection coefficient for all azimuth scan angles and all antenna ports. For example, if every element is excited with 0 dBm or less power and the elevation angle is θ=60°, a peak reflection of −5 dB would mean that all elements have ≤−5 dBm power reflected into the ports when the array is scanned to any azimuth angle. At frequencies less than 3 GHz, some elements had high peak reflection near 0 dB, even though the overall mismatch loss is around 2 dB. A 0 dB reflection may be problematic if the array transmits high-power and the power amplifiers are not suited to handle high reflection. Other methods of beamforming that account for the antenna array scattering parameters may mitigate this high peak reflection.

Example 3—Prototype

Figure 12:
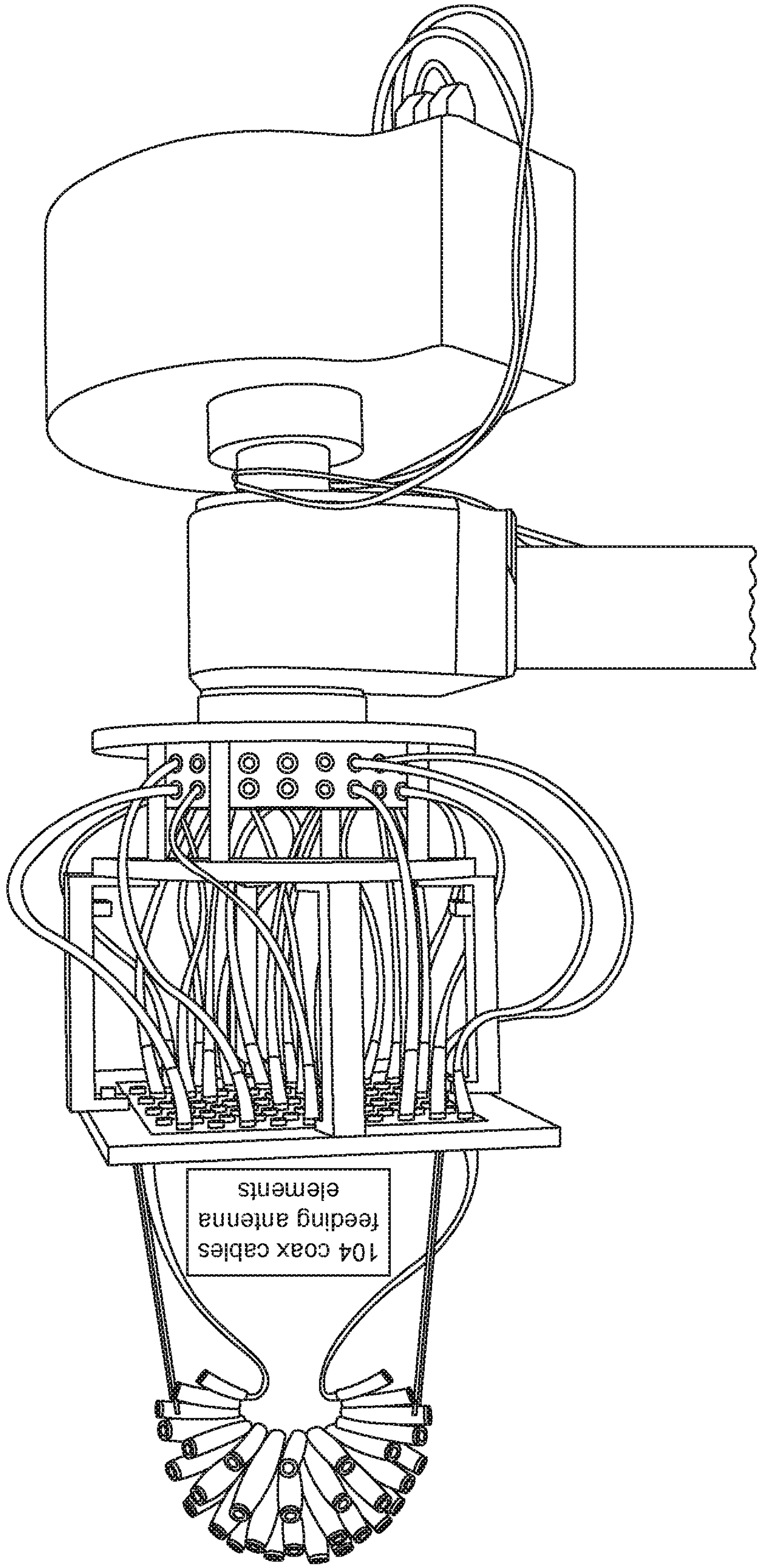
FIG. 12 is a photograph of a prototypical system prepared in accordance with an embodiment of the present invention.

A prototypical array according to an embodiment of the present invention was fabricated and shown in FIG. 12. The array included 20 constructed modules that were then affixed, by screws, together. Each module was 3D printed with titanium ($Ti_6Al_4V$) using a GE Additive Concept Laser M2, which prints parts up to 245 mm×245 mm×330 mm in size. Many factors affect cost such as size, weight, and structural support removal time. The overall cost for printing the 20 modules from a commercial vendor is roughly $9 k (USD) which translates into a price/element of $173 (i.e., $86/port).

The array was mounted to a roll over an azimuth far field antenna measurement system to enable characterizing of the entire 3D radiation pattern. The measurements were calibrated using a gain transfer method, i.e., by measuring the gain of a known reference horn antenna. The measurement system was calibrated to the antenna connectors which removes the loss of the RF cables and switches. The array was characterized by measuring the complex embedded element pattern of the 104 antenna ports and using digital beamforming to post process the antenna array patterns. Each low-gain antenna element was measured in azimuth from ϕ=0° to 360° with 7.5° spacing and in elevation from θ=0° to 180° every 7.5°. Time domain gating with a 500 mm (1.7 ns) wide window was employed to reduce an impact of reflections from the antenna positioner, the feed cables, and the chamber walls. A spatial filtering routine decomposing the far field into the spherical harmonics that are supported by the 185 mm diameter sphere was used to filter out unphysical far field oscillations that cannot be excited by the finite sized hemispherical antenna. Decomposing the far field into spherical harmonics allowed for accurate interpolation of the far field on a grid with 2° spacing in azimuth and elevation. Measuring the 3D radiation patterns of all 104 ports within a timely manner was made possible by an absorptive single pole, 36 throw switching matrix measuring 36 antenna ports at every angular position. Therefore, three scans were necessary to measure every antenna port. All antenna ports not connected to the switching matrix were terminated with 50Ω loads.

Each element was fed with an SMP connector printed with the antenna. These connectors are precisely fabricated so that a commercially available female SMP connector may mechanically snap into the SMP connection or other suitable means to ensure there is good electrical contact.

Beamforming at a given angle was accomplished by complex conjugating the received complex voltages at every port, which required measuring and storing the complex far field at every angle. This corresponds to 104 ports by 101 frequencies by 49 azimuth angles by 25 elevation angles for a total of $13\times10^6$ complex values. This could be a challenging amount of data to deal with for applications requiring real-time beamforming, so other beamforming techniques may be developed using an analytic model for the embedded element patterns. Additionally or alternatively, the stored data using a coupling matrix model may be accurately compress.

Figure 13A:
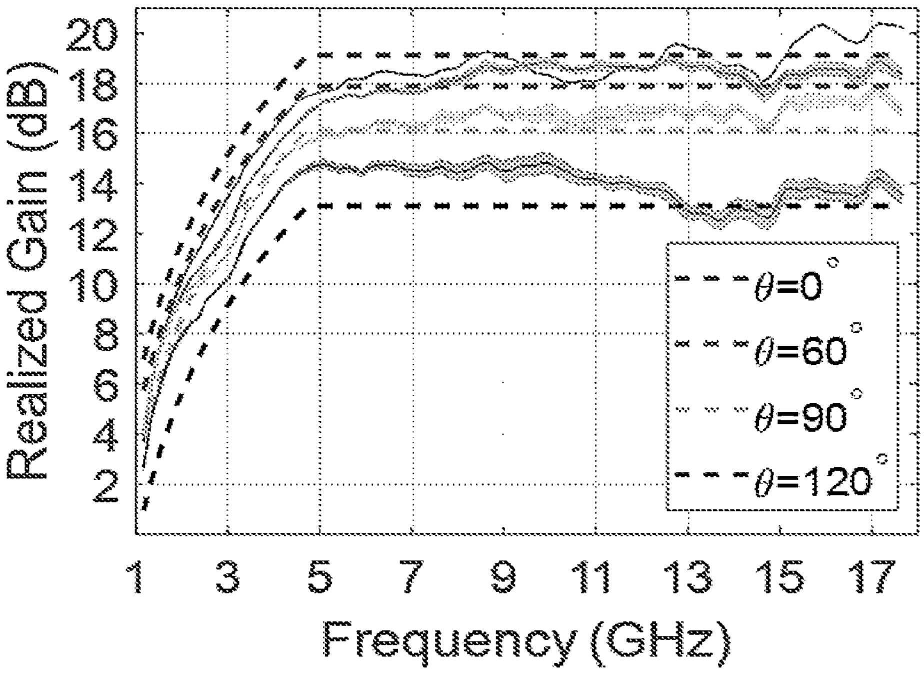
FIG. 13A graphically plots an averaged measured realized gain from 1 GHz to 18 GHz using the prototypical system of FIG. 12.
Figure 13B:
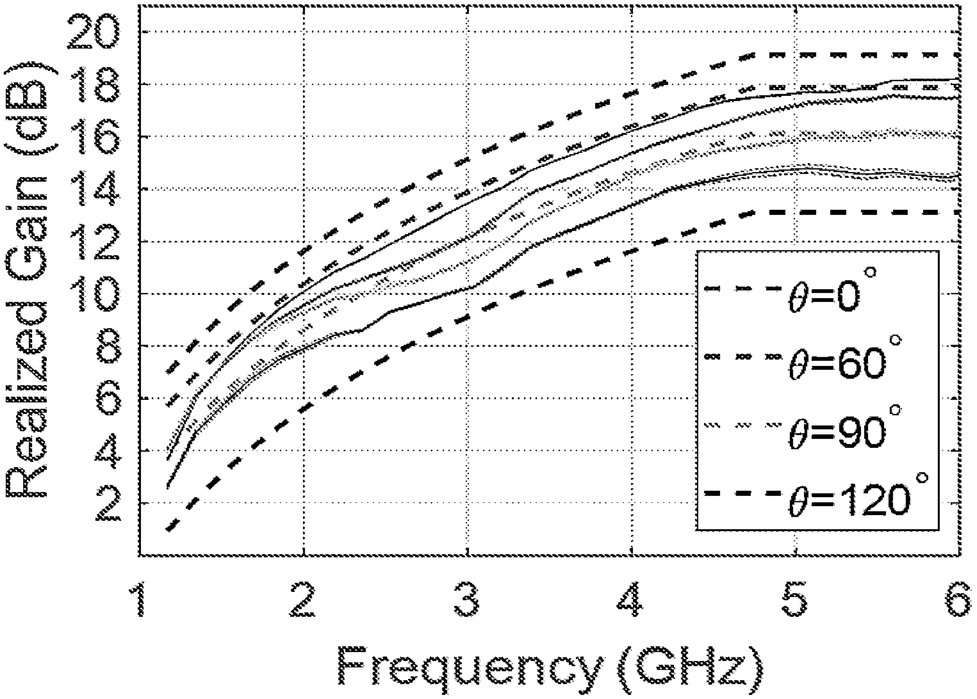
FIG. 13B is an exploded view of FIG. 13A of the grating lobe free band of 1 GHz to 4.75 GHz.
Figure 13C:
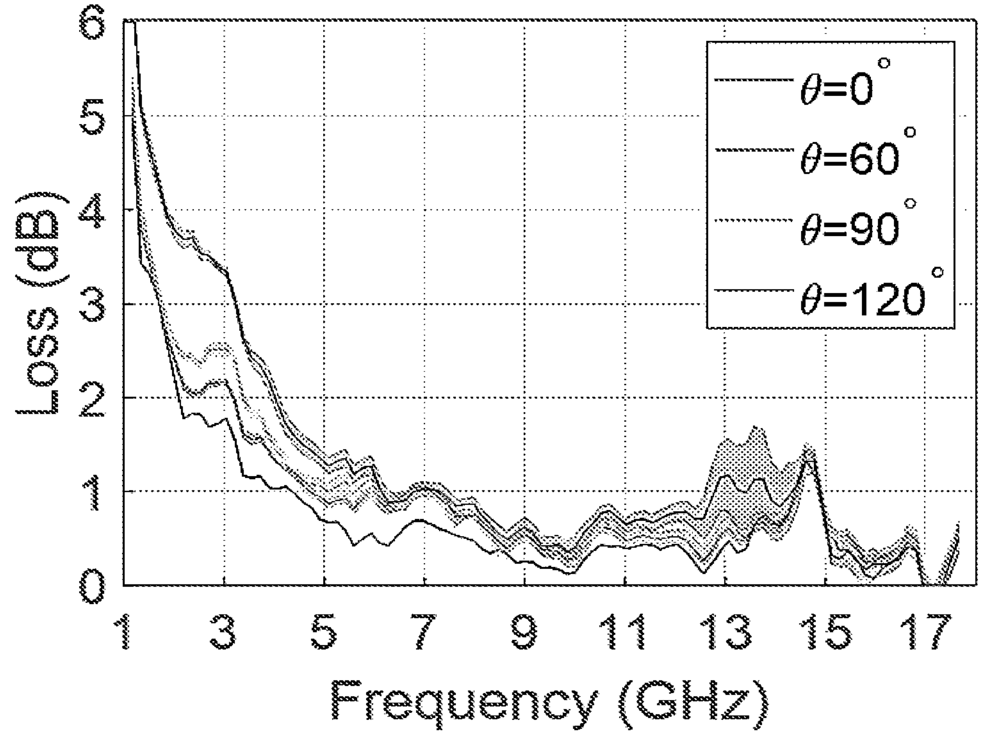
FIG. 13C graphically plots a total loss measured with the prototypical system of FIG. 12.

FIG. 13A plots an average measured realized gain from 1 GHz to 18 GHz while FIG. 13B zooms in on the grating lobe free band of 1 GHz to 4.75 GHz. FIG. 13C plots a total loss, which is the ratio of gain to directivity. For each elevation angle, the beam was scanned to all azimuth angles (ϕ=−180° . . . 180°) and the gain was noted. The linewidth at a given frequency in FIGS. 13A-13C correspond to ±1 standard deviation in the gain/loss across all azimuth angles. The measured realized gain at broadside was generally within 2 dB of theory.

Figure 13D:
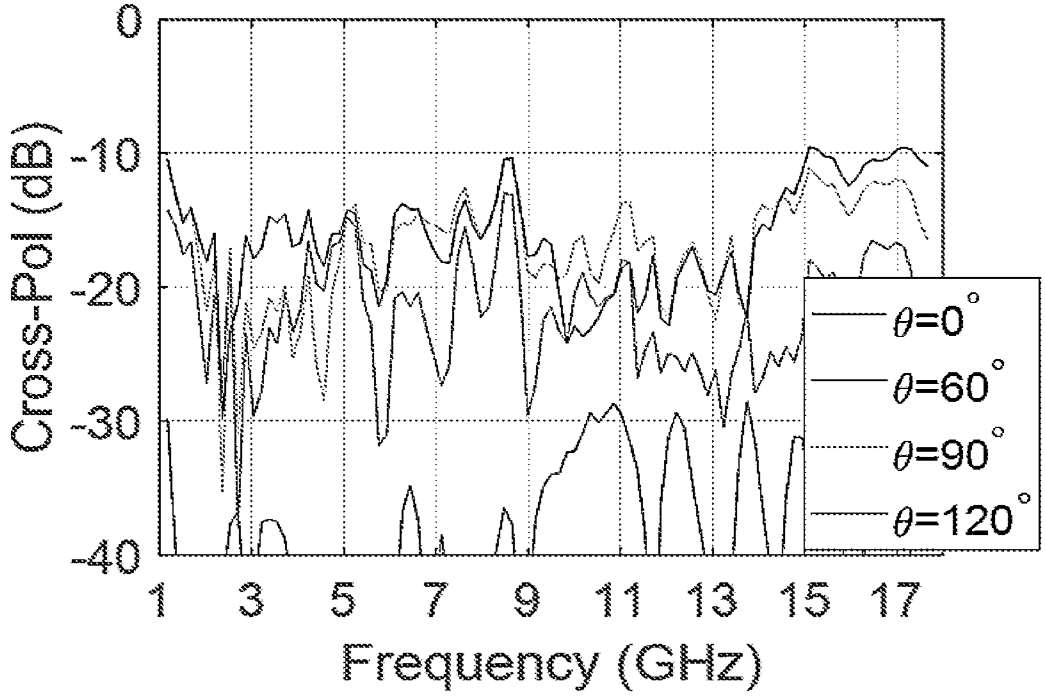
FIG. 13D graphically plots an average cross-pol in the scan direction with the cross-pol at each point averaged across all azimuth scan angles using the prototypical system of FIG. 12.

FIG. 13D plots an average cross-pol in the scan direction with the cross-pol at each point in the plot was averaged across all azimuth scan angles. The cross-pol was moderate with a value less than −15 dB across much of the operating bandwidth and scan volume, which was higher than simulation. The imperfect electrical connections at the seams between the 20 modules that comprise the array may generate higher cross-polarization. Scattering from the 104 coax cables feeding the antenna elements plus the 36 cables connected between the array and switching matrix may also increase the cross-pol level.

Figure 14A:
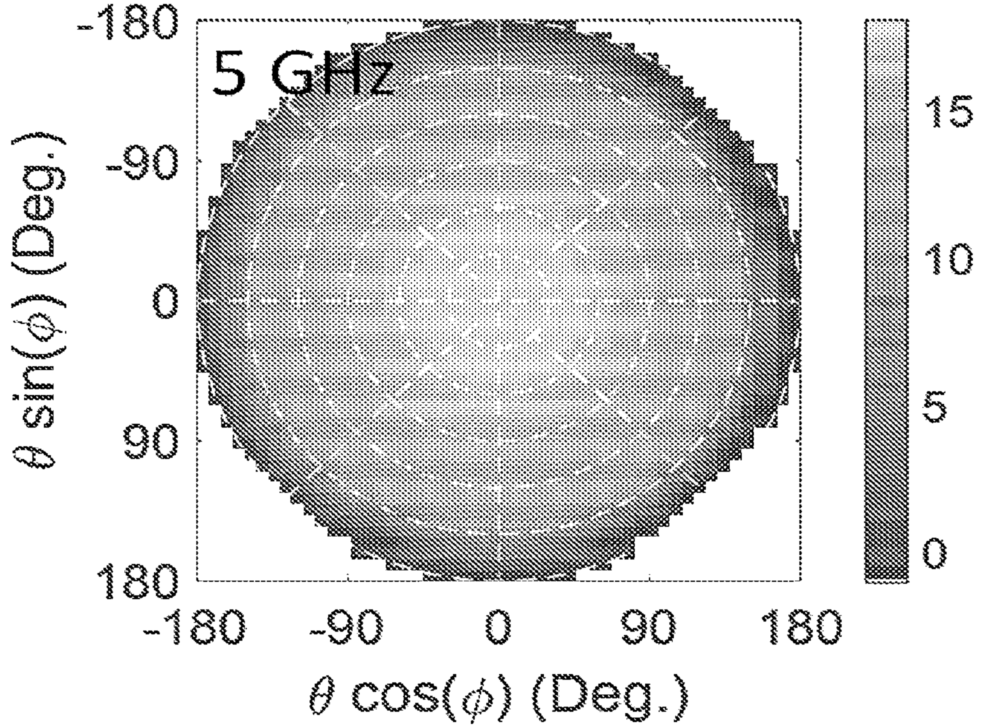
FIG. 14A graphically plots gain of the prototypical system of FIG. 12 operating at 5 GHz when the array points toward various scan angles.

To illustrate the large field of view of the array, FIG. 14A plots gain at 5 GHz when the array points toward various scan angles. The x- and y-axes correspond to the u, v coordinate system (i.e., $k_xd$, $k_yd$ coordinate system). There was a uniform gain vs. azimuth angle. The gain decreased at wide elevation angles in accordance with theory.

Figure 14B:
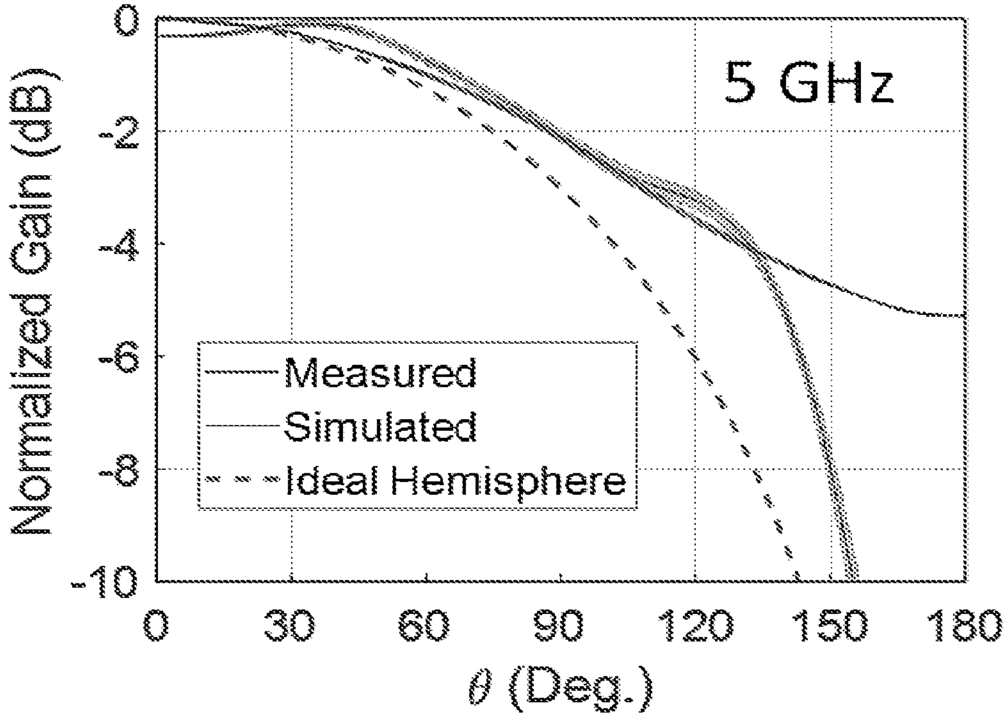
FIG. 14B graphically compares average gain versus elevation angle as measured using the prototypical system of FIG. 12 and the model of FIG. 7.

FIG. 14B evaluated average gain vs. elevation angle. Again, the linewidth corresponds to the standard deviation across azimuth. The measurement and simulation agreed closely except when θ>140°. Discrepancy may be due to the fact that the antenna positioner system and RF cables sit between the antenna under test and the reference antenna in this scan region.

Figure 15A:
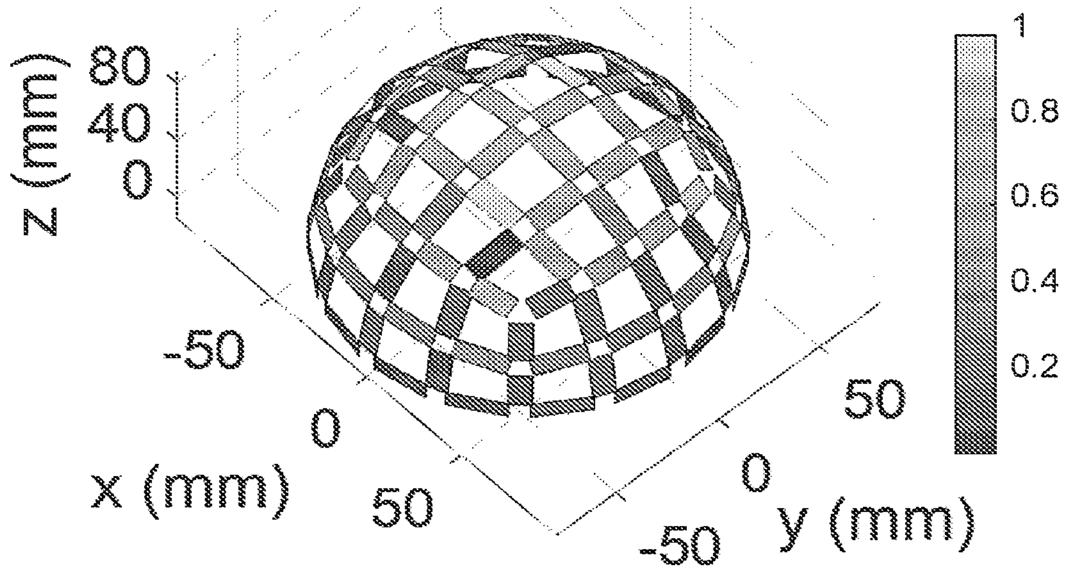
FIGS. 15A and 15B plot amplitude of the incident voltage that excites each element of the array at 5 GHz when the array points toward the z- and x-axis, respectively, using the prototypical system of FIG. 12.
Figure 15B:
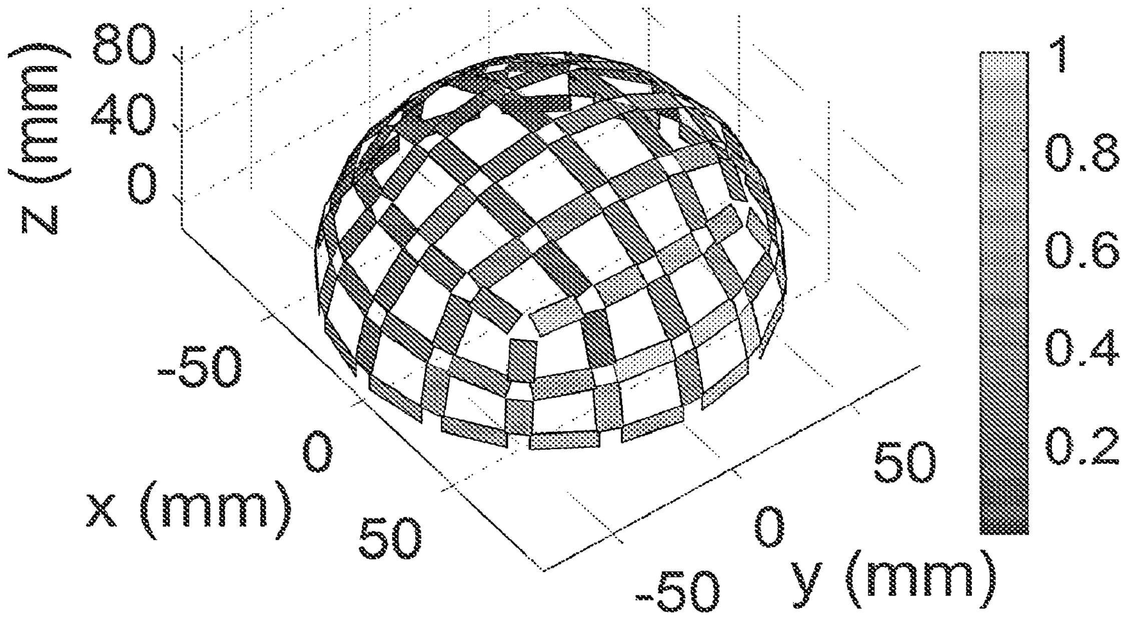
Figure 16A:
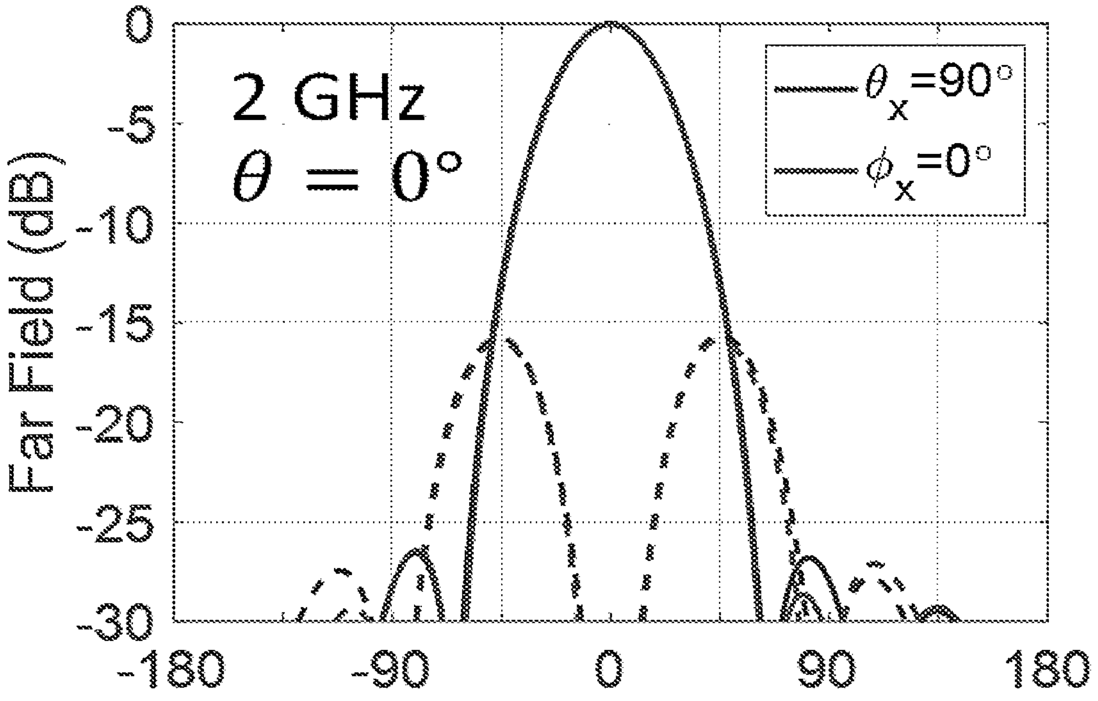
FIGS. 16A-16F graphically plot co- and cross-polarized 3D radiation patterns at 2 GHz (FIGS. 16A and 16B), 5 GHz (FIGS. 16C and 16D), and 10 GHz (FIGS. 16E and 16F).
Figure 16B:
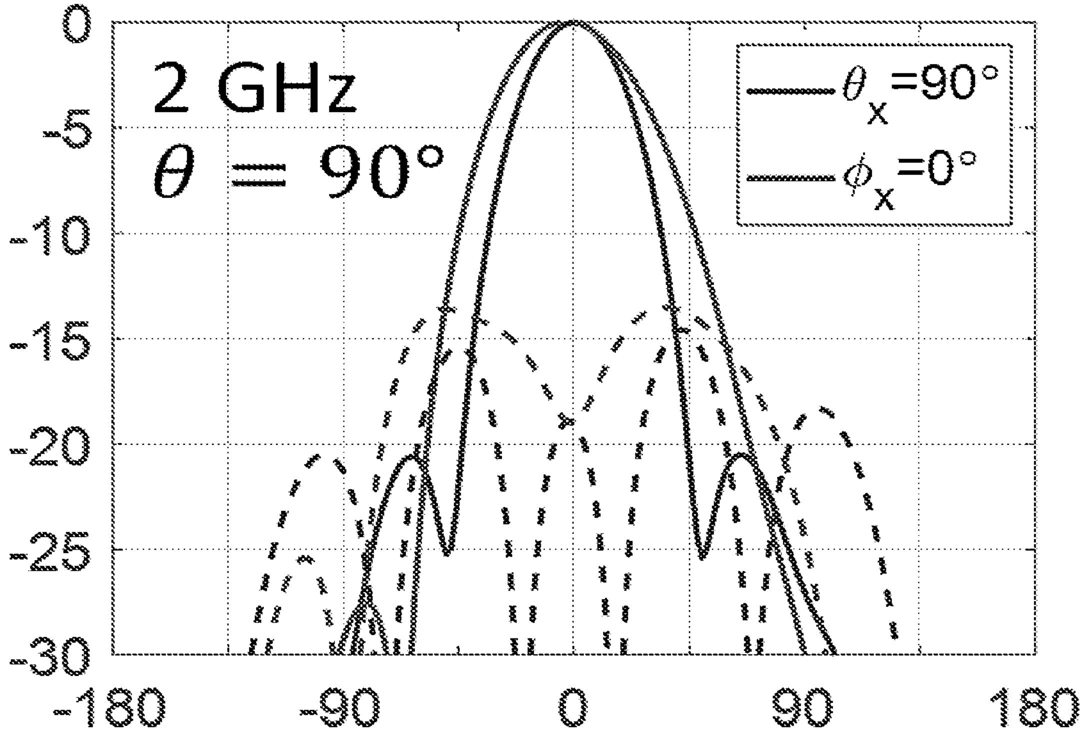
Figure 16C:
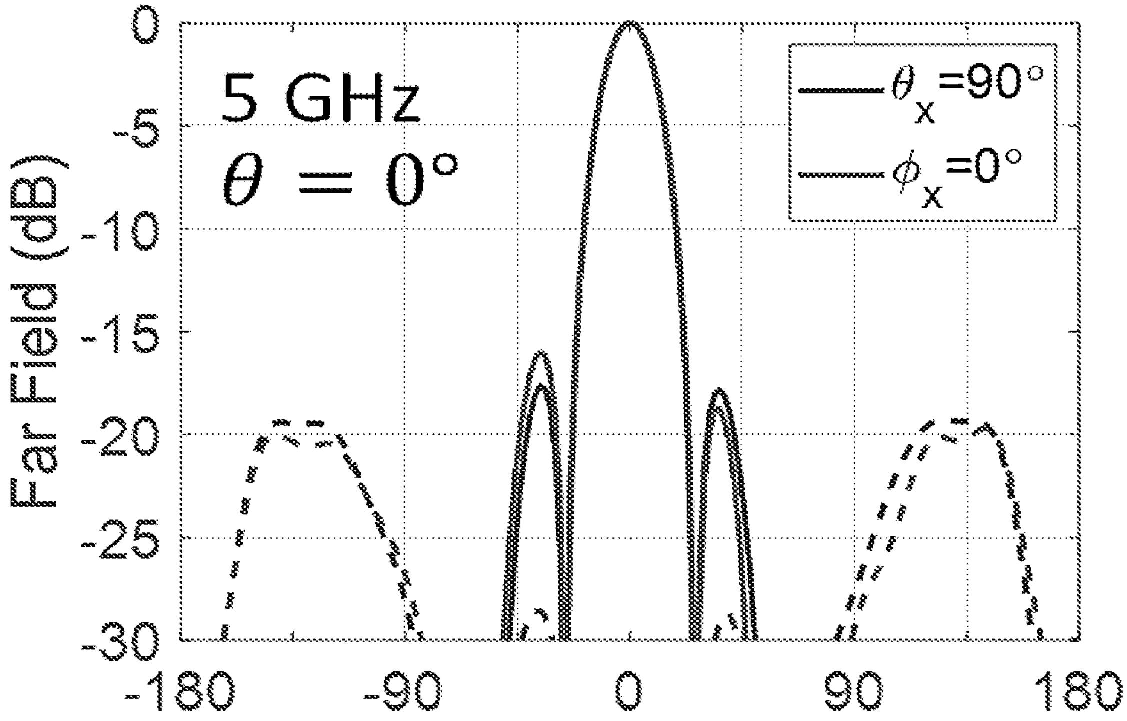
Figure 16D:
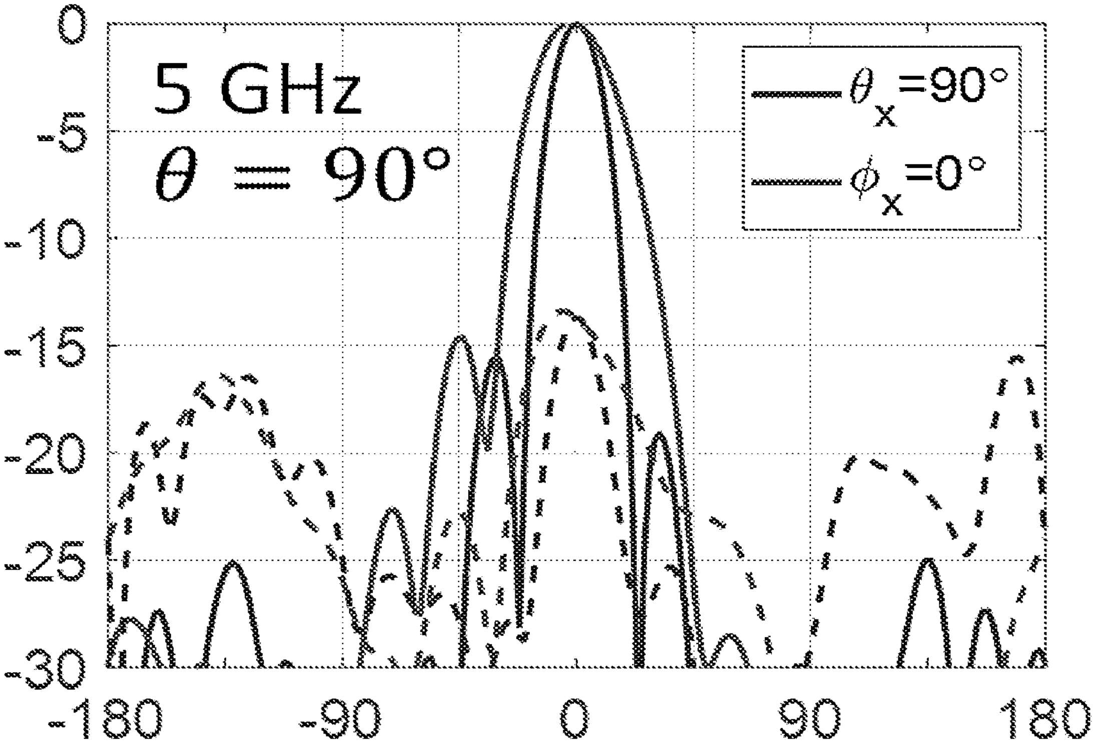
Figure 16E:
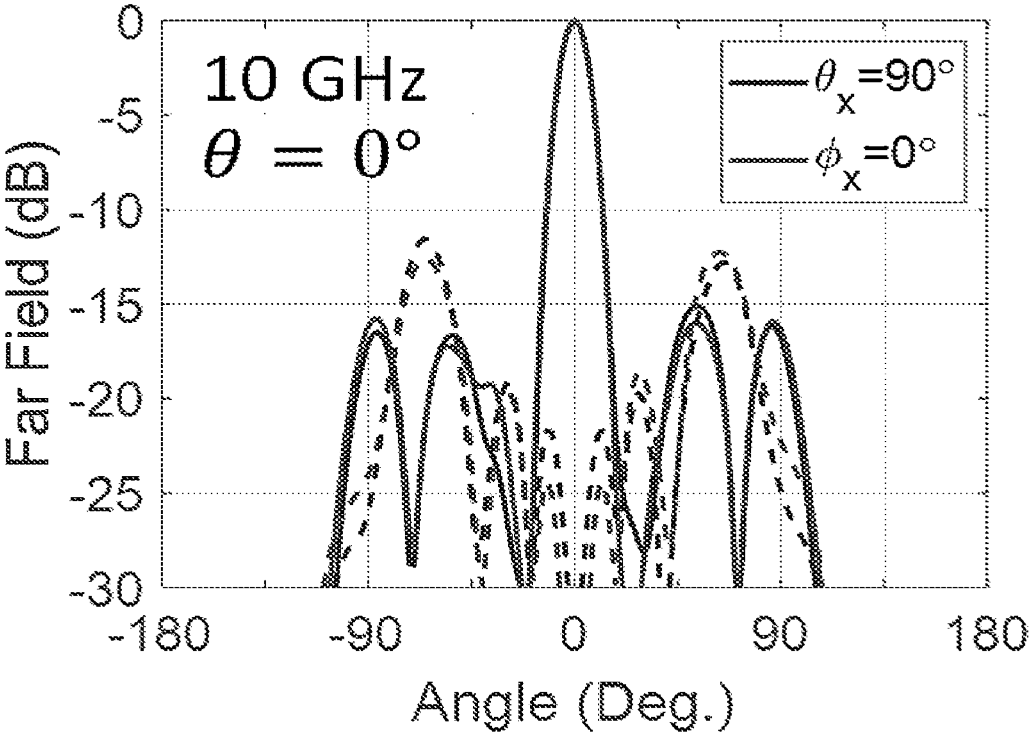
Figure 16F:
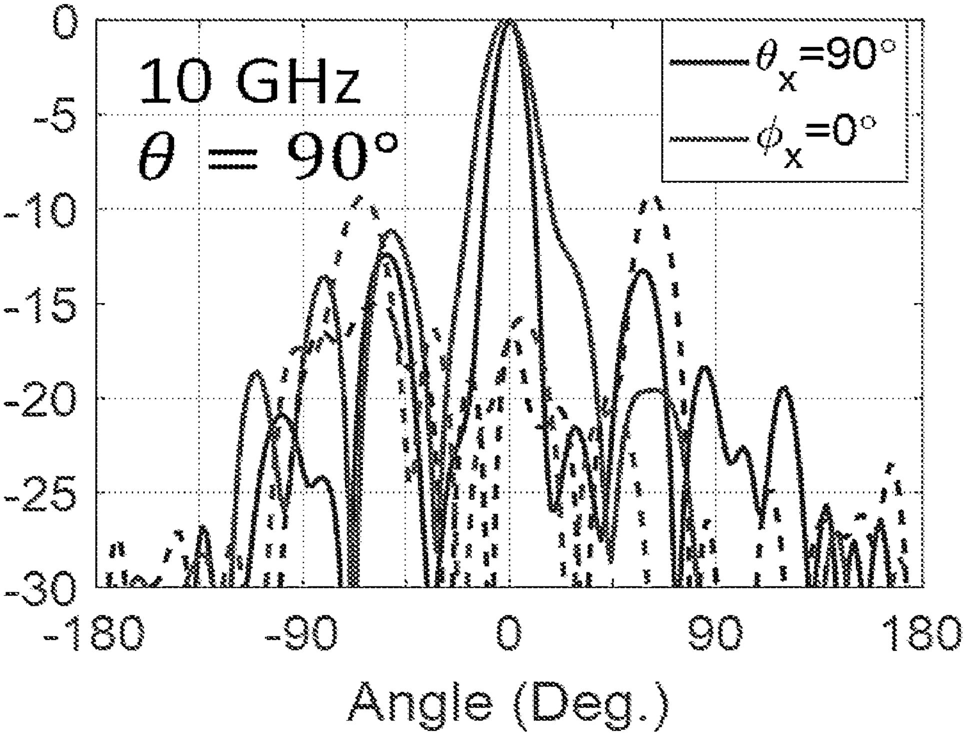
Figure 17A:
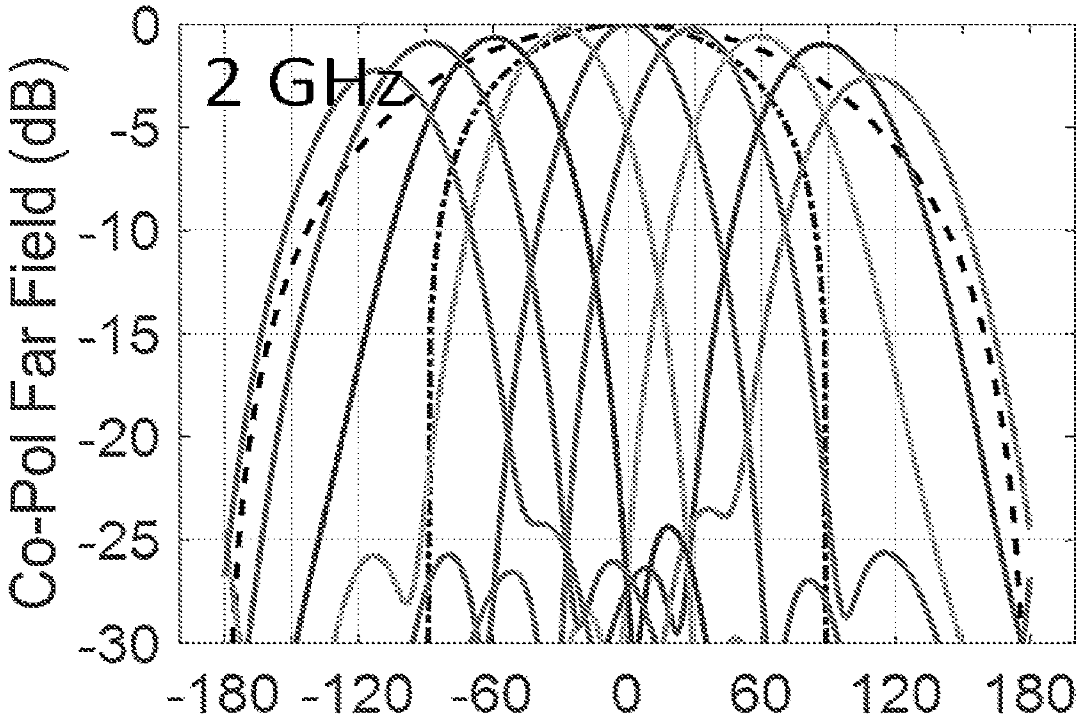
FIGS. 17A-17F graphically plot normalized and co- and cross-polarized radiation patterns when the beam is scanned between θ=−120° and +120°.
Figure 17B:
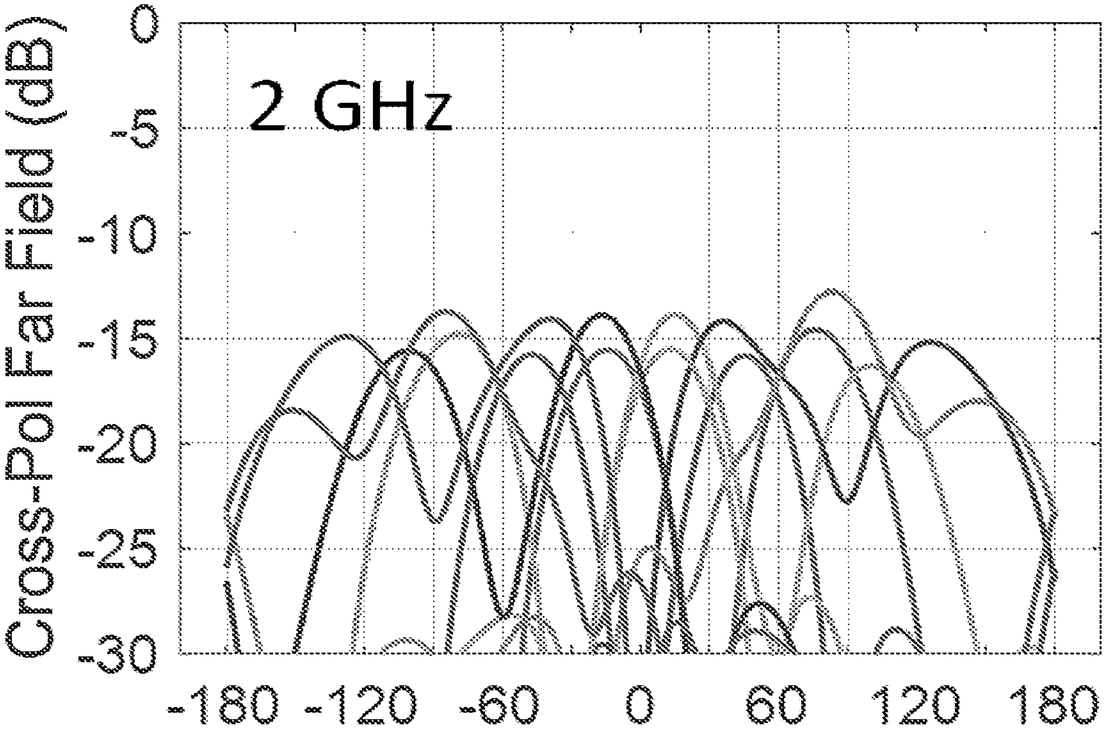
Figure 17C:
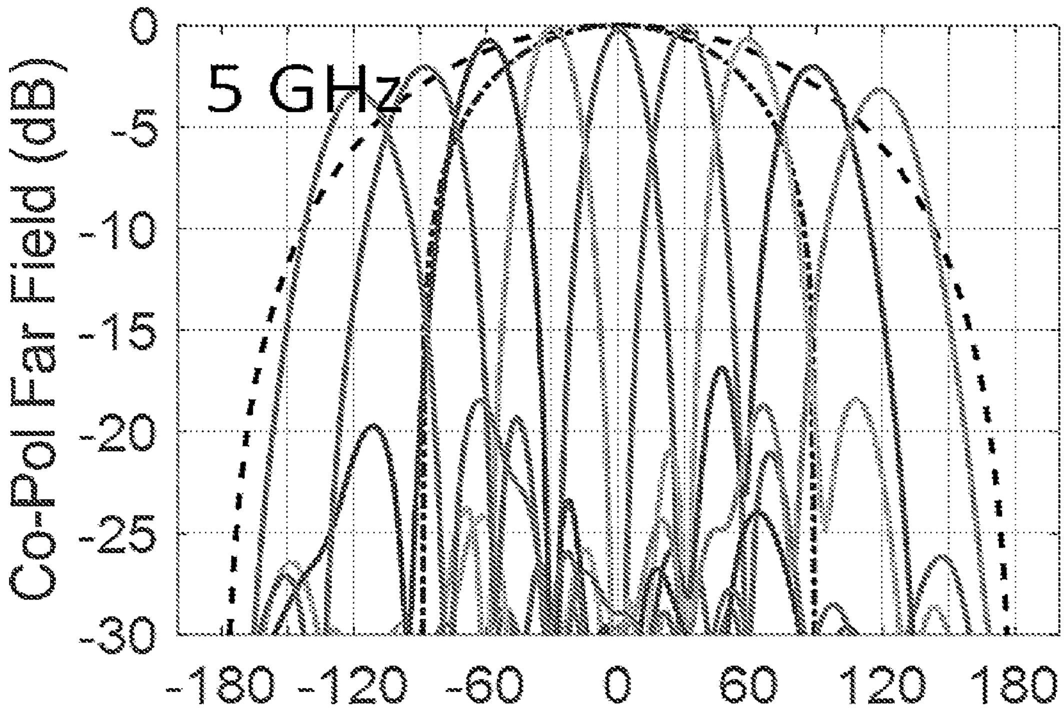
Figure 17D:
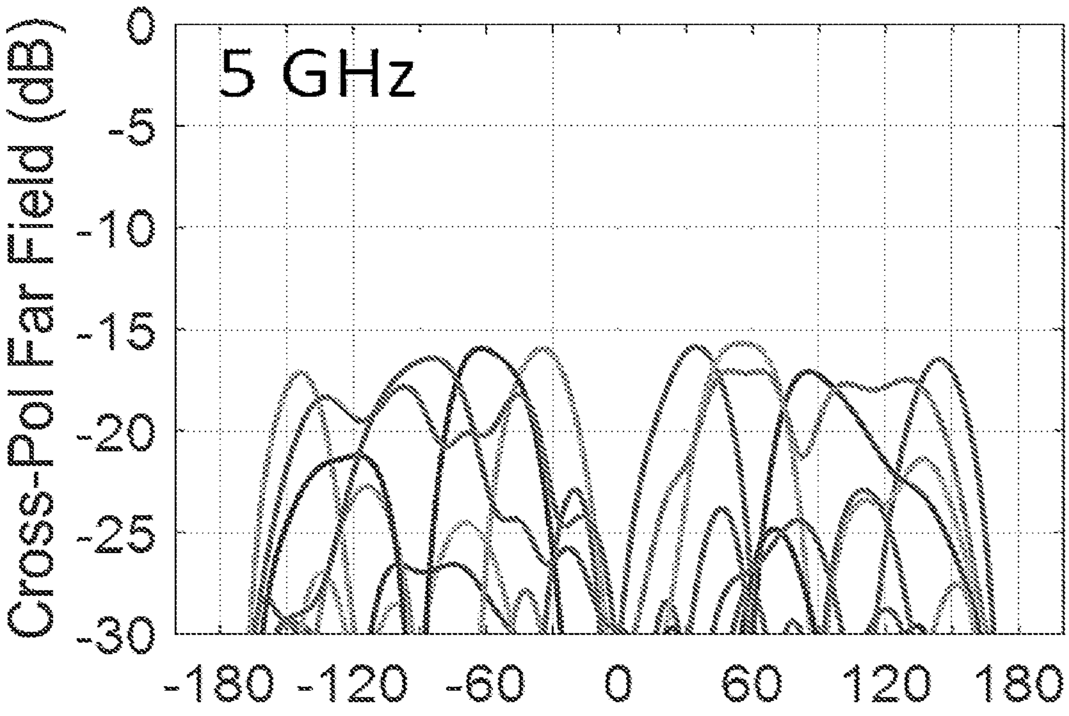
Figure 17E:
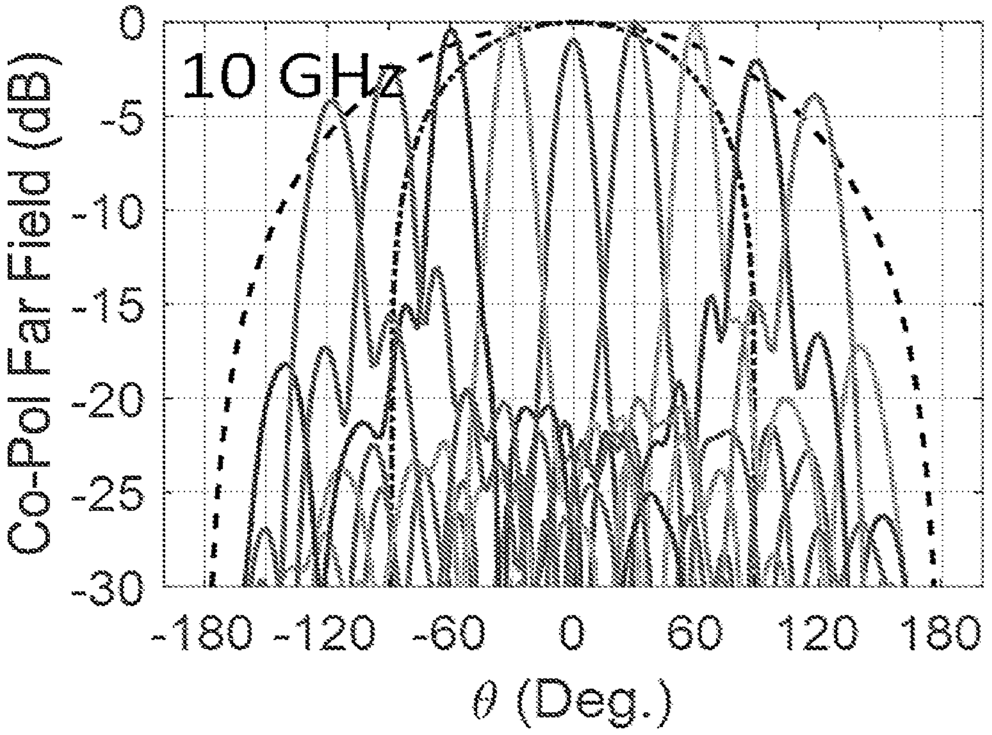
Figure 17F:
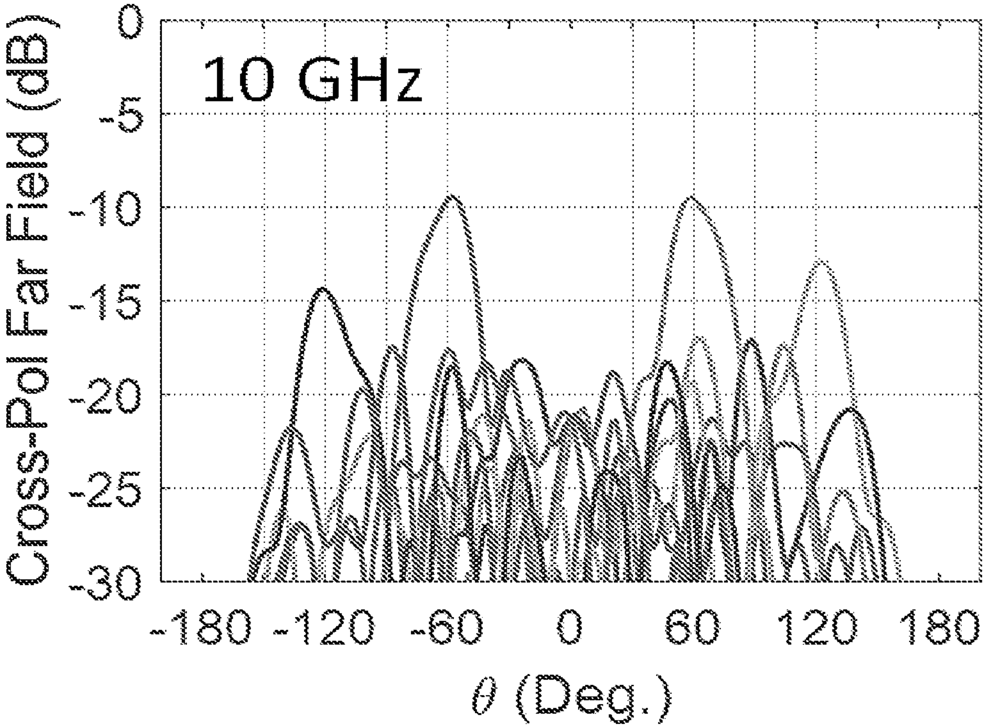

FIGS. 15A and 15B plot amplitude of the incident voltage that excites each element of the array at 5 GHz when the array points toward the z-axis (FIG. 15A) and x-axis (FIG. 15B). Intuitively, the elements closest to the scan direction had the largest amplitude.

The co- and cross-polarized 3D radiation patterns at 2 GHz, 5 GHz, and 10 GHz are plotted in FIG. 16A-16F. All patterns corresponded to the array pointing toward θ=0° and are plotted in a modified coordinate system θ_x, ϕ_x with an x-axis that points in the direction of the main beam. In general, there was decent agreement between the measured and simulated patterns.

FIGS. 17A-17F plot normalized co- and cross-polarized radiation patterns when the beam is scanned between θ=−120° and +120° every 30° in the ϕ=0° plane. There was decent agreement with simulations in FIGS. 10A-10F. Dashed lines correspond to theoretical gain based on projected area of a hemisphere and planar array. The peak gain at different scan angles follows the theoretical value, which offered significantly wider scan volumes than a planar array. The measured gain at wider scan angles was larger than the theoretical value because the array was not very large.

Example 4—Comparison of Vivaldi Simulation and Prototype

Table I summarizes simulated (Example 2) and measured (Example 3) array performance metrics. The operating frequencies were defined to be when the total loss (product of mismatch loss and radiation efficiency) averaged over all azimuth angles was less than 2 dB. The maximum operating frequency was larger than measured (greater than 18 GHz) or simulated (greater than 13 GHz) and could not be exactly determined. The loss and cross-polarization are averaged over all azimuth angles and frequencies on a linear scale within the operating bandwidth, and then converted to dB. The diameter of the simulated array is 9% smaller than the fabricated array. The 1 dB difference between the measured and simulated peak gain is likely due to a combination of measurement error and the inaccuracy in the approximate array model for simulation.

TABLE 1

| | SIMULATION | MEASUREMENT |
|---|---|---|
| Diameter | 161.5 mm | 181.5 mm |
| Polarization | Dual-Linear | Dual-Linear |
| Grating Lobe Free | <5.34 GHz | <4.75 GHz |
| Freq. Range (θ = 0°) | (2.3 GHZ, >13 GHz) | (2.1 GHZ, >18 GHz) |
| Freq. Range (θ = 90°) | (1.7 GHz, >13 GHz) | (3.4 GHz, >18 GHz) |
| Avg. Loss (θ = 0°) | 0.9 dB | 0.6 dB |
| Avg. Loss (θ = 90°) | 0.9 dB | 0.8 dB |
| Avg. X-Pol (θ = 0°) | −42 dB | −35 dB |
| Avg. X-Pol (θ = 90°) | −24 dB | −15 dB |
| Peak Realized Gain (θ = 0°) | 19.2 dB | 20.4 dB |
| Peak Realized Gain (θ = 90°) | 16.9 dB | 18.3 dB |
| Peak Directivity (θ = 0°) | 19.7 dB | 20.7 dB |
| Peak Directivity (θ = 90°) | 17.5 dB | 18.3 dB |

Example 4—BAVA Model

Figure 21:
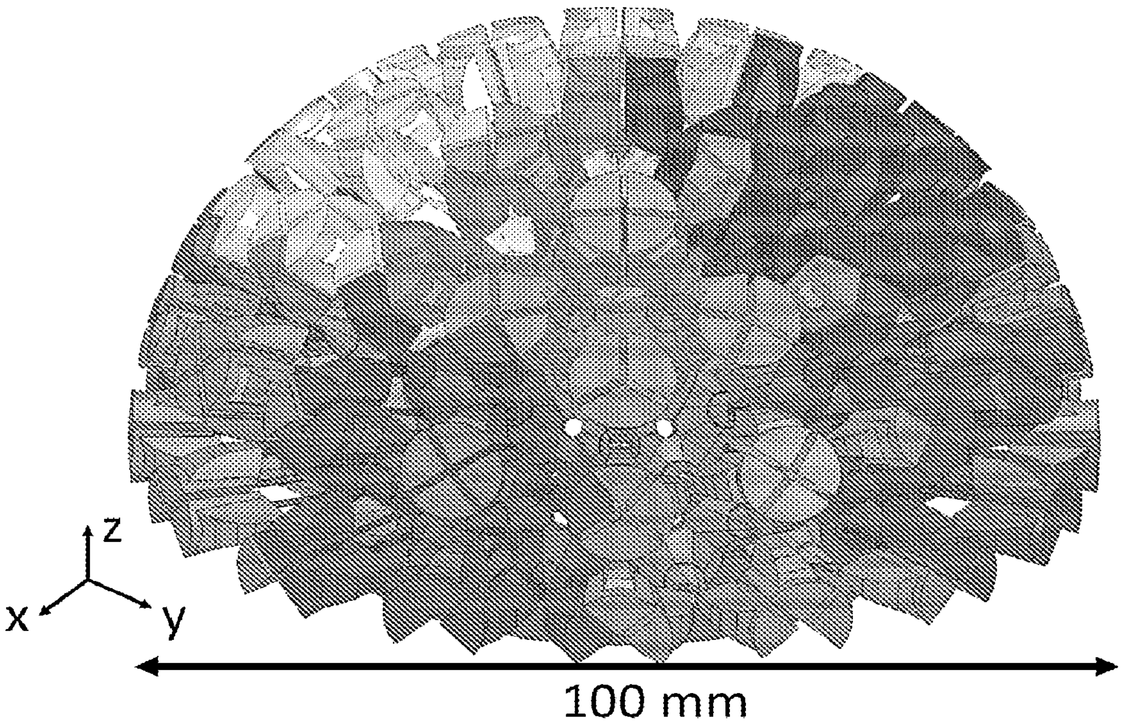
FIG. 21 a schematic of model UWB BAVA Array Antenna for use in computer simulations.

The array and unit cell of FIGS. 18-19C were simulated the performance of the entire hemispherical array from 1 GHZ to 18 GHz. The array diameter, including the radome, was 106 mm, which suggests the array may operate up to 8 GHz while still maintaining less than λ/2 element spacing for grating lobe free operation. The simulated geometry, without the radome on top, as shown in FIG. 21. The fabricated array is 3D printed as 12 different modules that are assembled together. The separate modules that are eventually 3D printed are represented as different colors in FIG. 21.

Beamforming was performed by employing time reversal symmetry to calculate the antenna port excitations. The array was illuminated with an incident right-handed circularly polarized plane wave from a desired direction and the received complex voltages are noted. The port excitations for forming a beam in the desired direction are the complex conjugate of the received voltages. The antenna beamforming weights were calculated using this approach in both simulation and measurement. Once the excitations were determined, it is straightforward to calculate the radiation patterns and gain.

It should be noted that significant computational resources were required to simulate this finite array. The array ere simulated with ANSYS HFSS using the finite element method and a mesh comprised of roughly $8\times10^5$ tetrahedra. Simulations require roughly 35 GB of random-access memory (RAM) for each frequency point.

The simulated antenna performance was plotted in FIGS. 22A-22D. The array was pointed toward elevation angles 0°, 60° and 90°. For each elevation angle (θ), the beam was also scanned across all azimuth angles (ϕ=0° to 360°). The realized gain vs. frequency at the three different elevation angles is graphically illustrated in FIG. 22A. The linewidths of the curves correspond to ±1 standard deviation across all azimuth angles. The simulated gain is generally within 1 dB of the theoretical limit from 2 GHz to 18 GHz and at all scan angles out to θ=90°. There is a noticeable gain drop around 14 GHz, which was likely due to the presence of surface waves.

Figure 22A:
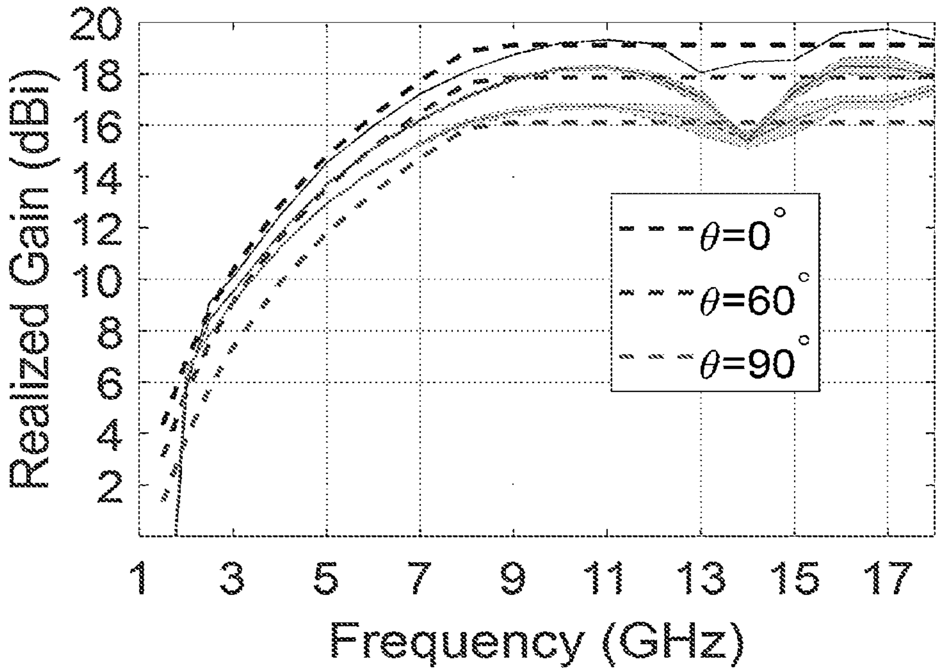
FIGS. 22A-22D are graphically illustrates of performance of the model of FIG. 21.
Figure 22B:
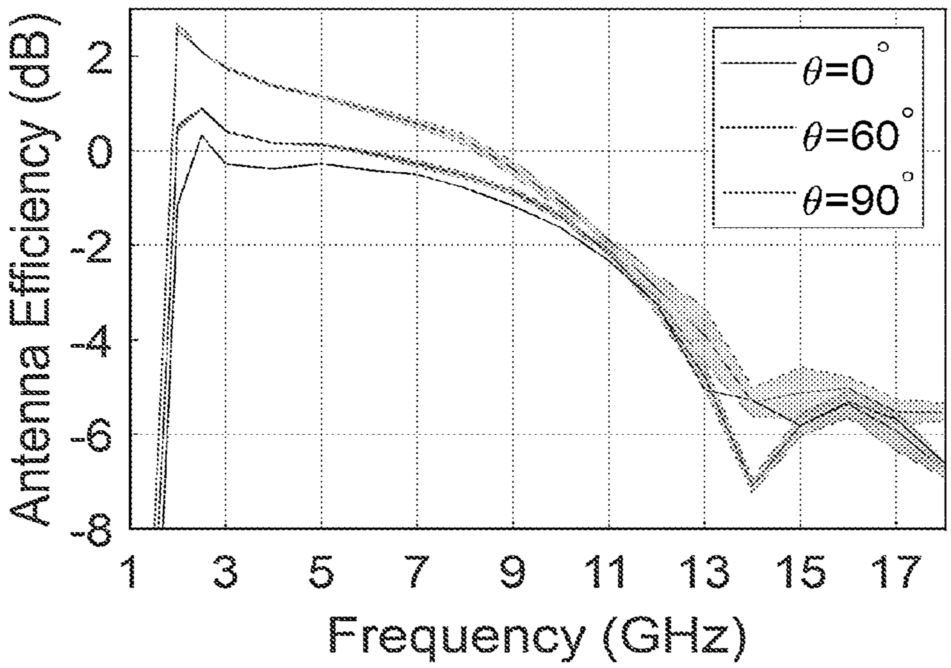

FIG. 22B graphically plots the antenna efficiency, which is defined as the product of aperture efficiency, radiation efficiency and mismatch loss. The antenna efficiency is also equal to the ratio of the realized gain to $4\pi A/\lambda^2$. The antenna efficiency is roughly 2 dB (160%) from 2 GHz to 4 GHz at θ=90°. This efficiency is larger than 100% because the antenna was relatively small compared to the wavelength at these frequencies. We note that it is common for small arrays to have a larger effective area than projected physical area (i.e., over 100% efficiency). The antenna efficiency remained near 0 dB from 2 GHz to 8 GHz when the antenna spacing was less than λ/2. At frequencies higher than 8 GHz, the array gain was constant which implies the antenna efficiency decreases as the frequency squared.

Figure 22C:
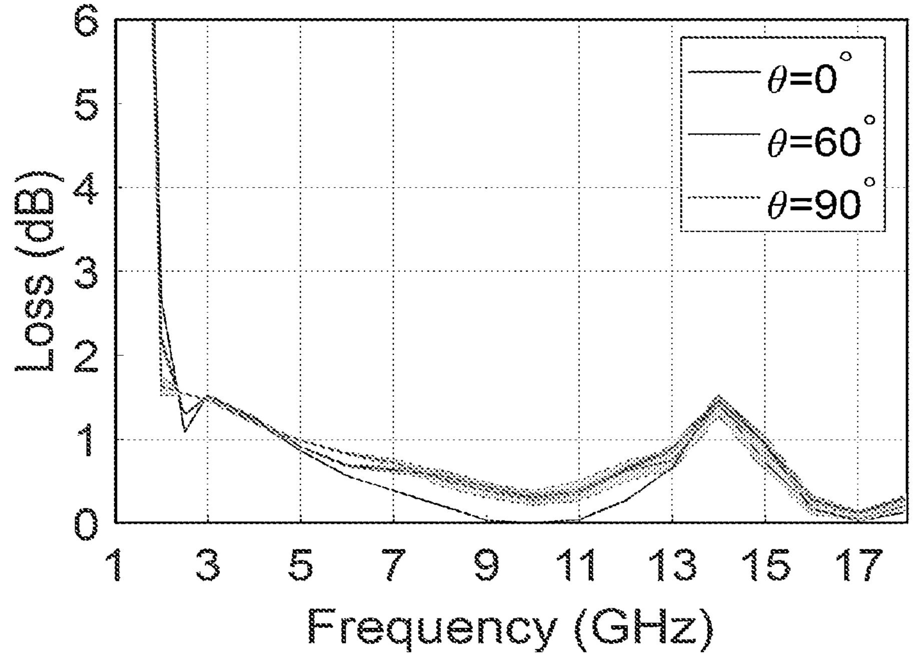
Figure 22D:
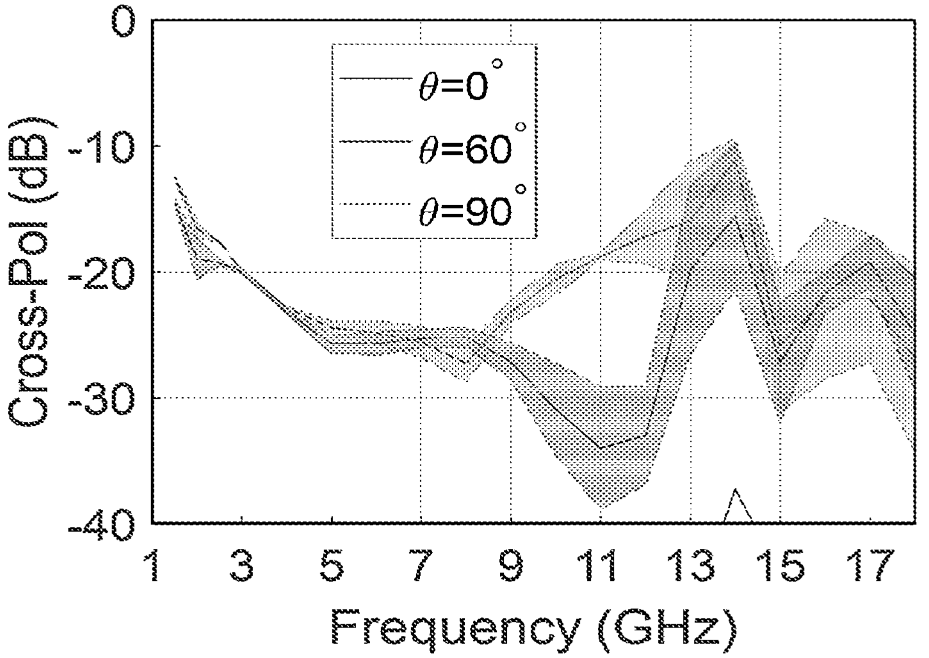
Figure 23A:
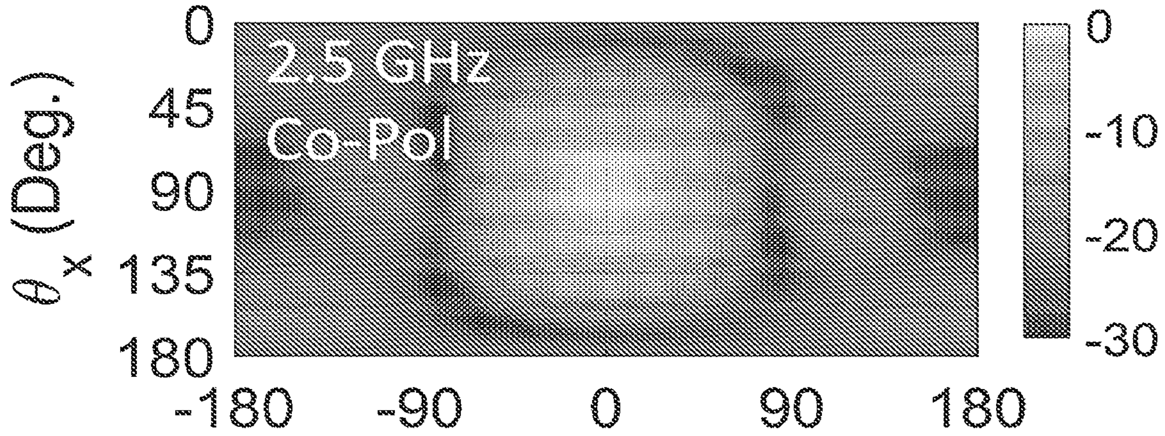
FIGS. 23A-23F are graphical plots of radiation patterns of the model of FIG. 21 at 2.5 GHz (FIGS. 23A and 23B), 7 GHz (FIGS. 23C and 23D), and 18 GHz (FIGS. 23E and 23F).
Figure 23B:
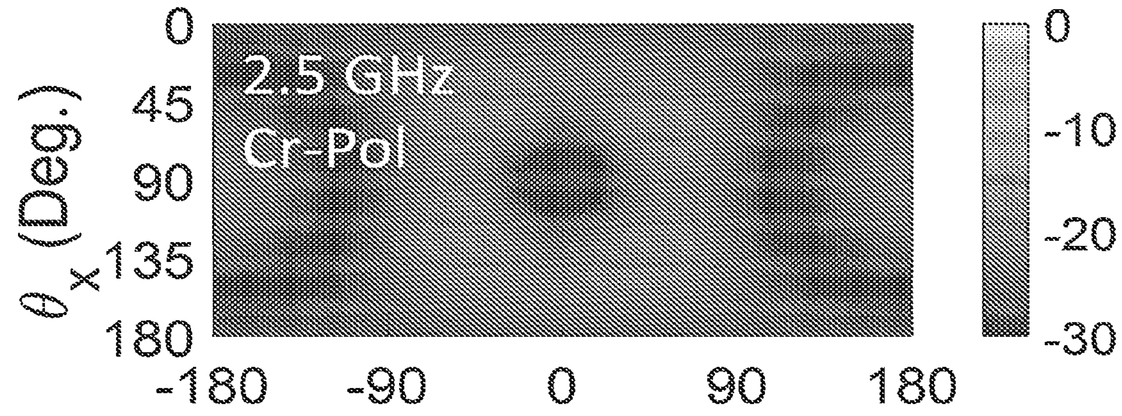
Figure 23C:
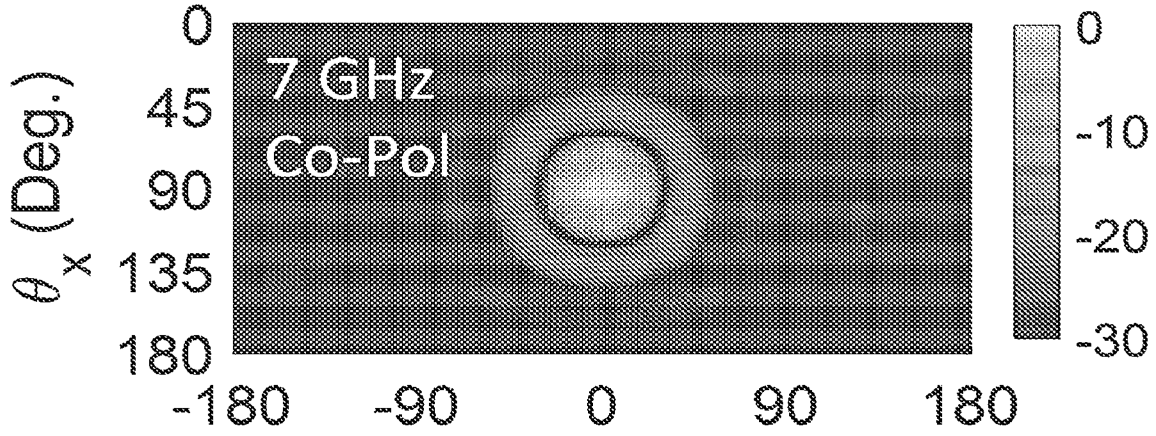
Figure 23D:
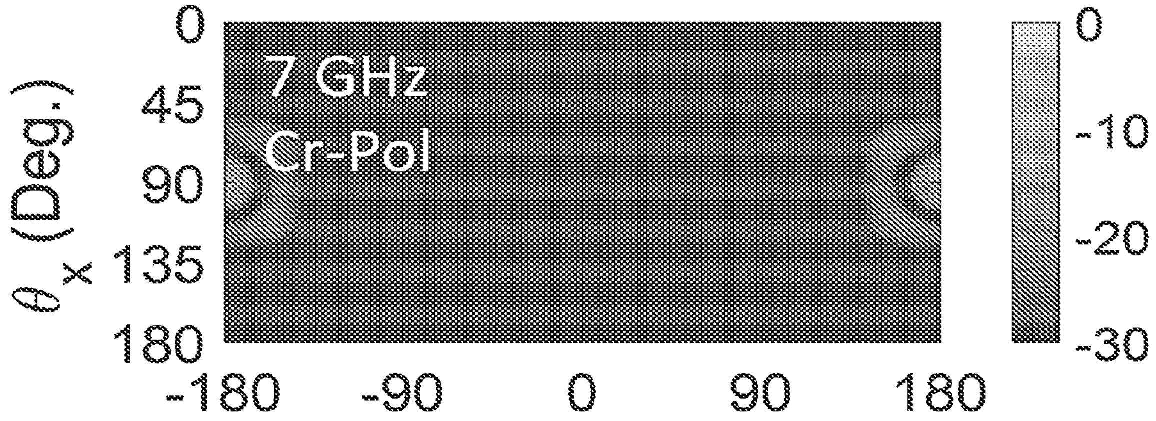
Figure 23E:
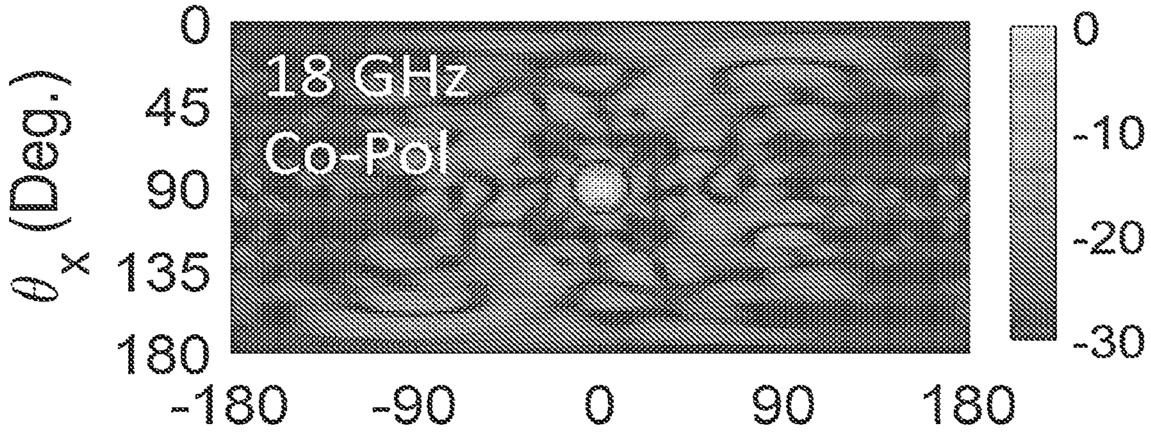
Figure 23F:
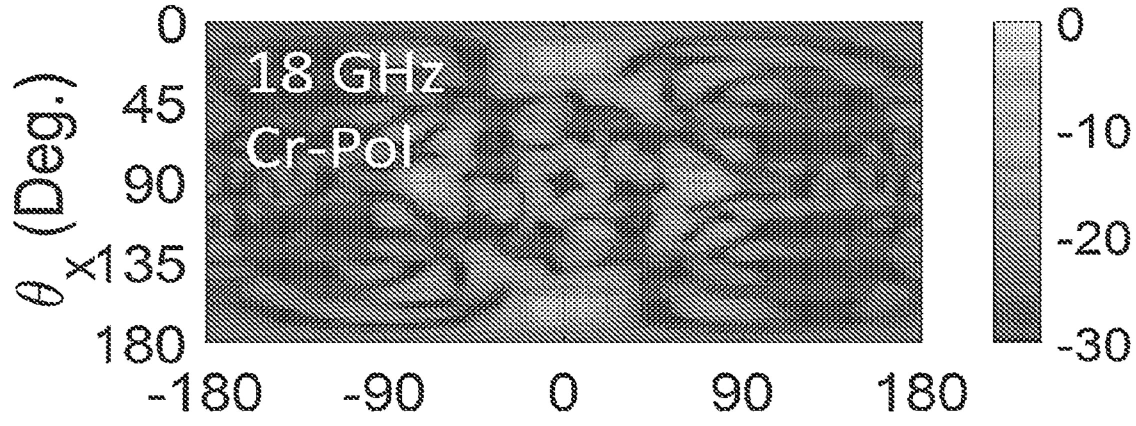
Figure 24A:
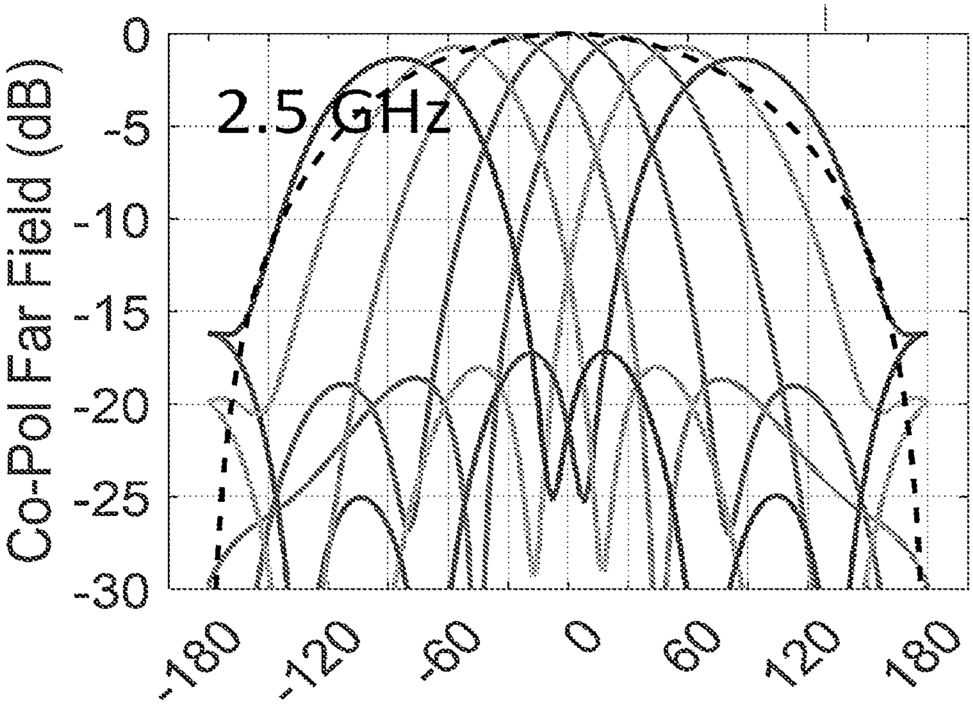
FIGS. 24A-24F are graphically illustrations of the radiation patterns across the field of view of the model of FIG. 21.
Figure 24B:
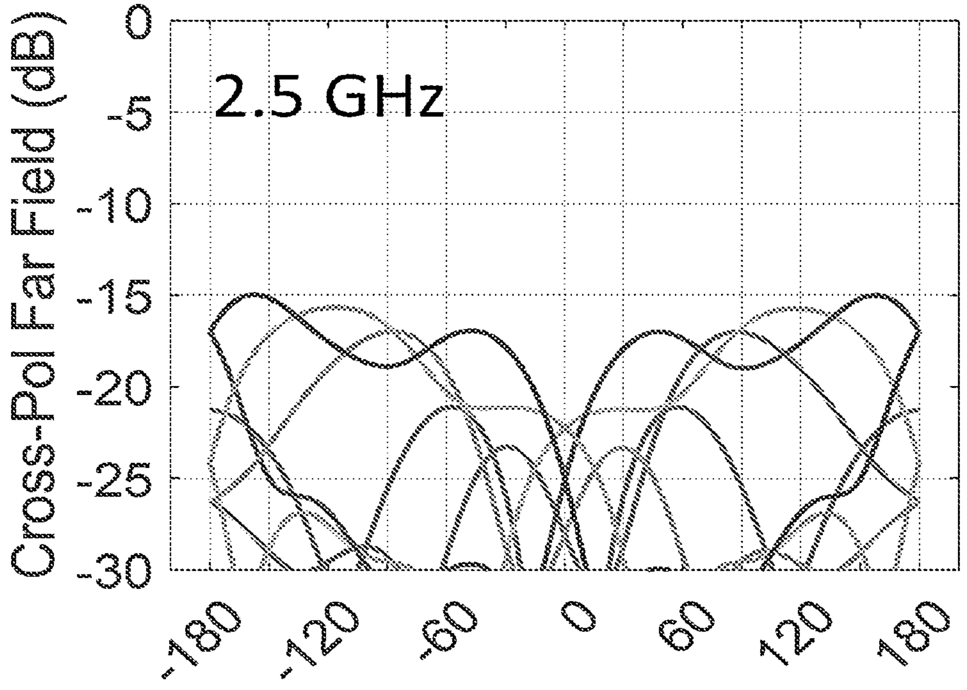
Figure 24C:
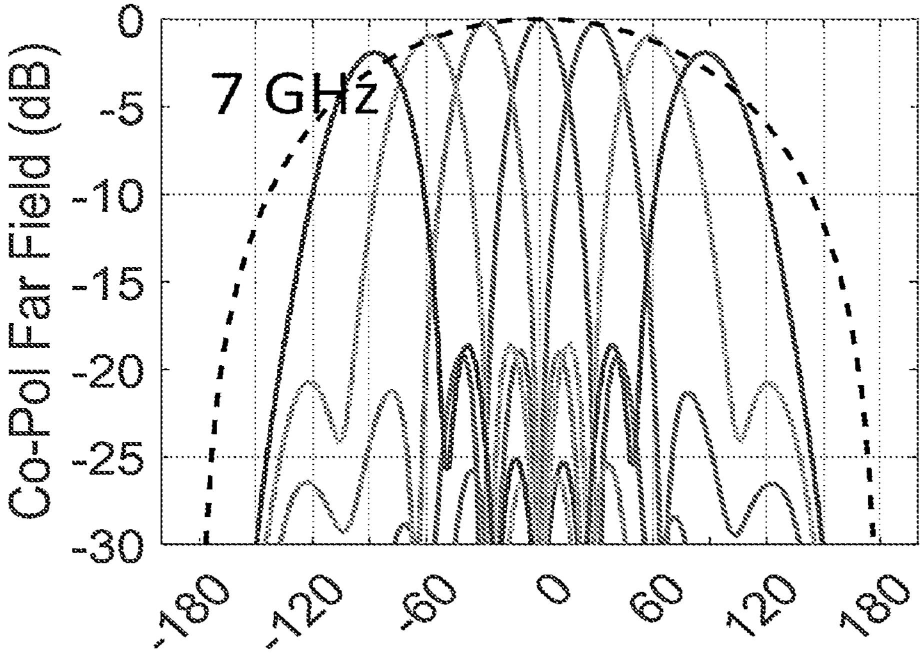
Figure 24D:
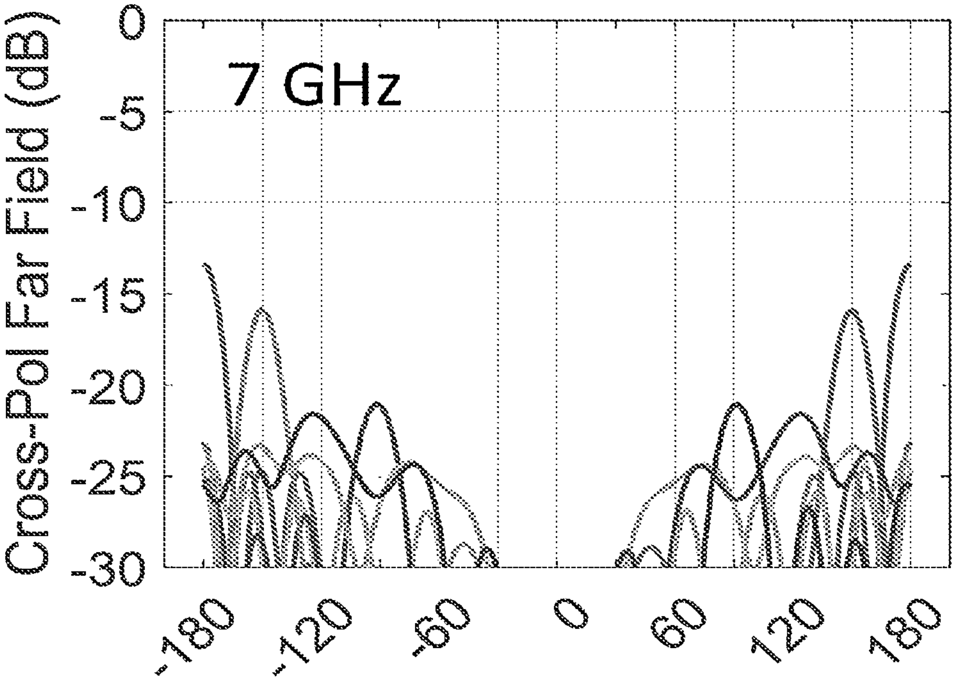
Figure 24E:
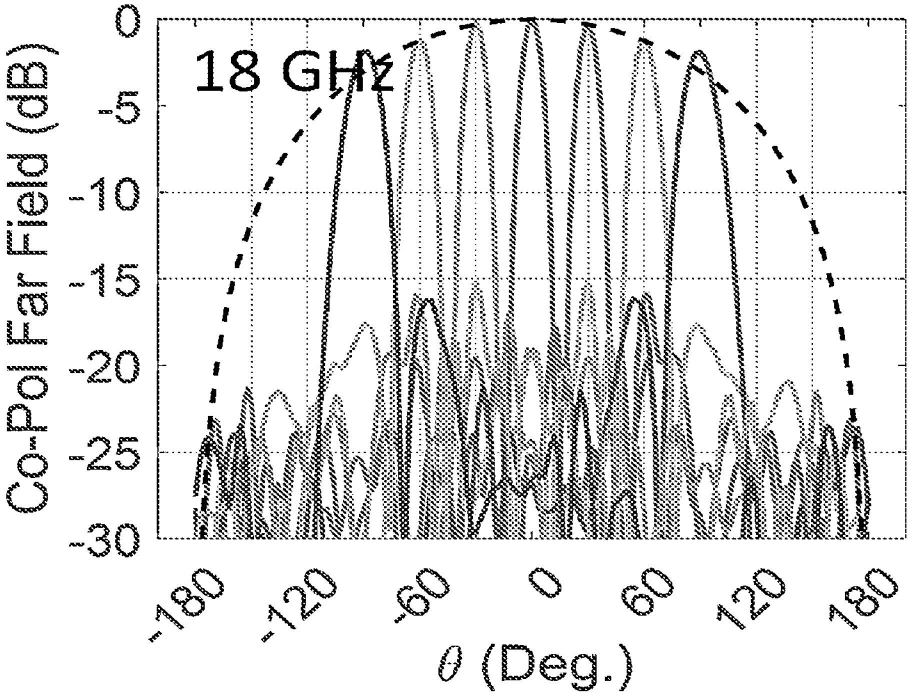
Figure 24F:
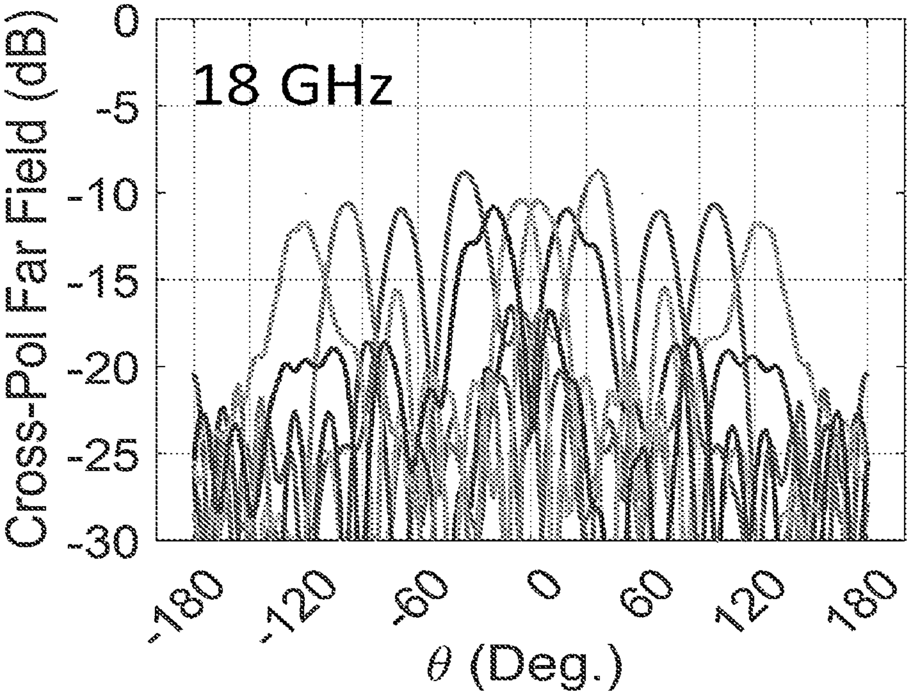

The loss vs. frequency at the various scan angles is plotted in FIG. 22C. Loss, defined as the product of the mismatch loss and radiation efficiency, was dominated by the mismatch loss since each element achieves greater than 95% radiation efficiency even though titanium has a conductivity of $\sigma=1.82\times10^6$ S/m which is 30 times lower than copper. The high radiation efficiency is due to the fact that the antennas are non-resonant and only have a marginal electrical length. The simulated loss was less than 1.5 dB over most of the operating frequency from 2 GHz to 18 GHz and scan angles out to θ=90°. The average cross polarization in the scan direction is plotted in FIG. 22D. The cross-polarization is below −40 dB when the array points toward θ=0°, but increases at wider scan angles.

The radiation patterns at 2.5 GHz, 7 GHz, and 18 GHz are plotted in FIGS. 23A-23F when the beam pointed toward θ=0°. The radiation pattern is plotted on a modified coordinate system labelled $\theta_x$ and $\phi_x$, which has the x-axis pointing in the same direction as the main beam. The modified coordinate system provides a more intuitive visual representation of the beam because the main beam is circular. In general, the sidelobes and cross-polarization are relatively low. At 18 GHz, the element spacing is on average 1.1λ, which results in elevated sidelobes. In this case, the aperiodicity of the array is beneficial because the grating lobes tend to smear out such that the peak sidelobe level is closer to −10 dB rather than 0 dB for planar arrays.

FIGS. 24A-24F plot the radiation pattern across the array's field of view at 2.5 GHz, 7 GHz, and 18 GHz. The beam is scanned between θ=−90° and +90° every 30° in the ϕ=0° plane. The array generated well-formed beams at the various frequencies and scan angles due to its spherical symmetry. For reference, the dashed lines correspond to the theoretical scan loss of a hemispherical array $$\left(\frac{1}{2}+\frac{\cos(\theta)}{2}\right).$$

Example 5—BAVA Prototype

Figure 25A:
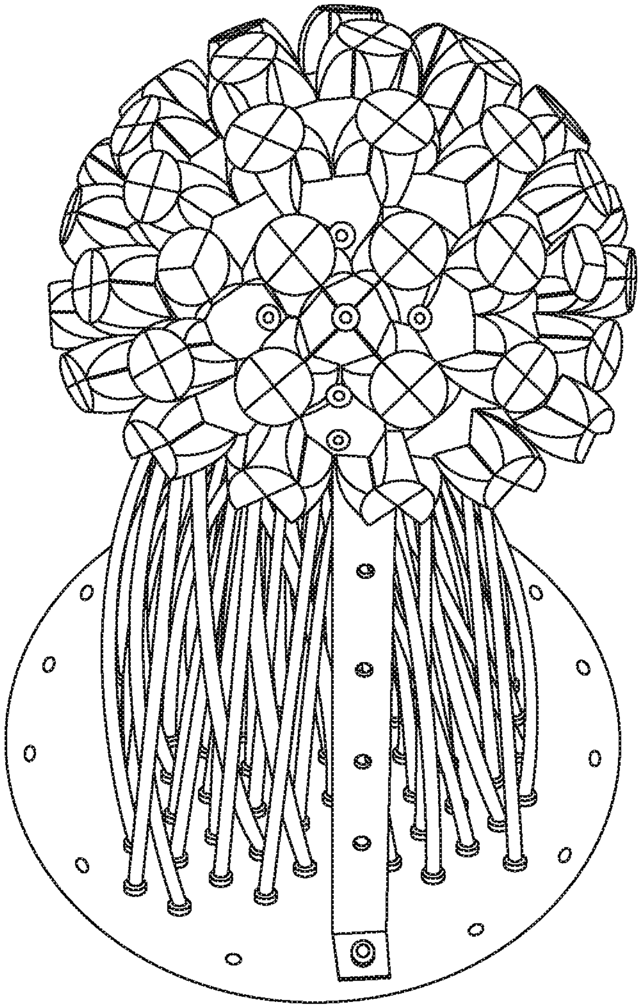
FIGS. 25A-25C are photographs of prototypical system prepared in accordance with an embodiment of the present invention.
Figure 25B:
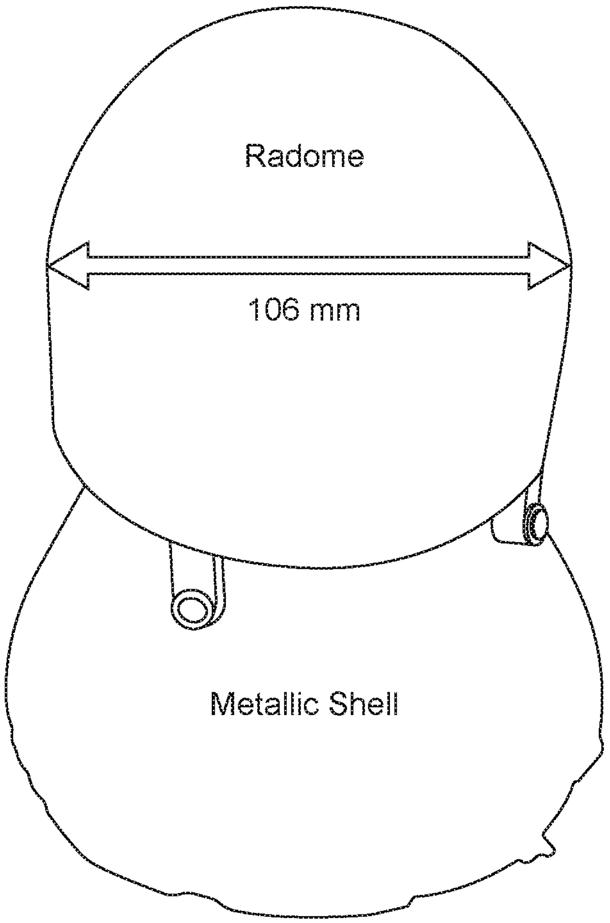
Figure 25C:
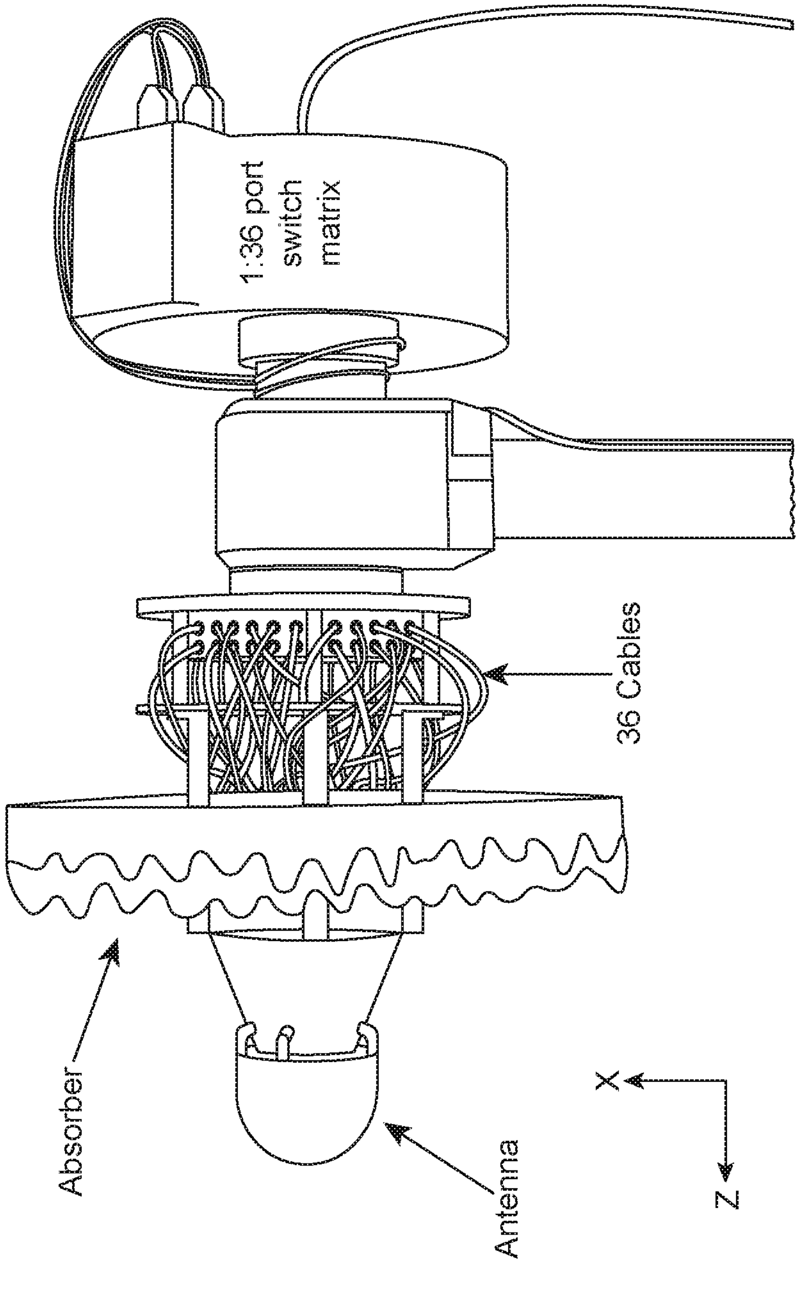

A BAVA prototype of the BAVA model of FIG. 21 and is shown in FIGS. 25A-25C. The antennae were 3D printed from titanium ($Ti_6Al_4V$) using DMLS with the GE Additive Concept Laser M2. Conventional DMLS fabrication process were used, such as those described in C. PFEIFFER et al., "3D printed metallic dual-polarized Vivaldi arrays on square and triangular lattices," *IEEE Trans. Antennas Propag*., Vol. 69/12 (2021) pp. 8325-8334, 2021, the disclosure of which is incorporated herein by reference in its entirety. Male SMP connectors were printed with the antenna elements so that RF coax cables may be plugged directly into the antenna elements, which simplifies assembly compared to the conventional case where surface mount RF connectors are employed. The hemisphere was segmented into 12 modules that are individually printed and then screwed into a hemispherical base that is also 3D printed from titanium.

Figure 20B:
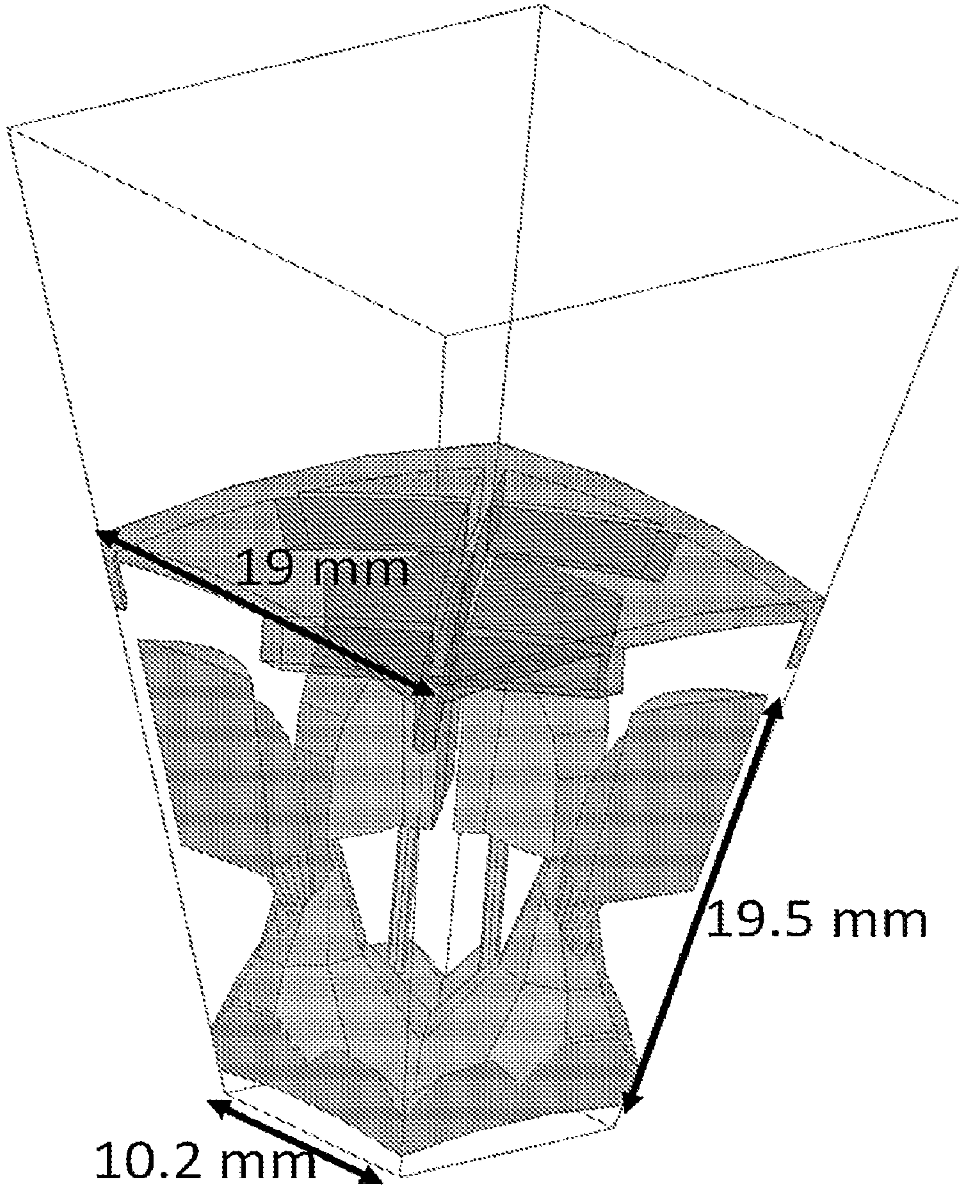

FIGS. 25A-25C are photographs of the fabricated array after 104 cables are connected from the antenna elements to the base plate that organizes the cables for measurement. A metallic shell was added around the cables, and a radome attached to the top as shown in FIG. 25B. The shell was constructed using 3D printed plastic and covered with aluminum tape. The shell was added to reduce unwanted scattering from the blue RF cables that connect to the titanium antenna elements. The radome was 3D printed from ULTEM ($\varepsilon_r$=3.0, tan(δ)=0.002). The radome consisted of a 1 mm thick shell that is supported by 2 mm thick ridges on the inside as shown in FIGS. 20A and 20B.

FIG. 25C is a photograph a side view of the array mounted on the antenna roll over azimuth antenna positioner system, which allows for characterizing the entire 3D radiation pattern. A 0.5 m diameter layer of absorber is placed between the antenna and the switching matrix to reduce scattering from the switching matrix and feed cables. The absorber attenuates radiation in the backward direction for angles θ>120°. This absorber is not modelled in simulation and we therefore expect some discrepancy between measurement and simulation in the backward direction The array was calibrated using the gain transfer method using a reference horn antenna with known gain. The measurement system was calibrated to the 3D printed SMP connectors at the antenna elements which removes the loss of the RF cables and switches. The complex embedded element patterns of all 104 antenna ports are measured and stored, and then digital beamforming is employed to generate beamformed patterns in post processing. As in simulation, beamforming at a given angle is accomplished by complex conjugating the received complex voltages at every port. Each low-gain antenna element is measured in azimuth from ϕ=0° to 360° with 5° spacing and in elevation from θ=0° to 180° every 5°. Time domain gating with a 500 mm (1.7 ns) wide window helped to reduce the impact of reflections from antenna positioner, feed cables, and chamber walls. Furthermore, a spatial filtering routine was utilized to decompose the far field into the spherical harmonics that are supported by the 106 mm diameter sphere. This decomposition helps filter out unphysical far field oscillations that cannot be excited by the finite sized hemispherical antenna. In addition, decomposing the far field into spherical harmonics allows us to accurately interpolate the far field on a grid with 2° spacing in azimuth and elevation.

Figure 26A:
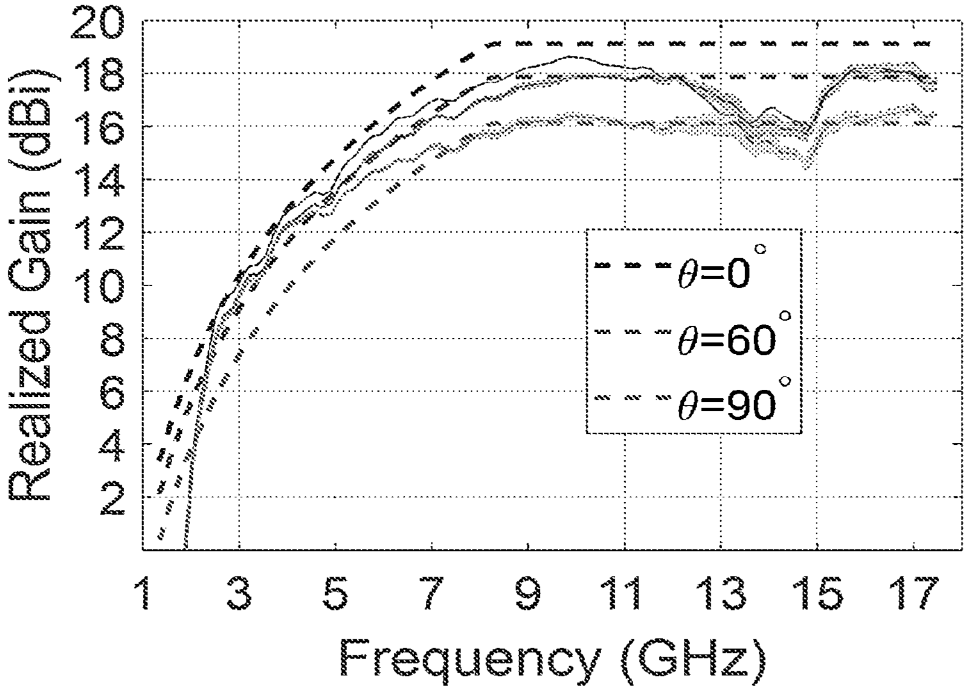
FIGS. 26A-26D graphically illustrate measured (as to the prototype of FIGS. 25A-25C) and simulated (as to the model of FIG. 21) antenna performance.
Figure 26B:
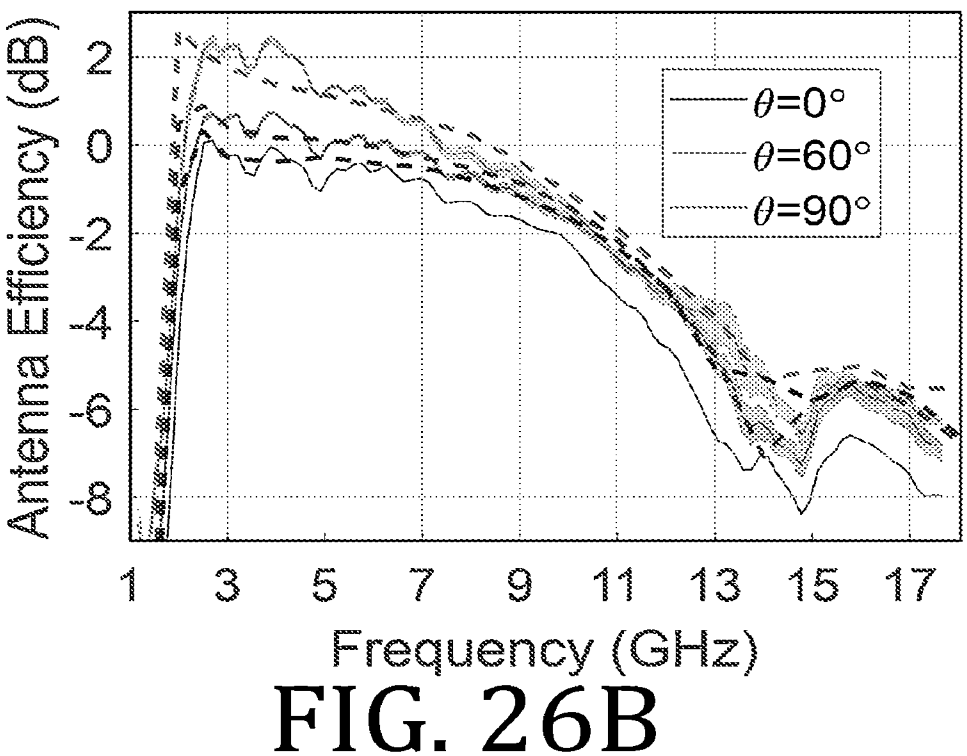
Figure 26C:
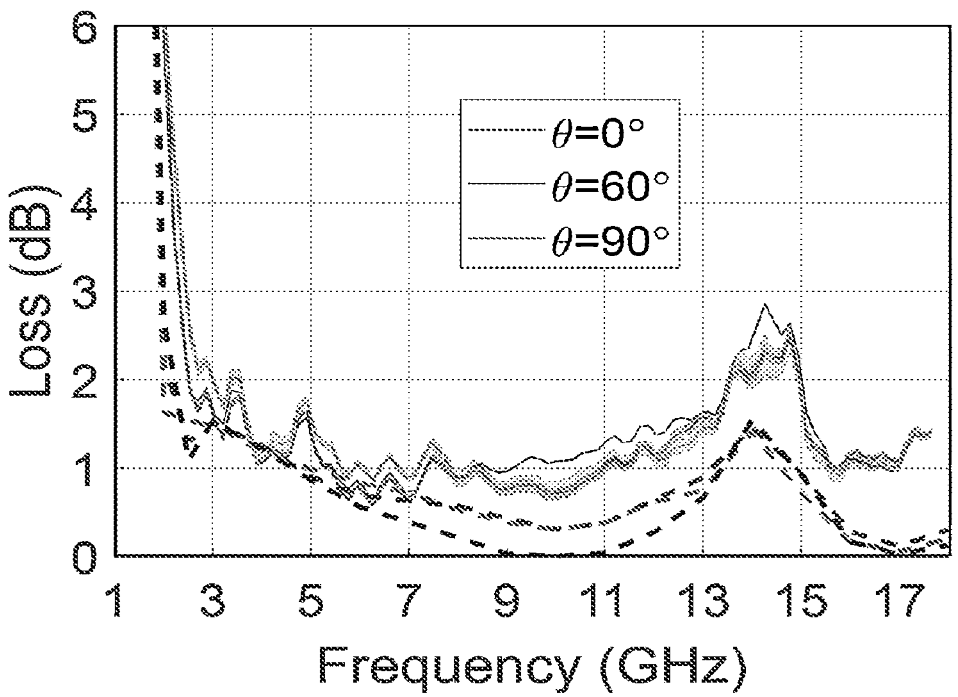
Figure 26D:
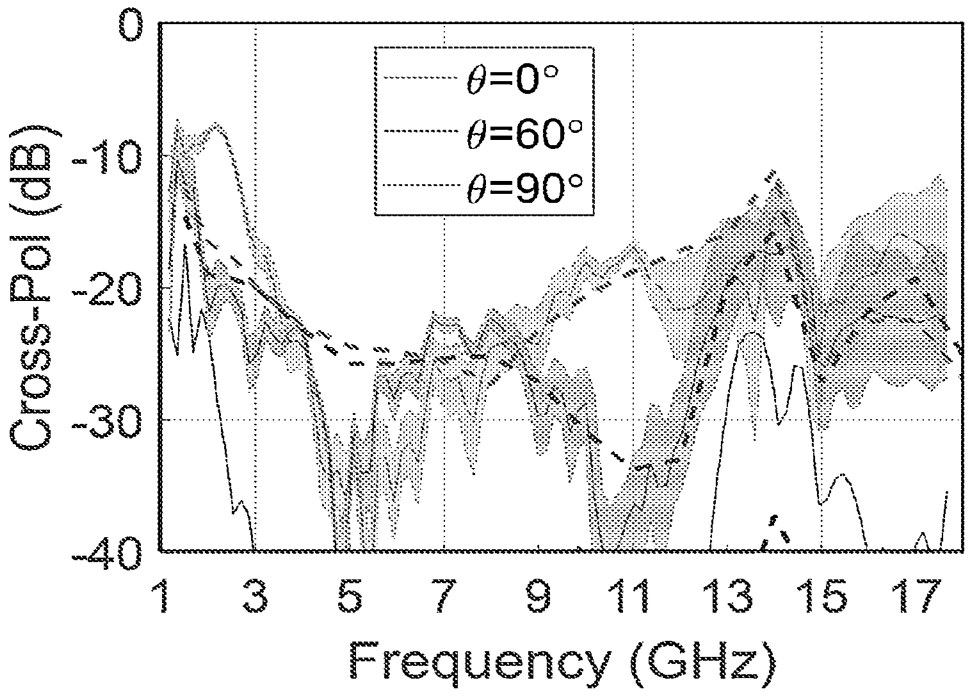
Figure 27A:
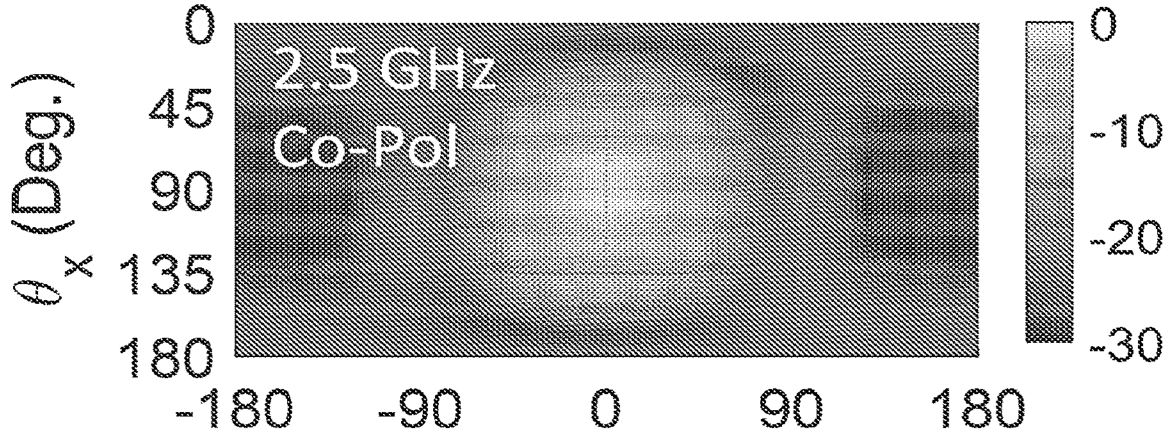
FIGS. 27A-27F graphically plot co- and cross-polarized 3D radiation patterns of the prototypical antenna of FIGS. 25A-25C.
Figure 27B:
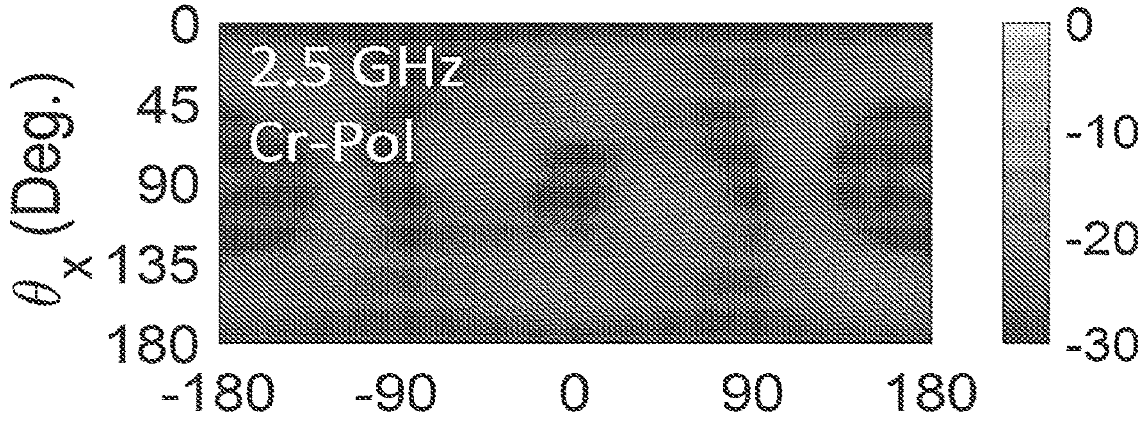
Figure 27C:
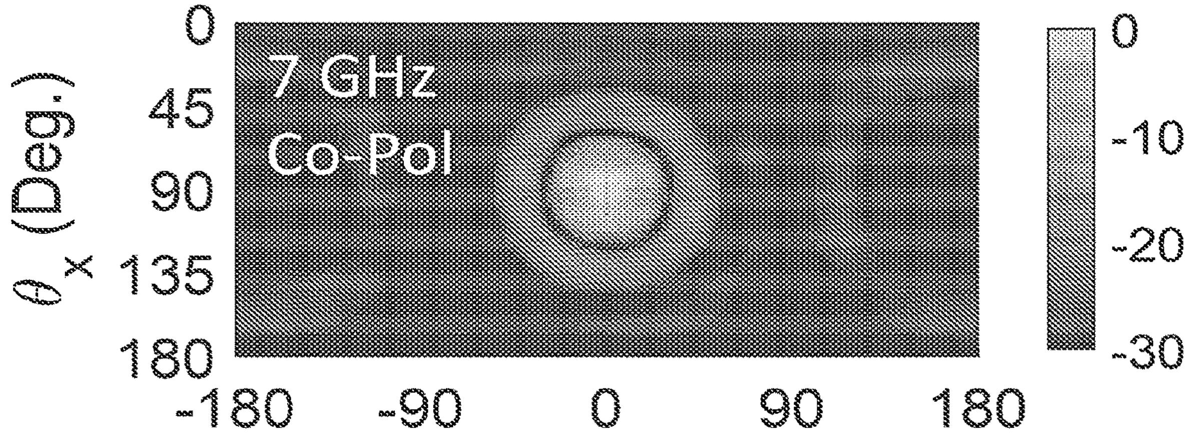
Figure 27D:
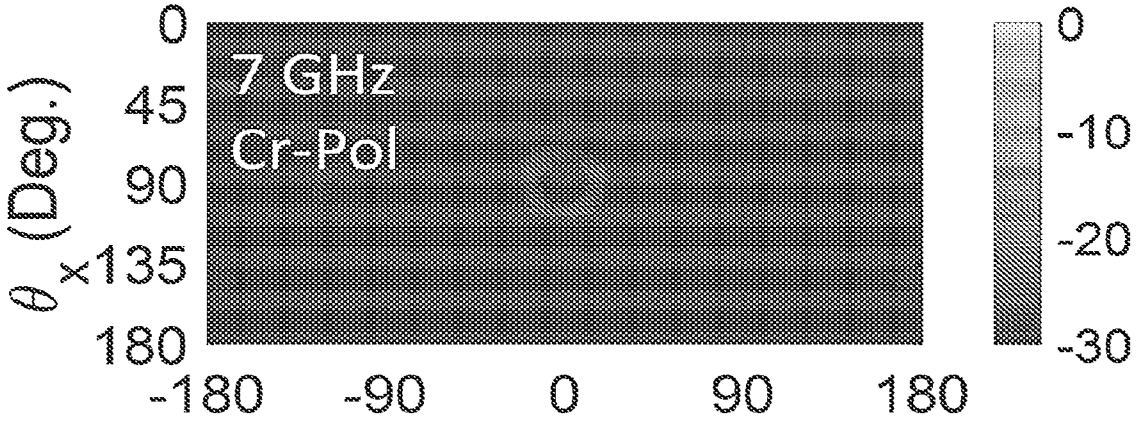
Figure 27E:
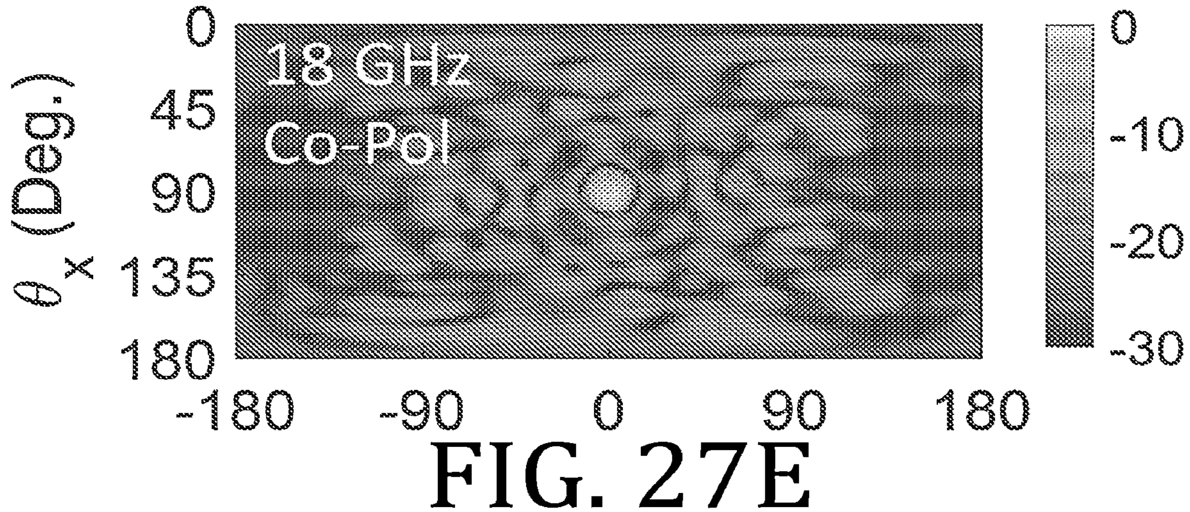
Figure 27F:
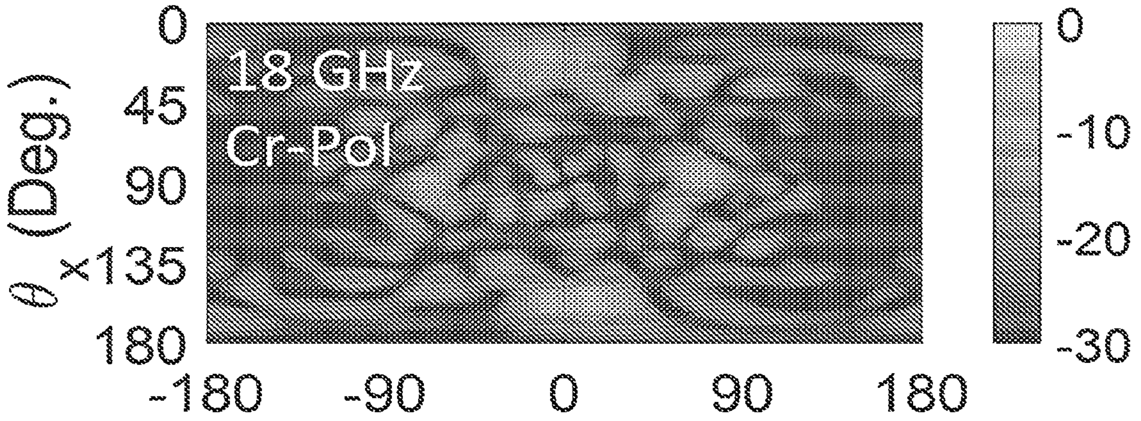
Figure 28A:
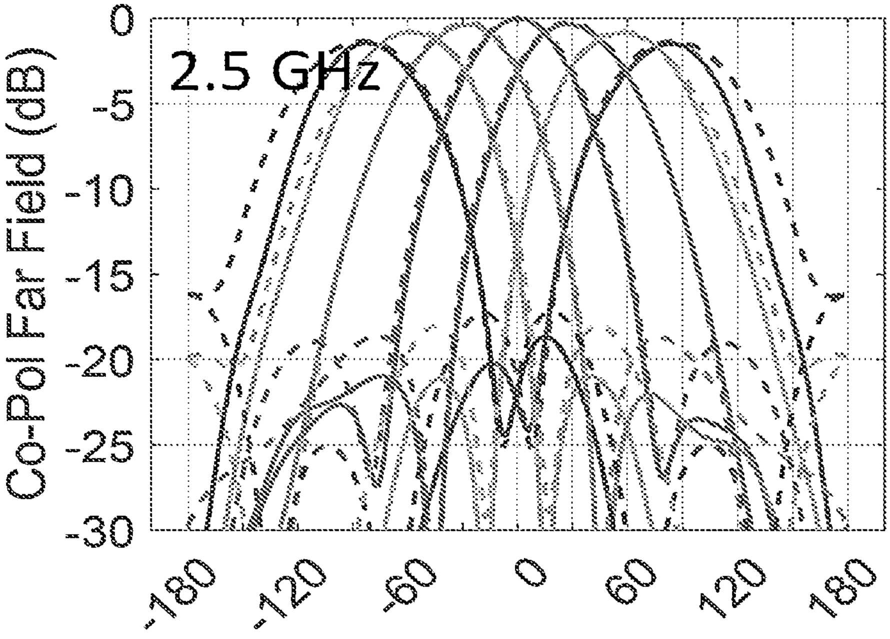
FIGS. 28A-28F graphically illustrate measured radiation patterns normalized by peak gain.
Figure 28B:
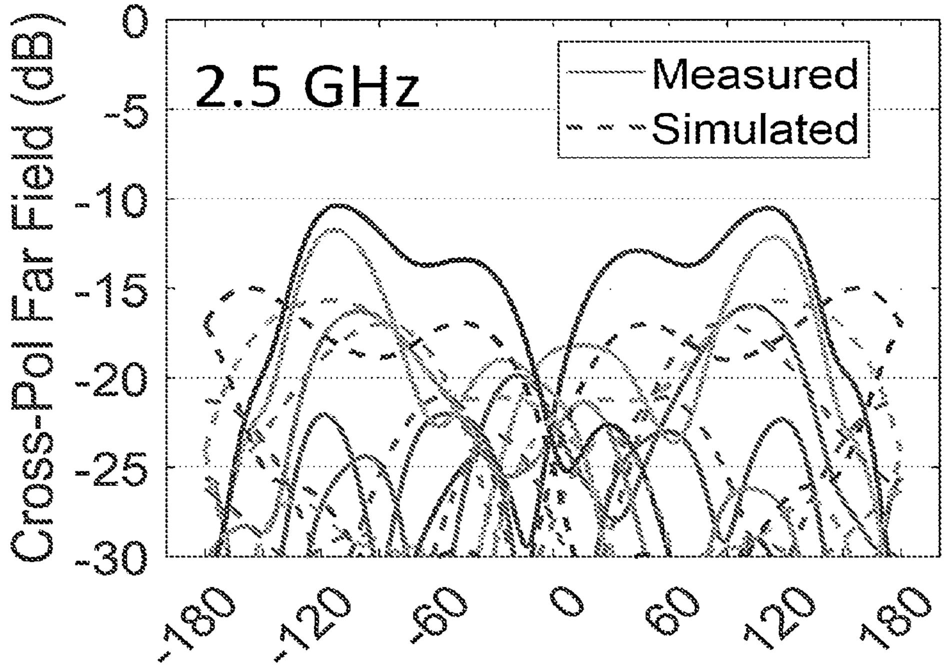
Figure 28C:
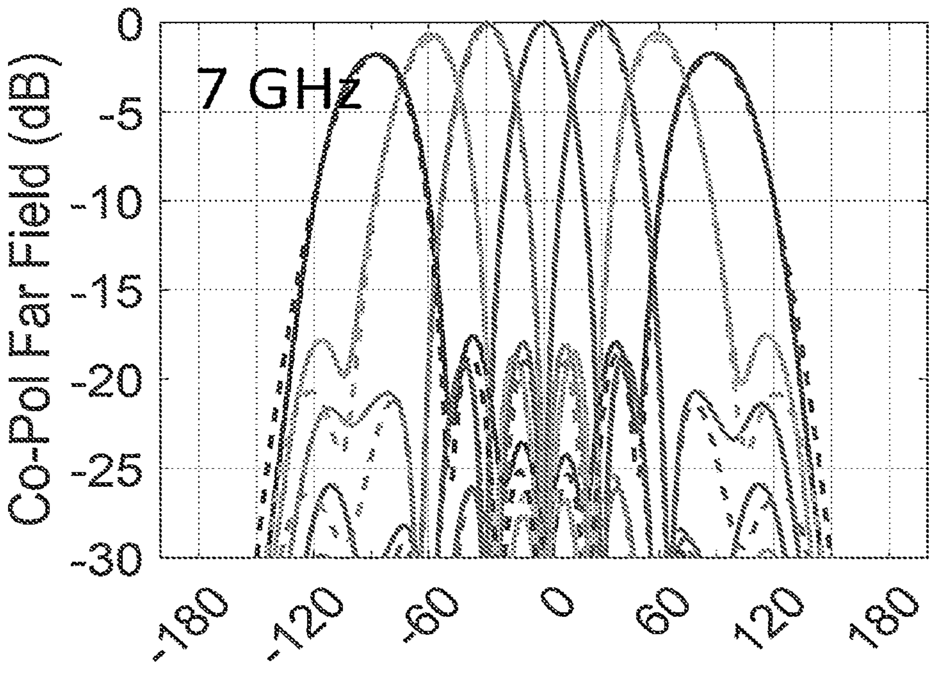
Figure 28D:
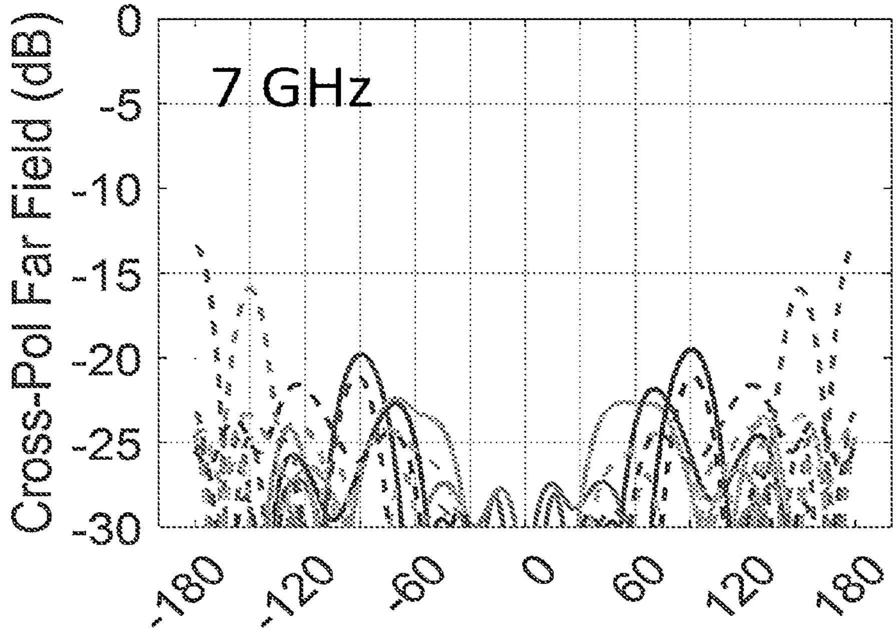
Figure 28E:
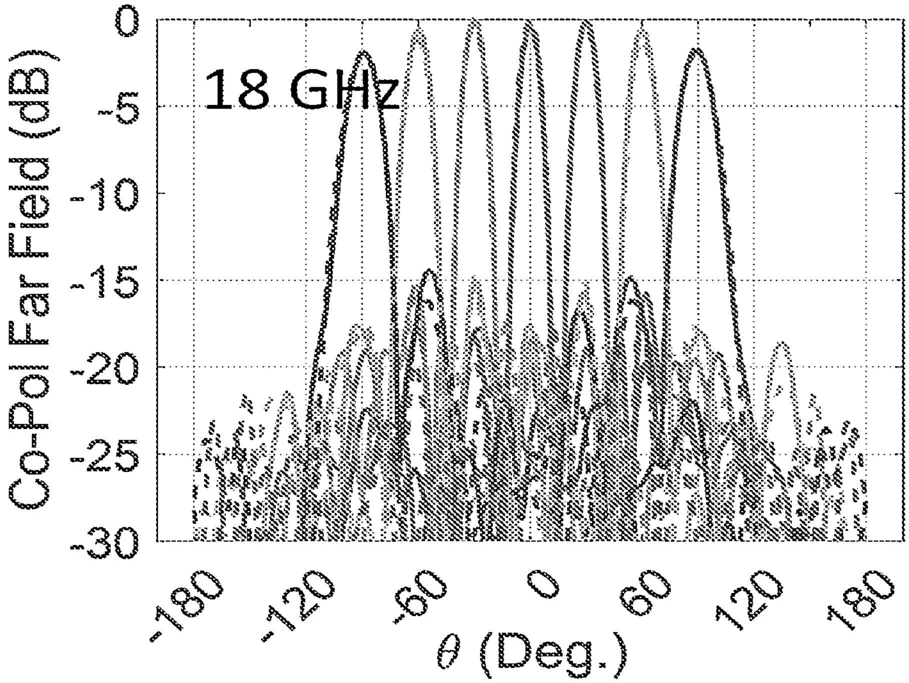
Figure 28F:
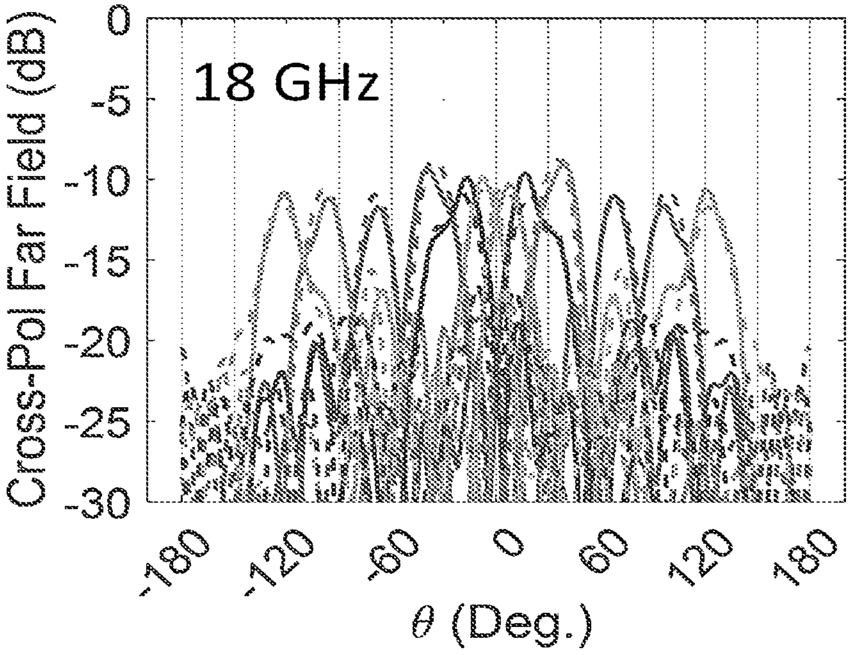

FIGS. 26A-26D compare measured (solid curves) and simulated (dashed curves) antenna performance. FIG. 26A plots the realized gain from 1-18 GHz; FIG. 26B plots the antenna efficiency, FIG. 26C plots the loss (i.e., ratio of the gain to directivity), and FIG. 26D plots the cross polarization in the scan direction. As in simulation, for each elevation angle, the beam is scanned to all azimuth angles (ϕ=−180° . . . 180°) and the linewidth correspond to ±1 standard deviation across all azimuth angles. There was good agreement (less than 1 dB difference) in the gain and antenna efficiency between measurement and simulation except for θ=0° above 12 GHz, at which point measurements are closer to 2 dB below simulation. The differences between measurement and simulation are likely due to a combination of 3D printed fabrication errors of the antennas and radome, relatively coarse simulation mesh to allow modelling such a large structure, and measurement errors. Good agreement between measurement and simulation also exists for the loss and cross-polarization. It should also be noted that at the wider scan angles of θ=60° and 90°, the measured loss in FIG. 26C had worse agreement with simulation than the gain in FIG. 26A. This is likely due to the absorber behind the antenna in measurement which reduces the radiation efficiency and increases directivity because it absorbs power radiated in the backward direction.

The measured cross-polarization in the scan direction agreed much better with simulation than the above discussed Vivaldi array prototype. This may be due to improved cross-polarization response to the more accurate fabrication of BAVA elements compared to Vivaldi elements. The previous Vivaldi array had decreased electrical connection between neighboring elements, whereas the BAVA array is more accurately fabricated because neighboring antenna elements do not need to physically touch.

The co- and cross-polarized 3D radiation patterns at 2.5, 7, and 18 GHz are plotted in FIGS. 27A-27F for the case where the main beam points toward θ=0°. These patterns agree with the simulated patterns in FIG. 27A-27F. Again, the patterns are plotted on the modified ($\theta_x$, $\phi_x$) coordinate system with the x-axis pointing in the same direction as the main beam.

FIGS. 28A-28F plots the measured radiation patterns normalized by the peak gain when the main beam scans from θ=−90° to +90° every 30° in the ϕ=0° plane. This measurement result highlights the utility of this novel hemispherical array concept because the measured realized gain only drops 2 dB when the scan angle increases from θ=0° to 90°. Measurements in the solid curves generally agree with simulations in the dashed curves. The worse agreement between measurement and simulation at 2.5 GHz is likely because the simulation model does not include the metallic shell around the RF feed cables or absorber below the antenna array. For reference, the spacing between the absorber and antenna array is only 1λ at 2.5 GHz, so we do expect the absorber to marginally impact the patterns.

Example 6—Comparison

Table 2 compares the measured spherical BAVA performance and the spherical Vivaldi array. The max scan loss at θ=90° is the maximum difference between the realized gain at θ=0° and θ=90° across all operating frequencies and azimuth angles. The frequency range is defined as the region where the product of the mismatch loss and radiation efficiency averaged over all azimuth angles is less than 3 dB. Overall, the performance of the hemispherical BAVA array is comparable to that of the hemispherical Vivaldi array. One of the primary differences between the two antenna arrays in Table 2 is the height of a BAVA element is roughly a third of the Vivaldi antenna element which translates into a 1.7× smaller radius of curvature, a smaller array diameter, lower cost, and lower weight. Furthermore, the BAVA element height reduction also results in a larger maximum frequency with grating lobe free operation. For both arrays, the minimum operating frequency is around 2 GHz and the peak gain is 19 dB. The patterns and cross-polarization are very similar between the two arrays even though BAVA elements have significantly reduced D-plane cross-polarization levels. The similar cross-polarization is likely due to the spherical symmetry of the array, which ensures that most power radiates close to the normal direction at all scan angles. There is also a very similar mismatch loss between the BAVA and Vivaldi arrays.

Table 3 compares the performance of our array to previously published planar and conformal arrays. There are countless planar arrays that have multi-octave operating bandwidths, and we list just a few. The peak antenna efficiency of these arrays is generally 100% to within measurement error. However, their field of view is limited. The field of view was defined to be solid angle (in steradians) over which the array's realized gain is within 50% of its maximum value. In contrast, previously developed conformal arrays have demonstrated wide fields of view but narrow bandwidths and low antenna efficiencies. Our array achieves both a high bandwidth and wide field of view.

TABLE 2

| | BAVA | VIVALDI |
|---|---|---|
| Antenna Height | 19.5 mm | 54 mm |
| Diameter | 106 mm | 181.5 mm |
| Weight | 0.25 kg | 0.52 kg |
| Cost | $30/port | $86/port |
| Polarization | Dual-Linear | Dual-Linear |
| Grating Lobe Free | <8 GHZ | <4.75 GHz |
| Max Scan Loss at (θ = 90°) | 2.5 dB | 3.5 dB |
| Freq. Range (θ = 0°) | (2.5 GHz, >18 GHz) | (2.1 GHZ, >18 GHz) |
| Freq. Range (θ = 90°) | (3.0 GHz, >18 GHz) | (3.4 GHz, >18 GHz) |
| Antenna Eff > −2 db (θ = 0°) | (2.2 GHz, 9.7 GHZ) | (1.3 GHZ, 5.1 GHZ) |
| Antenna Eff > −2 dB (θ = 90°) | (2.0 GHz, 10.5 GHZ) | (1.0 GHz, 6.1 GHZ) |

The various embodiments provide the first UWB antenna array on a doubly curved surface for wide angle scanning. Employing a quadrilateral meshing technique that generates a relatively uniform square lattice geometry. This geometry also supports the high coupling between antenna elements that is required for multi-octave bandwidths. The mapping approach is very general and can be applied to an arbitrary geometry. The Vivaldi antenna element geometry that may be fabricated using a metal 3D printer. SMP connectors are integrated into the antenna elements, which significantly simplifies assembly. A proof-of-concept UWB array covering the surface of a hemisphere is then demonstrated. Simulations and measurements show the array can generate well-formed beams at scan angles out to 120° from the z-axis (i.e., 3π steradians) from 2 GHz to 18 GHz. The measured gain is within 2 dB of the simulated and theoretical values at all frequencies and scan angles.

TABLE 3

| Antenna element type | FUSE | BAVA | Connected Dipole | Patch | Waveguide | Spiral | Patch | Vivaldi | BAVA |
|---|---|---|---|---|---|---|---|---|---|
| Bandwidth | 5:1 | 10:1 | 9:1 | 1.017:1 | 1.27:1 | >1.1 | 1.3:1 | 9:1 | 7:1 |
| $f_{max}$ | 22 GHz | 18 GHz | 18 GHz | 20 GHz | 9.5 GHz | 8.5 GHz | 11 GHz | 18 GHz | 18 GHz |
| Antenna thickness @ fmax | λ/1.5 | λ/2 | λ/1.4 | λ/60 | 2.0 λ | Unknown | λ/20 | 3.2 λ | 1.2 λ |
| Planar/curved | Planar | Planar | Planar | Single curved | Double curved | Double curved | Double curved | Double curved | Double curved |
| Element spacing @ $f_{max}$ | λ/1.7 | λ/2 | λ/2.1 | λ/2 | 1.6 λ | 0.75 λ | 1.6 λ | 1.9 λ | 1.1 λ |
| Polarization | Dual-linear | Dual-linear | Dual-linear | Linear | Dual circular | Circular | Circular | Dual linear | Dual linear |
| Field of view (steradians) where $G/G_{max}$ > 50% | 2.5 sr | 2.5 sr | 1.8 sr | 2.2 sr | 6 sr | 6 sr | 9 sr | 9 sr | 9 sr |
| Peak antenna efficiency | 100% | 100% | 100% | 100% | 6% | 30% | 10% | 100% | 100% |

This work is intended to serve as a baseline estimate for the performance of future UWB, wide scan arrays employing tightly coupled antenna elements. The current hemispherical prototype is only 52 elements in size. Larger arrays will generally have larger radii of curvature and more uniform lattices that make optimizing their performance more straightforward. Another issue with the current prototype is there is an imperfect electrical contact between the 20 modules that comprise the array. It is contemplated that these seams between modules may degrade cross-pol and impedance match to some extent. A natural extension of this work is to consider more advanced UWB radiating elements such as a tightly coupled dipole array. The dipole array could achieve a similar impedance bandwidth as Vivaldi elements while reducing cross-polarized radiation. In addition, the dipole array has a significantly lower profile than a Vivaldi array, which would allow for realizing a smaller radius of curvature. The various embodiments are discussed within the context of a relatively crude beamforming approach based on complex conjugation. In other embodiments, more elaborate pattern synthesis techniques may be considered to control parameters such as cross-polarized radiation, side-lobe level, and null placement. Developing accurate analytic models for the embedded element patterns would also aid beamforming. This further motivates development of low-profile conformal antenna elements because they have a simpler and more accurate analytic model than electrically large Vivaldi elements.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof.

Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

What is claimed is:

1. An ultra-wide band (UWB) antenna configured to conform to a doubly curved surface and having an operating wavelength λ, the UWB antenna comprising:

an array of electrically cooperating antennas emanating outward from a base region to respective locations of an outer surface region conforming to the doubly curved surface, the area of the outer surface region being divided in accordance with a mesh of unit cells defining thereby a plurality of edges, each of the unit cells having a unit cell area selected in accordance with a desired array gain and grating-lobe or side-lobe structure;

wherein each of the electrically cooperating antennas is formed from one or more mechanically distinct modular elements and at least one of the electrically cooperating antennas is formed from a plurality of the mechanically distinct modular elements, each of the electrically cooperating antennas is a dual polarized element including conical vertices, a plurality of shorting posts, and an SMP connector with a self-supporting tapered transmission line balun, and for each electrically cooperating antenna the respective location of the outer surface region to which the electrically cooperating antenna extends is associated with a respective one of the plurality of edges defined by the mesh of unit cells.

2. The UWB antenna of claim 1, wherein each of the electrically cooperating antennas in the array of electrically cooperating antennas comprises a Vivaldi radiator.

3. The UWB antenna of claim 2, wherein each Vivaldi radiator comprises a balun configured to enable electrical cooperation with adjacent Vivaldi radiators in the array of electrically cooperating antennas.

4. The UWB antenna of claim 1, wherein the mesh comprises a square lattice array and the unit cell maximum area is between $\lambda^2/4$ and $\lambda^2$.

5. The UWB antenna of claim 4, wherein the mesh comprises a square lattice array and the unit cell maximum area is $\lambda^2/4$.

6. The UWB antenna of claim 1, wherein the mesh comprises a triangular lattice array and the unit cell maximum area comprises $\lambda^2/4$.

7. The UWB antenna of claim 1, wherein the number of antennas in the array of electrically cooperating antennas is less than or equal to the total number of edges defined by the mesh of unit cells.

8. The UWB antenna of claim 1, wherein the antennas in the array of electrically cooperating antennas are distributed across the outer surface region in a substantially uniform manner.

9. The UWB antenna of claim 1, wherein the antennas in the array of electrically cooperating antennas are distributed more densely across an outer surface region associated with a center portion of a field of view (FOV), and less densely across an outer surface region associated with an edge portion of the FOV.

10. The UWB antenna of claim 1, wherein the antennas in the array of electrically cooperating antennas are distributed along an elevation (θ) of the outer surface region in a substantially uniform manner, and for each of a plurality of selected elevations (θ) distributed along each respective azimuth (ϕ) thereof in accordance with a respective azimuth spacing selected to provide substantially uniform spacing.

11. The UWB antenna of claim 1, wherein each of the antennas in the array of electrically cooperating antennas comprises a Vivaldi radiator comprising a radiating arm and the radiating arm is gridded to reduce weight.

12. The UWB antenna of claim 1, wherein each of the conical vertices is hollowed out to reduce weight.

* * * * *